United States Patent
Kane et al.

(10) Patent No.: US 8,203,702 B1
(45) Date of Patent: Jun. 19, 2012

(54) OPTICAL SYSTEM

(75) Inventors: David M. Kane, Tucson, AZ (US); Kelly Hillman, Tucson, AZ (US); Christopher Hornberg, Tucson, AZ (US); John Hunt, Tucson, AZ (US); Andrew E. Paul, Tucson, AZ (US)

(73) Assignee: Areté Associates, Northridge, CA (US)

( * ) Notice: Subject to any disclaimer, the term of this patent is extended or adjusted under 35 U.S.C. 154(b) by 722 days.

(21) Appl. No.: 12/287,861

(22) Filed: Oct. 14, 2008

Related U.S. Application Data

(63) Continuation-in-part of application No. 11/796,603, filed on Apr. 28, 2007, now Pat. No. 7,732,751, and a continuation-in-part of application No. 11/151,594, filed on Jun. 13, 2005, now Pat. No. 7,297,934.

(60) Provisional application No. 60/999,159, filed on Oct. 15, 2007, provisional application No. 61/125,915, filed on Apr. 30, 2008.

(51) Int. Cl.
*G01B 11/26* (2006.01)
*G01C 1/00* (2006.01)

(52) U.S. Cl. .................................................. 356/139.05

(58) Field of Classification Search .. 356/139.01–139.1, 356/3.01–28.5
See application file for complete search history.

(56) References Cited

U.S. PATENT DOCUMENTS
7,041,953 B2 * 5/2006 Byren ........................ 250/201.9
* cited by examiner

*Primary Examiner* — Thomas Tarcza
*Assistant Examiner* — Luke Ratcliffe
(74) *Attorney, Agent, or Firm* — Peter I Lippman

(57) ABSTRACT

Method/system locate external articles using source, detector (PSD), entrance aperture, and magnifying/reducing afocal element—expanding FOR>90°, or refining precision. Between (1) source or detector and (2) aperture, at least one plural-axis-rotatable mirror addresses source/detector throughout FOR. ½- to 15-centimeter mirror enables ~25 to ~45 μradian beam divergence. Aperture, afocal element, and mirror(s) define source-detector path. Mirror(s) rotate in refractory- (or air/magnetic-) bearing mount; or mirror array. Auxiliary optics illuminate mirror back, monitoring return to measure (null-balance feedback) angle. To optimize imaging, auxiliary radiation propagates via splitters toward array (paralleling measurement paths), then focusing on imaging detector. Focal quality is developed as a PSF, optimized vs. angle; stored results later recover optima. Mirror drive uses magnet(s) on mirror(s). "Piston" motion yields in-phase wavefronts, so array dimensions set diffraction limit. Also: destructive reply; scaling optimizes acceleration vs. thickness; passive systems.

43 Claims, 30 Drawing Sheets

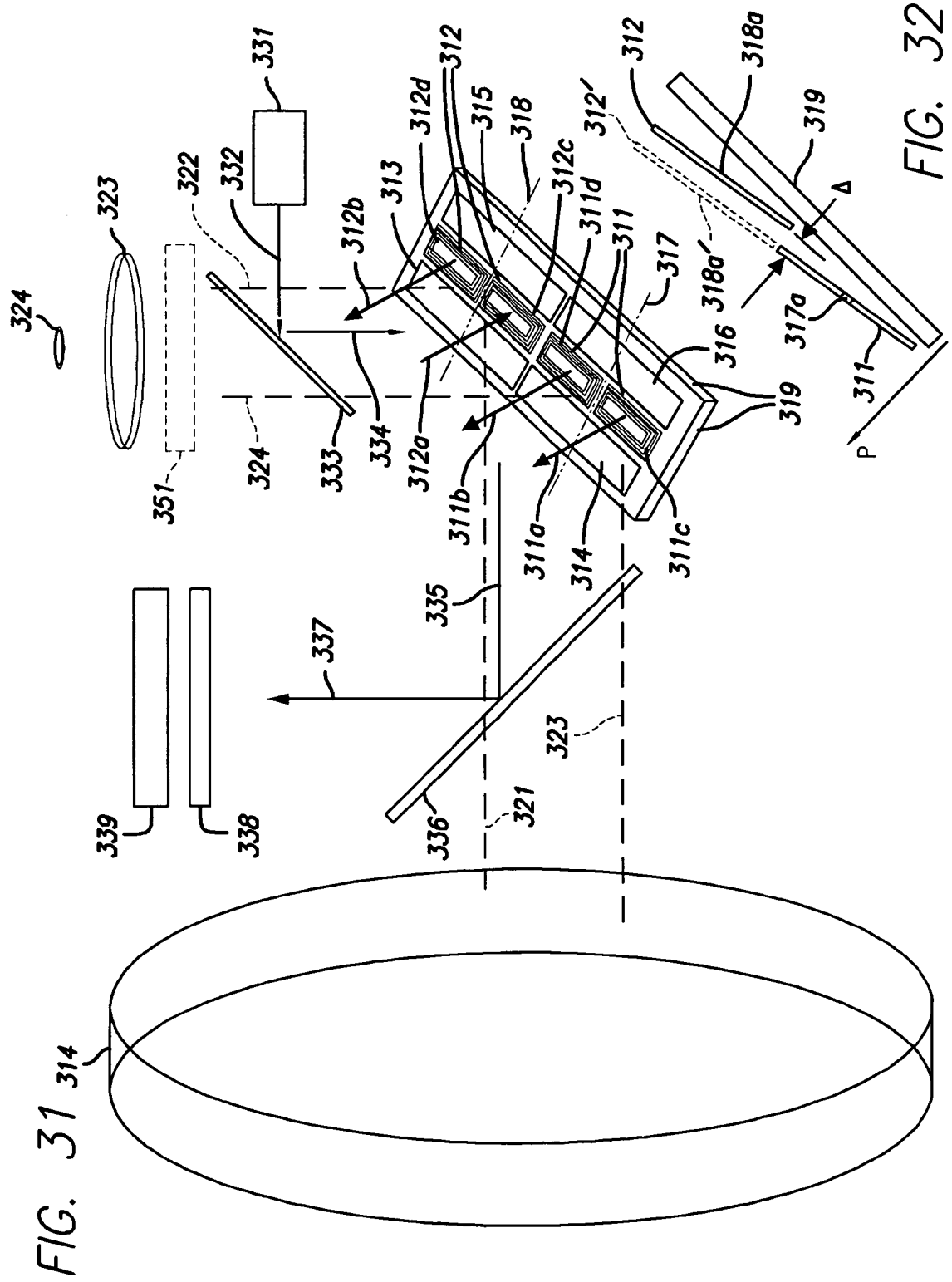

FIG. 35
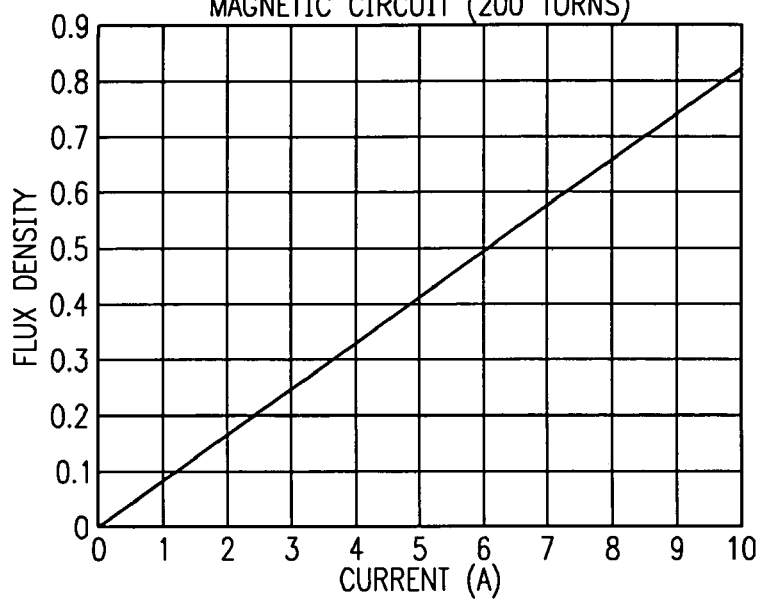
FIG. 36
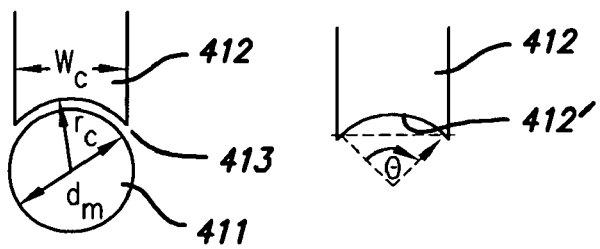
FIG. 37
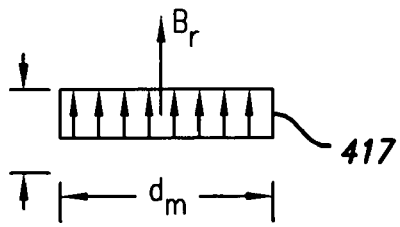
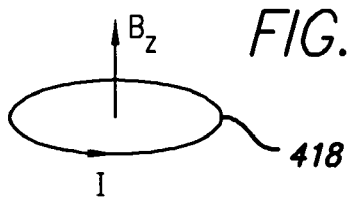
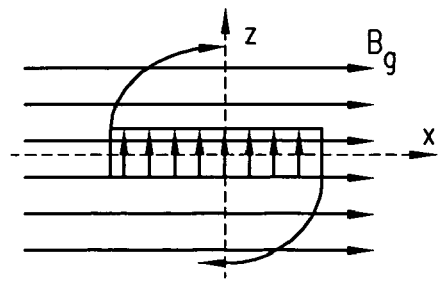
FIG. 38

OPTICAL SYSTEM

RELATION BACK

This document is a continuation-in-part of, and claims priority of, U.S. "regular" (nonprovisional) application Ser. No. 11/796,603 of Kane, entitled "OPTICAL SYSTEMS AND METHODS USING LARGE MICROELECTROMECHANICAL-SYSTEMS MIRRORS" and filed Apr. 28, 2007 now U.S. Pat. No. 7,732,751; and of its parent application Ser. No. 11/151,594, filed Jun. 13, 2005, now U.S. Pat. No. 7,297,934 of Kane, entitled "OPTICAL SYSTEM", together with their precursor provisional and international applications.

This document also claims priority of and coowned U.S. provisional patent applications 60/999,159 of Hunt and Hillman et al., entitled "OPTICAL SYSTEM WITH MINIATURE SCANNING MIRROR" and filed Oct. 15, 2007, and 61/125,915 of Paul et al., entitled "ELECTROOPTICAL SENSOR TECHNOLOGY . . . " and filed Apr. 30, 2008.

All these four patent documents, and further documents incorporated therein, are wholly incorporated by reference into this present document.

BACKGROUND

Portions of this invention are very closely related to earlier coowned patent documents directed to optical systems and methods for imaging, and for noticing and optically following a large variety of objects outside an optical system. These innovations included capabilities for "steering" of radiation beams, using any of a great variety of optical-deflection or -switching arrangements.

Such arrangements comprised using pointable mirrors of many different types, and other kinds of routing devices such as an optical-switch "fabric", and birefringent and other nonlinear materials, all generally positioned within an optical system. The mirrors included individual reflectors, and reflector arrays, over a broad range of sizes and typically controllable in two axes of rotation as well as in some cases piston movement.

Some of the mirrors were microelectromechanical system is ("MEMS") units or other micromechanical devices—i. e. not limited to electrical or electronic control. Among the relatively larger mirrors (for instance those over 5 mm across) were magnetically driven individually steering mirrors using, for example, custom jewel bearings—or etched monoilicon in-plane torsion hinges (or "flexures").

The present invention is not limited to teachings in those earlier documents. Mirror adjustments by galvanometer scanner and other steering systems are also applicable. Among these earlier documents are teachings of a proprietary Cats-Eye™ object-warning system. Those documents teach advanced and excellent apparatus and methods for imaging from aircraft and many other kinds of mounting arrangements, both vehicular and stationary, and in many useful practical applications encompassing, merely by way of example, commercial-airline flight-control imaging e. g. from fixed towers, astronautical rendezvous, ground-planned defense maneuvers, and vehicle collision avoidance, as well as terrain mapping from space.

More specifically the above-mentioned earlier documents teach such innovations with greater field of regard ("FOR") and field of view ("FOV") than in prior approaches, and with much more nimble and sophisticated capability to notice and optically follow a large variety of objects outside the optical system than previously possible. Even the technologies in those coowned documents, however, leave something to be desired in ability to very quickly steer radiation beams while maintaining the beams at a fine degree of collimation and accordingly maintaining the capability to bring the beams to a very sharp focus.

In this connection the ability to prevent degradation due to diffraction is very important. As our earlier documents show, the fundamental limit imposed by diffraction can be mitigated by use of devices (such as mirrors) that have large apertures, and this is the reason for our previous emphasis on relatively "large" mirrors—but in particular, mirrors up to only a centimeter across.

Likewise our earlier work has emphasized operating steering mirrors in such a way as to yield diffraction characteristics controlled by entire-array dimensions rather than individual-mirror dimensions. These latter techniques do not change the fundamental relationships that govern the diffraction limit (i. e., larger apertures still lead to finer collimation and focus). Rather these techniques modify the functioning of a mirror array to exploit those fundamental relationships much more easily—by increasing dimensions of the array rather than an individual mirror.

Our earlier developments, however, have not fully used the available performance advantages of large mirrors and multimirror arrays.

Neither earlier MEMS devices nor other steering-mirror concepts provide the adequately increased aperture that is needed for best diffraction control. Analogously, earlier relatively large-aperture MEMS devices cannot provide translational stability in the X, Y, and Z axes. Another major inadequacy in prior-art steering deflectors has turned out to be vulnerability to vibration—particularly in high-vibration environments. Two still-further difficulties have been the relatively high power drain required to drive the deflectors, and relatively high mass, weight and bulk of prior gimbal systems. Especially important, in addition to aperture size, is the relatively narrow angular range (field of regard, "FOR") of prior steering devices.

Certain patent documents have been adduced that at first sight may seem relevant in this field. They include European patent documents and one Japanese patent abstract of two Japanese inventors:

Masayoshi Esashi, with Nippon Signal in Tokyo—particularly in European Patent Application O 686 863 A1 at PDF pages 33 and 34 (FIGS. 14 and 15); and Norihiro Asada, with Nihon Shingo Kabushiki Kaisha—notably in European Patent Application EP 0 774 681 A1 at PDF pages 10, 17 and 39 (FIGS. 1, 9 and 32)—and Asada's EP 0 778 657 A1, at PDF pages 7 through 9 (FIGS. 1 through 4); and Japanese publication 08-166289 of Jun. 25, 1996 in Patent Abstracts of Japan, Application number 06-310657 of The Nippon Signal Company Ltd.

At least preliminarily it appears that these Japanese inventors have pulled the rug out from under certain of the Draper patents. It is unclear whether any of the Draper claims survives these earlier Japanese inventions. Four other patents of potential interest are U.S. Pat. No. 3,742,238, and U.S. Pat. No. 4,658,140 ("Infrared scanner for forward loading infrared device"), 4,470,562 ("Polaris Guidance System") and U.S. Pat. No. 5,270,792 ("Dynamic Lateral shearing interferometer").

Conclusion—As noted above, the present state of the art in imaging, while admirable, leaves considerable refinement to be desired.

SUMMARY OF THE DISCLOSURE

The present invention provides just such refinement. This invention has several different facets or aspects that are capable of use independently of one another; but most of them are also amenable to practice in combination together.

In preferred embodiments of a first one of its major independent facet or aspect, the invention is an optical system dynamically determining associated angular direction throughout a specified range of angular directions, of an external article in a volume outside the system. The optical system includes a radiation source, an optical detector, an entrance aperture, and an afocal element.

The afocal element is associated with the aperture, enlarging the field of regard of the external article and the volume as seen by the source and detector. Also in the system, disposed along an optical path between (1) selectively, the source or detector and (2) the entrance aperture, is at least one mirror, rotatable about plural axes and causing the source and detector to address varying portions of the volume outside the optical system. Each mirror of the at least one mirror has dimensions in a range exceeding five millimeters.

Due to the enlarging of the field of regard together with rotation of the at least one mirror, and substantially without changing magnitude of the enlarging, the external article receives radiation from the source and returns the radiation to the detector throughout the specified range. The aperture, afocal element, and at least one mirror together form a common optical path for the radiation from the source and to the detector.

The foregoing may represent a description or definition of the first aspect or facet of the invention in its broadest or most general form. Even as couched in these broad terms, however, it can be seen that this facet of the invention importantly advances the art.

In particular, by virtue of its increased aperture, relative to apertures of known prior-art optical systems (generally below five millimeters across), this aspect of the present invention provides significantly finer diffraction limit—and thereby greatly refined pointing precision and accuracy, as well as better collimation and sharper focal properties.

Although the first major aspect of the invention thus significantly advances the art, nevertheless to optimize enjoyment of its benefits preferably the invention is practiced in conjunction with certain additional features or characteristics. Preferably (but this is only a preference) the range of mirror dimensions does not exceed fifteen centimeters. We believe that the principles of our invention are applicable to optical-system design for mirrors greater than 15 cm, but for the present we have no commercial interest in such large systems.

One preferred additional characteristic is that the mirror dimensions be in a range exceeding one centimeter. We prefer more strongly that the mirror dimensions be in a range exceeding five centimeters. We prefer still more strongly that the mirror dimensions be in a range exceeding ten centimeters.

We also prefer that the at least one mirror include a two-axis mirror in a gimbal-like mount having jewel, ceramic or other refractory bearings. The term "refractory" is discussed in a "Detailed Description" section below.

For purposes of this document, and particularly in certain of the appended claims, the term "gimbal-like" shall be understood to mean that the indicated element (such as an inner ring, or an intermediate ring or stage of a mirror mount) is analogous in some regard to a corresponding element of an ordinary, old-fashioned gimbal. In most such phrasing, the analogy specifically consists of the recited element being an intermediate stage between two other stages, as in an ordinary gimbal.

In this context, the two other stages are:
an outer ring, or outer stage, that defines a first axis of rotation about which the intermediate stage operates; and
an inner element or stage (here ordinarily a mirror mounted to or integrated with a magnet) that rotates about a second axis of rotation defined by the intermediate stage.

Thus it may be said that the inner element is to the intermediate stage as the latter is to the outer stage. In addition the two axes of rotation are distinct and different from each other and ordinarily orthogonal, i. e. at right angles—so that the combined effect of the two rotations is to enable scanning substantially throughout a full three-dimensional solid angle.

Another basic preference is that the optical system further include some means for monitoring mirror position to develop positional or rotational feedback information used in rotating the at least one mirror. In this case the monitoring means still further include an auxiliary optical system that directs an auxiliary radiation beam to the back of the mirror, and responds to the auxiliary beam after return from the back of the mirror, to determine rotational angle of the mirror. Yet another basic preference is that the at least one mirror include a two-axis mirror supported in a gimbal-like mount having air bearings or magnetic bearings.

Another basic preference is that the optical detector is a position-sensing detector (PSD) that detects radiation returned from the external article and tracks the article by inducing rotation of the at least one mirror to maintain the article centered on the detector. In this case a subpreference is that the mirror dimensions be large enough to sharpen the diffraction limit sufficiently for beam divergence on the order of forty to fifty microradians or finer, at visible wavelengths. If this latter preference is observed, then still-further preferably the maximum transverse dimensions of the mirror are on the order of three centimeters.

Alternatively to the preference for 40 to 50 μrad, stated just above, we prefer that the at least one mirror include an array of mirrors having overall array dimensions large enough to sharpen the diffraction limit sufficiently for beam divergence on the order of twenty-five to thirty microradians, at visible wavelengths. In this case the maximum transverse dimensions of the mirror array are preferably on the order of five centimeters.

Yet another basic preference is that the "at least one mirror" include a mirror array addressing the varying external portions of the volume outside the optical system; and further include a detector that detects radiation from the external article and tracks the article by inducing rotation of the reflector to maintain the article centered on the detector. According to this same basic preference the system also includes some means for enabling direct measurement and optimization of imaging quality; the enabling means include an auxiliary optical system emulating the behavior of light paths, to or from the varying external portions, at the array; the auxiliary optical system includes a laser directing an auxiliary beam to a first beam-splitter that forwards a portion of the beam energy toward the mirror array, parallel to the light paths to or from the varying external portions, and from the array to focus on an imaging detector; and some means for developing focal quality at the imaging detector as a point spread function, and using the point spread function as a figure of merit for adjustments of the mirror.

In event the tracking and rotation-inducing preference is observed, then preferably the developing and using means include—first—some means for perturbing mirror adjustments to optimize the point spread function, for plural steering angles of the array, and storing the optimized results;

and—second—some means for retrieving those mirror adjustments for each optimized point spread function, to reset the adjustments for any desired steering-angle combination (i. e. without the need to repeat the optimization).

Now in preferred embodiments of its second major independent facet or aspect, the invention is somewhat similar to the above-introduced first independent facet—but differs particularly in these very important ways:

its afocal element can either enlarge or reduce the field of regard of the external article, so that this second aspect of the invention has broader utility (as explained elsewhere in this document, a reducing element can be employed to further sharpen pointing precision); and each mirror of the "at least one mirror" includes a mirror in a steerable mount having jewel, ceramic or other refractory bearings.

In this latter regard, the second aspect of the invention is thus related to one of the above-stated preferences for the first aspect. Further information about this second facet of our invention may be read from the corresponding appended claim.

The foregoing may represent a description or definition of the second aspect or facet of the invention in its broadest or most general form. Even as couched in these broad terms, however, it can be seen that this facet of the invention importantly advances the art.

In particular using refractory bearings can very greatly reduce friction in the mechanism—and thereby make an enormous difference in the potential speed of pointing adjustment for the mirror. Such a refinement essentially transports the entire optical system into an entirely new regime of capabilities, far exceeding what can be achieved with prior systems.

It is not necessary to choose between the response-speed benefits thus provided and the pointing precision of the first aspect of the invention. These features are fully compatible and can be used together.

Although the second aspect of our invention thus significantly advances the art, nevertheless to optimize enjoyment of its benefits preferably the invention is practiced in conjunction with certain additional features or characteristics. Preferably the includes some means for controlling each said at least one mirror in rotation about the plural axes, to detect and track such external article or articles.

The controlling means preferably include a magnet fixed to or integral with the mirror; and some means for applying variable magnetic fields to interact with the magnet and so magnetically develop torque that rotates the mirror. In addition we prefer that the controlling means also include some means for monitoring the mirror position, to develop positional or rotational feedback information used in rotating the mirror.

These monitoring means in turn preferably include an auxiliary optical that directs an auxiliary radiation beam to the back of the mirror and responds to the auxiliary beam after return from the back of the mirror, to determine rotational angle of the mirror. For instance in one preferred embodiment the auxiliary optical includes a position-sensing detector (PSD) that determines displacement of the returned beam at the back of the mirror. In an alternative preferred embodiment the auxiliary optical includes an interferometer that counts fringes to determine position of the mirror directly.

Another basic preference is that the optical include some means for controlling each mirror (of the "at least one mirror") in rotation about the plural axes, to follow a raster pattern for imaging at least portions of the external volume. In this case a subpreference is that the raster pattern be a spiral pattern. A further-nested preference is that the spiral raster pattern reverse direction, as between outward and inward spiraling, for alternate passes through the pattern.

Still according to the second aspect of our invention, we further prefer to include a beam-splitter operating to tap a wide-field-of-regard, high-resolution image out of the optical—more specifically, out of the main optical path—to a first imaging detector, at a point before incoming radiation in the reaches the at least one mirror. In this case a second imaging detector receives a narrow-field-of-view, high-resolution image from the at least one mirror.

This also preferably includes some means for interpreting resulting electronic signals from both imaging detectors, to display two nested portions of the volume on a single common visual monitor; and some means for controlling the mirror to position the narrow-field-of-view, high-resolution image selectively within the wide-field-of-regard, high-resolution image on the single monitor.

In preferred embodiments of its third major independent facet or aspect, our invention is a method of operating an optical system that has a dual-axis MEMS steering array. The array is made up, at least in part, of individual mirrors having: (1) transverse dimensions exceeding one centimeter, and (2) separate magnetic-field-inducing coils at opposite sides of each rotation axis, and (3) another magnet to interact with magnetic fields induced by the coils. Having this apparatus in mind, the method itself includes the steps of:

directing electrical currents to the separate coils of each mirror, to produce for each mirror at least two components of force, including:
a pair of variable forces directed in opposite linear directions, applying variable torque to the mirror, and
an additional variable net force thrusting the mirror outward from, or drawing the mirror inward toward, a rest plane or backing of the array as variable piston movement;

passing a light beam through an afocal optic to change magnification of the steering-array rotations; and determining characteristics of the light beam when received or transmitted.

The foregoing may represent a description or definition of the third aspect or facet of the invention in its broadest or most general form. Even as couched in these broad terms, however, it can be seen that this facet of the invention importantly advances the art.

In particular, operating the mirrors in this way enables the array to be used for diffraction control based upon the overall array dimension rather than only the dimensions of individual mirrors. Remarkably, the diffraction-limit improvement thus obtained can be as great as an order of magnitude.

Although the third major aspect of the invention thus significantly advances the art, nevertheless to optimize enjoyment of its benefits preferably the invention is practiced in conjunction with certain additional features or characteristics. In particular, preferably the method further includes a preliminary step of selecting a maximum transverse array dimension of approximately three centimeters or greater. This choice can cause the resolution to be on the order of forty to fifty microradians, or finer.

A further preference is that the preliminary step include selecting the maximum transverse array dimension as approximately five centimeters or greater. Yet further the preliminary step preferably include selecting the maximum transverse array dimension as approximately ten centimeters or greater. (As mentioned elsewhere, we prefer to select a maximum transverse array dimension not exceeding fifteen centimeters.)

Another preference is that the method exploit the potential benefits described above, by including steps of adjusting the two force components so that: (1) the several mirrors direct a light beam in a desired substantially common direction; and (20 light-beam wavefront portions from adjacent mirrors are generally in phase, to actually achieve a diffraction limit conditioned by the array dimension rather than by the individual mirror dimensions. In this case, as explained in the "Detailed Description" later in this document, preferably the generally-in-phase light-beam wavefront portions are in phase within roughly ten to twenty percent of one wavelength.

In preferred embodiments of its fourth major independent facet or aspect, the invention is a system method of operating an optical system that has a laser source for transmitting a radiation beam to an external object, and has a dual-axis steering mirror with overall transverse dimensions exceeding one centimeter, rotatable on jewel, ceramic or other refractory bearings. The method itself includes the steps of:

first, utilizing the dual-axis steering device to receive, and measure an incident angle of, an incident ray from the external object; and second, utilizing the dual-axis steering device to direct such a radiation beam from the laser source toward the external object in response to the received and measured incident ray.

The foregoing may represent a description or definition of the fourth aspect or facet of the invention in its broadest or most general form. Even as couched in these broad terms, however, it can be seen that this facet of the invention importantly advances the art.

In particular, this facet of the invention causes the refractory-bearing advantages of extremely high adjustment speed to be available for purposes of directing reply beams to remote objects. As noted earlier this feature is extremely valuable.

Although the fourth major aspect of the invention thus significantly advances the art, nevertheless to optimize enjoyment of its benefits preferably the invention is practiced in conjunction with certain additional features or characteristics. In particular, preferably the second utilizing step preferably includes directing such a radiation beam to disrupt functioning, or impair structural integrity of the external object.

Another preference is that the first utilizing step include operating the mirror at a peak of acceleration as a function of mirror thickness. If this preference is observed, then in turn preferably the first utilizing step includes preparing the mirror and magnet with a diameter of roughly one centimeter and thickness of roughly two or three millimeters.

Alternatively if it is not desired to use a mirror of diameter one centimeter, then preferably the first utilizing step includes the step of preparing the mirror with diameter and thickness scaled from that diameter of roughly one centimeter and thickness of roughly two or three millimeters, generally:

in inverse proportion to fourth power of mirror-and-magnet diameter, to account for inertia; and in linear proportion to mirror-and-magnet diameter, to account for location of application of most driving force;

for approximate net inverse proportion to the cube of the diameter, subject to further adjustment for increased flux in the magnet arising from such increased thickness.

Another preference is that the first utilizing step include operating the mirror at a minimum of response time as a function of mirror thickness.

In preferred embodiments of its fifth major independent facet or aspect, the invention is an optical system dynamically determining associated angular direction throughout a specified range of angular directions, of an external article in a volume outside the system. This optical system includes a radiation source, an optical detector, an entrance aperture and an afocal element, associated with the aperture. The latter element enlarges or reduces the field of regard of the external article and the volume as seen by the source and detector.

Also part of the system—and disposed along an optical path between (1) selectively, the source or detector and (2) the entrance aperture—is at least one mirror rotatable about plural axes and causing the source and detector to address varying portions of the volume outside the optical system. Each mirror of the at least one mirror has dimensions in a range exceeding five millimeters.

When the afocal element is enlarging the field of regard, together with rotation of the at least one mirror, and substantially without changing magnitude of the enlarging, the external article receives radiation from the source and returns the radiation to the detector throughout the specified range. When the afocal element is reducing the field of regard, pointing and steering precision is made finer by the ratio of reduction of the afocal element. In this fifth aspect of the invention, the aperture, afocal element, and at least one mirror together form a common optical path for the radiation from the source and to the detector.

The foregoing may represent a description or definition of the fifth aspect or facet of the invention in its broadest or most general form. Even as couched in these broad terms, however, it can be seen that this facet of the invention importantly advances the art.

In particular, this facet of the invention can be used to apply the above-mentioned steering precision and speed in the context of an active optical system—for example a lidar ranging system.

Although the fifth major aspect of the invention thus significantly advances the art, nevertheless to optimize enjoyment of its benefits preferably the invention is practiced in conjunction with certain additional features or characteristics. In particular, preferably the optical system further includes means for operating the system in a laser application for communications.

In preferred embodiments of its sixth major independent facet or aspect, the invention is an optical system dynamically determining associated angular direction throughout a specified range of angular directions that defines a field of regard of the system, of an external article in a volume outside the system; the optical system includes a radiation source, an optical detector, an entrance aperture, and an afocal element—associated with the aperture—reducing the field of regard of the external article and the volume as seen by the source and detector.

In this system each mirror of the at least one mirror has dimensions in a range not exceeding five millimeters. The foregoing may represent a description or definition of the sixth aspect or facet of the invention in its broadest or most general form. Even as couched in these broad terms, however, it can be seen that this facet of the invention importantly advances the art.

In particular, this system provides very fine pointing precision, arising from the reduction at the afocal element—but achieves this in a system having modest aperture.

Even though this sixth facet of the invention thus significantly advances the art, nevertheless to optimize enjoyment of its benefits preferably the invention is practiced in conjunction with certain additional features or characteristics. In particular, preferably this facet of the invention is advantageously refined further by application of any, or most, of the preferences introduced above for other aspects of the invention.

In preferred embodiments of its seventh major independent facet or aspect, the invention is an optical system dynamically determining associated angular direction throughout a specified range of angular directions, of an external article in a volume outside the system; the optical system includes a radiation source, optical detector, and entrance aperture—but no afocal element. It does include system at least one mirror rotatable about plural axes, causing the source and detector to address varying portions of the volume outside the optical system.

Each mirror of the at least one mirror has dimensions in a range exceeding five millimeters. The mirror has sufficient angular-deflection range that the external article receives radiation from the source and returns the radiation to the detector throughout a field of regard equal to at least sixty degrees, notwithstanding absence of an afocal element.

The foregoing may represent a description or definition of the seventh facet of the invention in its broadest or most general form. Even as couched in these broad terms, however, it can be seen that this facet of the invention importantly advances the art. In particular, this system achieves most of the objectives of other invention facets discussed in this document—more specifically, all the objectives except the finer pointing precision associated with an afocal element—in a less-complex and less-expensive apparatus.

Here the cost and complexity of an afocal element are avoided. Additional details of such a system are presented in a later section of this document.

Although the seventh major aspect of the invention thus significantly advances the art, nevertheless to optimize enjoyment of its benefits preferably the invention is practiced in conjunction with certain additional features or characteristics. In particular, preferably the mirror has sufficient angular-deflection range that the external article receives radiation from the source and returns the radiation to the detector throughout a field of regard equal to ninety degrees, in at least one rotational axis.

In preferred embodiments of its eighth major independent facet or aspect, the invention is a passive optical system—having no radiation source to initiate return from remote objects—dynamically determining associated angular direction (throughout a specified range of directions) of an external article in a volume outside the system. The optical system includes an optical detector, entrance aperture, and afocal element.

The afocal element is associated with the aperture. It enlarges the field of regard of the external article and the volume as seen by the source and detector. Also in the system, disposed along an optical path between (1) selectively, the source or detector and (2) the entrance aperture, is at least one mirror rotatable about plural axes and causing the detector to address varying portions of the volume outside the optical system. Each mirror of the at least one mirror has dimensions in a range exceeding five millimeters.

Due to the enlarging of the field of regard together with rotation of the at least one mirror, and substantially without changing magnitude of the enlarging, the external article receives radiation from the source and returns said radiation to the detector throughout the specified range. The aperture, afocal element, and at least one mirror together form a common optical path for said radiation from the source and to the detector.

These and other principles and advantages of the invention will be fully understood from the following description of preferred embodiments, considered together with the accompanying illustrations, of which:

BRIEF DESCRIPTION OF THE DRAWINGS

FIG. 31 is a system diagram, highly schematic, showing aspects of our invention that incorporate one or more MEMS mirrors of the "new generation" discussed in the "BACKGROUND" section of this document (see related notes following this list);

FIG. 32 is a like diagram of two representative FIG. 31 mirrors in an end-to-end array and with the FIG. 31 base, but now seen edge-on and particularly shown with the mirrors rotated away from the common base angle (here forty-five degrees) by an arbitrary, illustrative amount (roughly nine degrees); and further with one of the mirrors adjusted also in piston, to a position 112' as shown in the broken line, for reasons explained herein;

FIG. 35 is a graph of flux density generated by our FIG. 33 FSM magnetic circuit, as a function of current;

FIG. 36 is a top plan view of the mirror, together with one "mu-metal" arm used in the same magnetic circuit;

FIG. 37 is a pair of diagrams, quite schematic, defining some parameters (magnetic field, coil length and coil circumference, of a magnetic-field coil with an air core—used in certain variants of the FIG. 33 circuit;

FIG. 38 is a like diagram defining relationships between magnetic moment and torque, for the same circuit;

FIGS. 1 through 5, 7 through 10, 12, 18, 19, 33, and 41 through 43 are very generally to scale.

In FIG. 31, for the sake of simplicity, mirror control coils and resulting forces are explicitly illustrated for only a single axis of rotation. It is to be understood that the coils and forces are closely analogous for the orthogonal direction, just as illustrated in FIGS. 29 and 30 respectively. Preferably, however, one of the rotational directions is managed by use of a MEMS or FSM steering frame (not shown) surrounding the mirror pad and carrying coils for driving in that direction, as shown in FIG. 27 and discussed in the above-mentioned patent documents of Bernstein and Taylor. If desired, dual-axis rotation of a single mirror-carrying element can be substituted, as also described in those documents. FIG. 31 is meant to represent both these kinds of dual-axis implementation, and also several other system variants as more fully detailed below.

Figure 1:
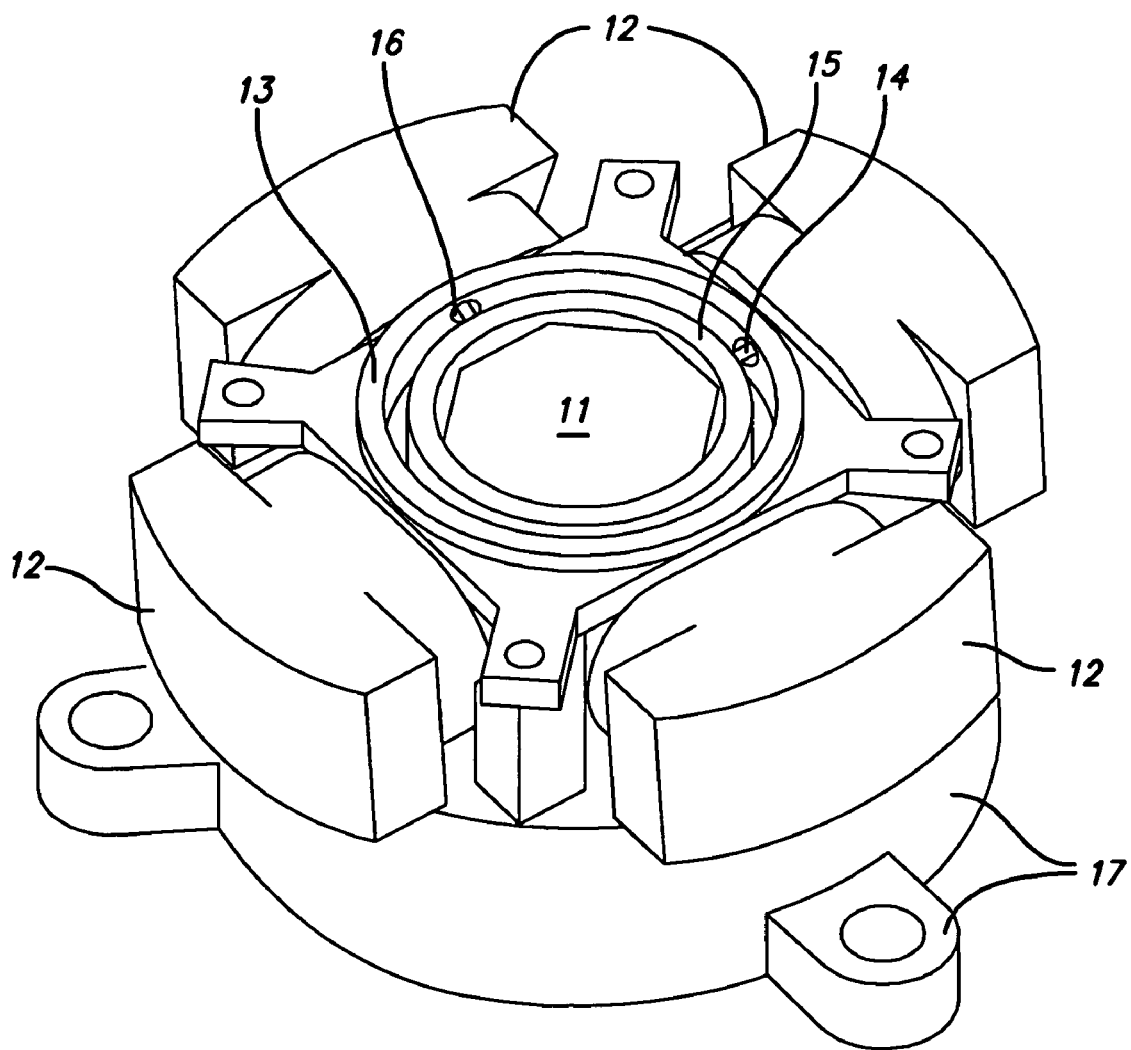
FIG. 1 is a perspective or isometric view of an operational two-axis-controllable prototype octagonal servoed-steering-mirror assembly—a diagram of a fast scanning mirror (FSM), which we sometimes call a "mini-scan-mirror" (MSM)

Thus portions of FIG. 31 are representative of a single electromagnetically controlled mirror 311 with a rotational axis 317; or equally well of an end-to-end two-mirror array 311, 312 with spaced-apart rotational axes 317, 318; or also equally well representative of a side-by-side two-mirror array 311, 314 with axis 317—or 312, 315 with like axis 318, etc.—or of a larger array such as the six-mirror assembly 311-316 expressly shown. In each case the coils e. g. 311*c*, 311*d*, in cooperation with magnets that may e. g. be in the base 319, provide respective forces 311*a*, 311*b* or 312*a*, 312*b* for rotation of the respective mirror(s) 311 etc. about the corresponding axis or axes and flexure(s) 317.

FIG. 31 also includes an auxiliary optical system 331-339 for purposes related to optimizing imaging sharpness, as detailed below. The drawing further includes a generalized element 351, which represents any of several supporting or utilization devices, or combinations of such devices, that are advantageously incorporated into the system. The possible devices are enumerated and discussed in following sections of this document.

DETAILED DESCRIPTION OF PREFERRED EMBODIMENTS

Preferred embodiments of our invention provide an optically agile imaging system, with related methods, based upon certain active optical components—in combination with a servoed-beam-steering subsystem according to the coowned patent documents listed earlier. The result encompasses a small, lightweight and relatively economical sensor technology.

This technology is most typically, but not necessarily, for use with small unmanned vehicles—whether aerial or otherwise—as well as manned craft and indeed stationary installations. Preferred embodiments of the invention have several practical applications mentioned earlier.

The resulting capabilities enable e. g. commercial air traffic systems, astronautical operations and military agencies to enjoy very greatly enhanced but low-cost imaging—including persistent surveillance and pointing. Advanced imaging, using electronically addressable pointing and imaging capability without a conventional gimbal, enclosing the entire optical system, provides the basis for lightweight, low-power, reliable imaging performance.

OPTICAL SYSTEM WITH FAST SCANNING MIRROR ("FSM")—This invention provides a small, low-friction steering mirror that can scan, very rapidly in two orthogonal directions—on jewel bearings or equivalent. In performance terms, for most comparisons, equivalents to jewel bearings include bearing surfaces made of ceramic and other refractory materials.

For purposes of this document, the term "refractory" adheres to conventional definitions in engineering etc., namely materials that are difficult to work, or that are extremely hard, or sometimes that have a high melting point or are "difficult" to melt. Accordingly, refractory bearings include, without limitation: ceramics, cast materials such as used in making tiles and furnace linings, some types of concrete or cement, gemstones, synthetic gems (including original Hart artificial diamonds), and other tough minerals. Related classes of potentially useful materials are refractory plastics, known in the marketplace, and refractory metals such as tungsten, molybdenum and alloys. Most such plastics, however, at present are inadequately stable for our purposes—particularly under heat or relatively high stress.

Most such materials can be cast or otherwise formed by various techniques. Vapor deposition appears particularly promising.

Current-day websites with details about low-friction coatings include, among others—

Composite Diamond Coatings:
enduracoatings.com/prod1100f.asp
enduracoatings.com/prod1100b.asp
Thin-Film Coatings:
pvd-coatings.co.uk/MoST-coating.htm
industrialcoatingsworld.com/Low-Friction-Coatings/Vapor-Deposition-Low-Friction-Coatings.html
industrialcoatingsworld.com/Low-Friction-Coatings/Dry-Film-Lubricants-Low-Friction-Coatings.html
and:
suncoating.com/molykote.html.

(As will be understood, in a web browser any one of these URLs must be entered all in one continuous line, e. g. with no line break between "Coatings/" and "Vapor".)

For example, the PVD site discusses molybdenum disulphide, said to have "an ultra low coefficient of friction (0.01-0.06)". As another example, the "EnduraCoatings" links relate to composite diamond coating.

In this patent document it will be seen that friction is a very important and rather complicated topic for best practice of certain embodiments of our invention. For full enabling disclosure of the best modes of practice, that topic will be taken up in considerable detail, in succeeding sections of this document.

Scanning is very fast, because the control bandwidth in one or both rotational axes is on the order of twice that attainable with proposed systems of Bernstein (Draper Corporation), which are based on monolithic silicon construction and have unitary torsional springs as flexures. Hence our steering mirror can be used for extremely rapid and accurate generation of an optical raster, or object tracking.

Furthermore if desired this invention can be implemented with zero rotational restoring force, so that rotational position tends to be quite stable without application of large continuing positional force. For maximum excursion we prefer to drive the mirror magnetically as detailed below; however, other rotational drive arrangements are readily available.

In some preferred embodiments the mirror has a permanent magnetic field along the Z axis (FIGS. 12 through 15, and 37). This field facilitates rotating the mirror about the local X and Y axes by application of current to nearby electric coils, resulting in respective magnetic fields. The fields interact with the permanent Z-axis field to create torque, impelling the mirror about the X and Y axes.

Figure 6A:
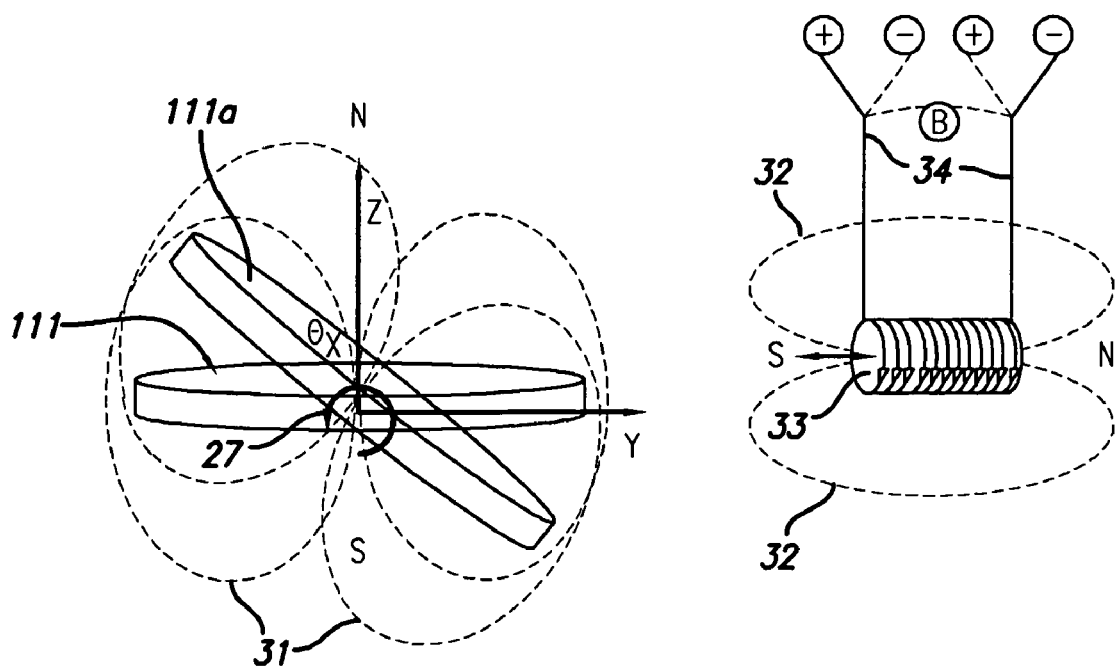
FIG. 6 is a pair of drawings showing an electromagnetic drive for the FIG. 4 production mirrors—the "A" view being a conceptual sketch showing operational principles; and the "B" view being generally like FIG. 1B (but for a production system)
Figure 6B:
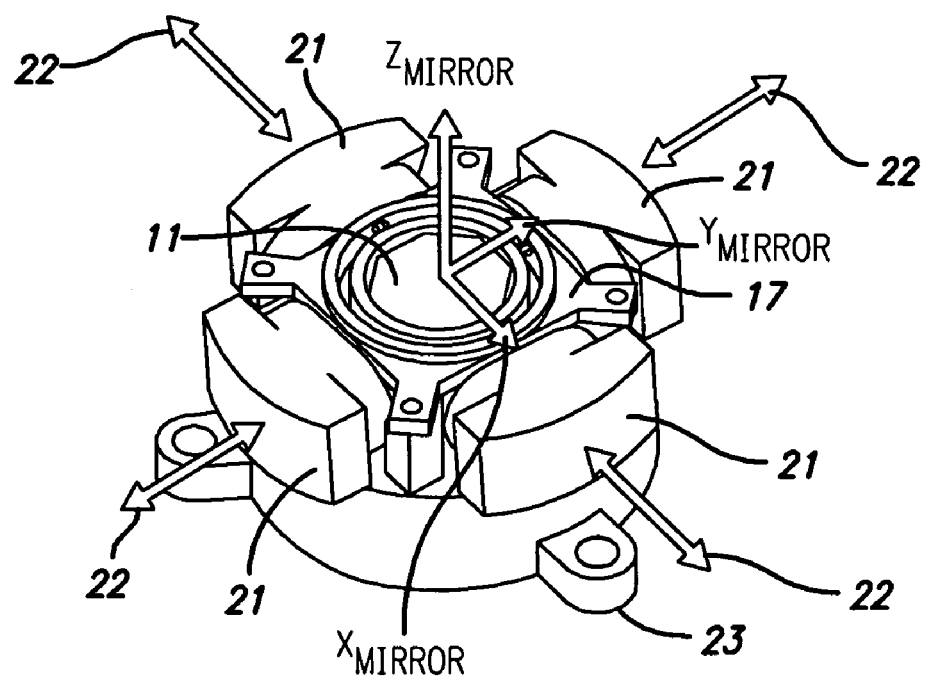
Figure 7:
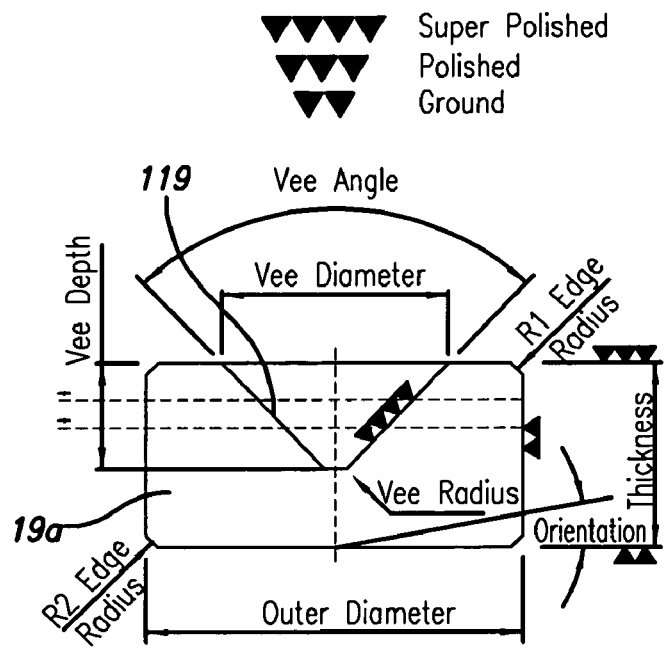
FIG. 7 is a longitudinal-section (i. e., taken in a plane along the central axis) of a "vee"-style (i. e., "V-shaped" in longitudinal section) jewel bearing.

The one or more electromagnetic coils 12 (FIGS. 1 and 12), 21 (FIG. 6B), 412*a-d* (FIG. 33) are switched or modulated (or both) to create attractive and repulsive magnetic forces that result in a net torque on the scan mirror (FIG. 38). Switching between positive and negative voltages reverses current through the coils, providing magnetic field of desired direction. Additionally, one or more coils can be simultaneously switched to a "brake" terminal B that electrically completes the coil conduction path—resulting in back-emf that brakes the rotating mirror, e. g. about $q_X$.

Figure 4A:
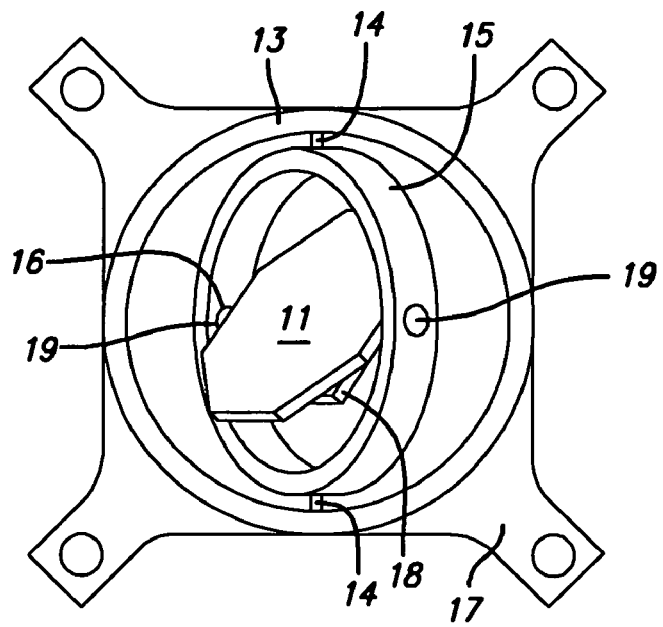
FIG. 4 is a set of views of two-axis FSM or "MSM" mirrors that we consider best implemented with jewel bearings, or variant refractory bearings—
  the "A" view being in perspective or isometric, taken very generally from the "front" side (the radiation-beam steering side), with the gimbal-like steering elements rotated out-of-plane for a clearer view of the several parts—and for a prototype octagonal configuration,
  the "B" view being likewise from the front and for the same device but with the steering elements rotated into an overall-flat orientation,
  the "C" view being analogous to the "B" view but taken from the rear,
  the "D" view being a group of three mechanical drawings showing the same device from above (left-hand subview), side (central subview) and rear (right-hand subview) indicating dimensions in millimeters,
  the "E" view being a drawing like the "A" and "B" views, but "exploded", of a steering module using the same prototype mirror,
  the "F" view being a view like the "A" and "B" views, but showing only the prototype-mirror subassembly (made up of an octagonal mirror together with intimately associated support and rotation elements), individually,
  the "G" view being a like view of a prototype inner support/ steering ring, also usable for a production model,
  the "H" view being a like view of a prototype or production outer ring, and
  the "I" view being like the topmost views in the "E" view, but for a variant mirror having reflective surfaces formed directly on both sides of the magnet, and an axle or axles attached to the magnet directly.
Figure 4B:
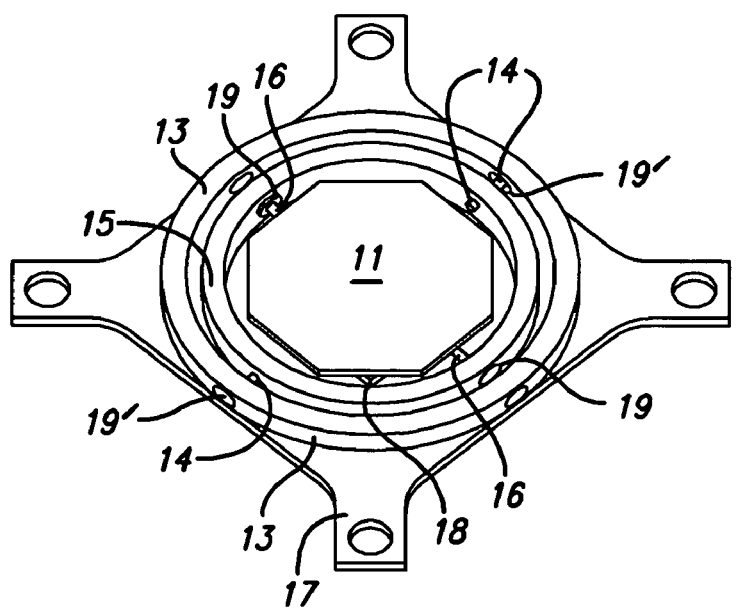
Figure 4C:
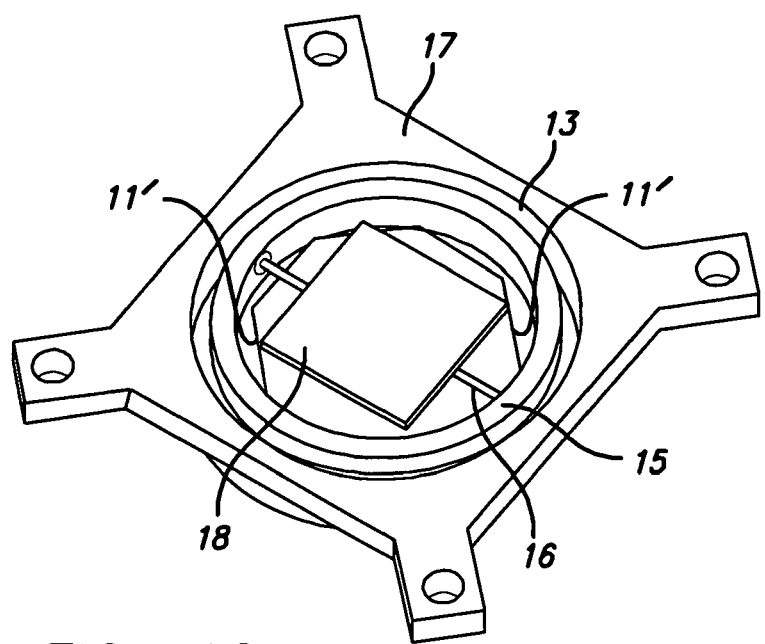
Figure 4D:
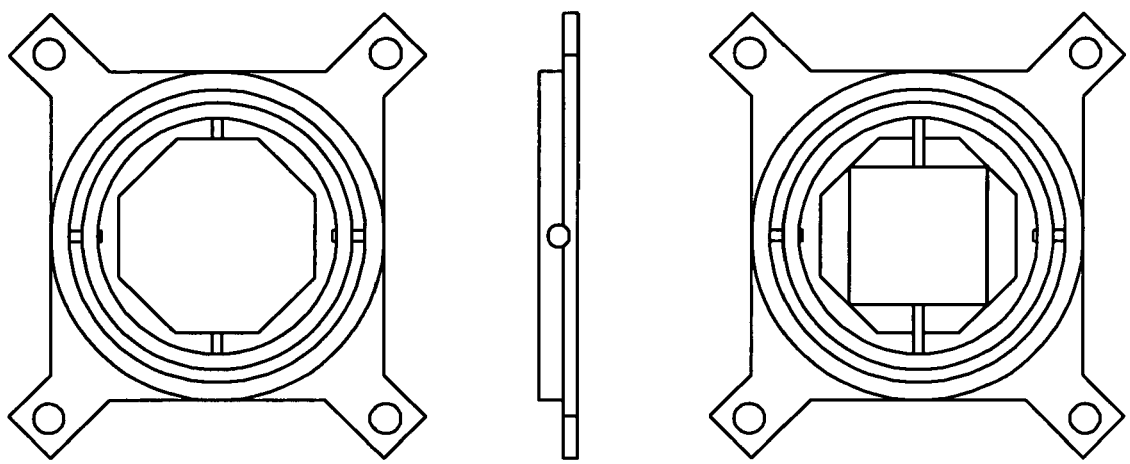
Figure 4E:
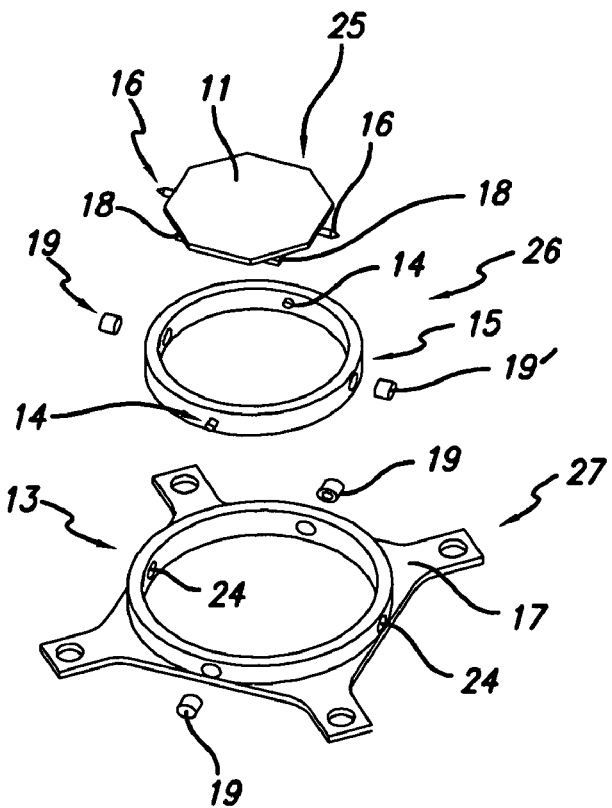
Figure 4F:
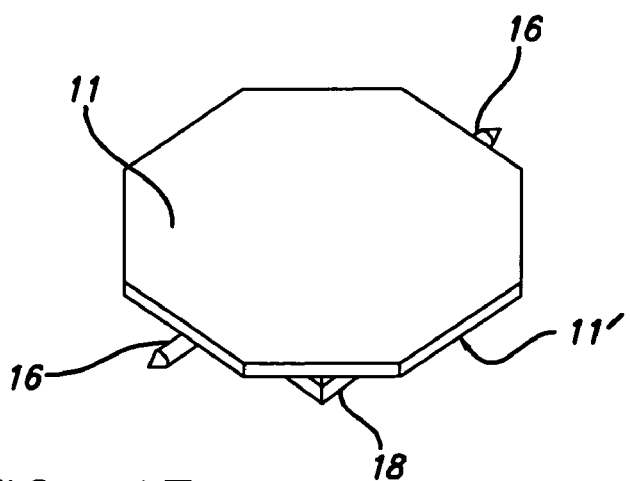
Figure 4G:
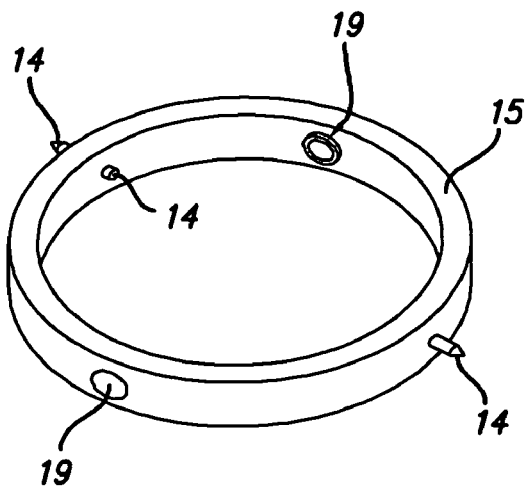
Figure 4H:
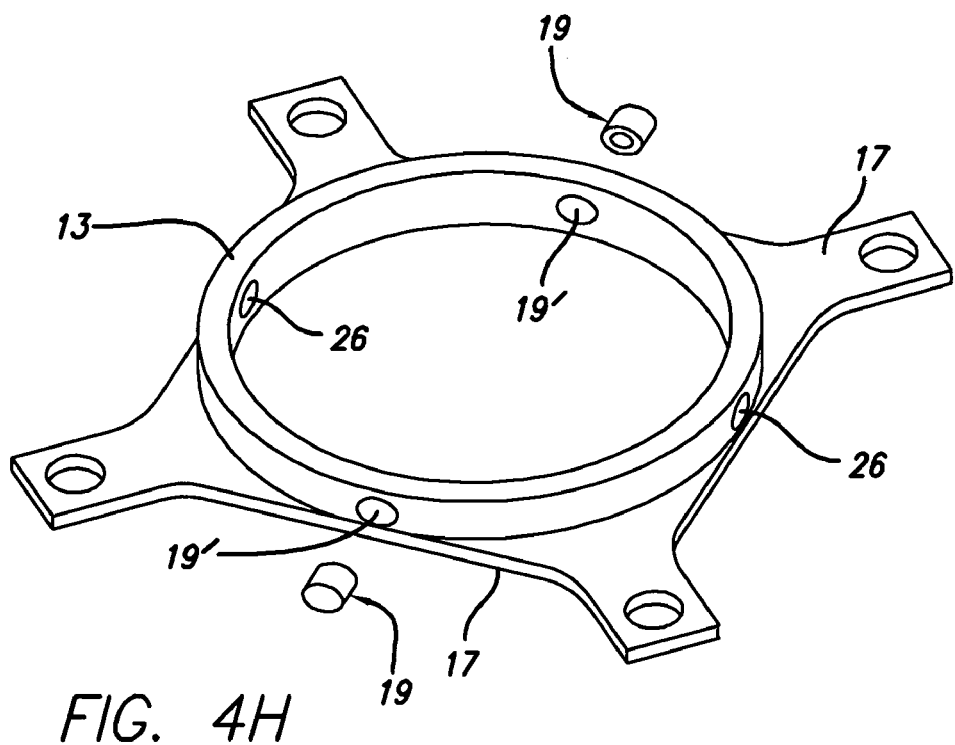

The steering module (FIGS. 4A through 4E, and 5A), allowing for rotation in two axes, comprises three major components: the mirror subassembly 11, 16, 18, 25 (see also FIGS. 4F, 4I and 5B), inner ring 15, 14, 19, 15 (see also FIG. 4G), and outer ring 13, 17, 24, 19, 27 (see also FIG. 4H). The mirror subassembly rotates on two opposing pivot points 16, 19 inside the inner ring. Together, the mirror subassembly and inner ring rotate about another set of pivot points 14, 19' between the inner and outer rings and mounted at right-angles to the pivot points between the mirror subassembly and inner ring—thus providing independent orthogonal rotations of the mirror. The mirror subassembly is driven in rotation by a set of four or more electromagnetic coils 12, 21, 412*a-d* mounted around the perimeter of the steering mirror as noted above.

In the Japanese inventions mentioned earlier, the angular range is very small, at best three degrees on only one axis. In comparison the preferred jewel-bearing and equivalent embodiments of our invention are—by design—able to achieve mechanical-excursion angles exceeding 25 degrees in both axes. A jewel-bearing design also provides large apertures, from seven millimeters to three and even five centimeters, which are not practical with the silicon torsion-flexure design. Our invention contemplates still-higher apertures, to the order of e. g. ten centimeters and more, without major modifications in design considerations or scaling techniques.

MIRROR ASSEMBLY—In our preferred prototype embodiments the mirror subassembly 25 (FIG. 4E) comprised a ten-millimeter octagonal mirror 11 of silica, a seven-millimeter grade-N50 neodymium magnet 18, and an axle 16 made of 300-series stainless steel—bonded together with epoxy.

Figure 4I:
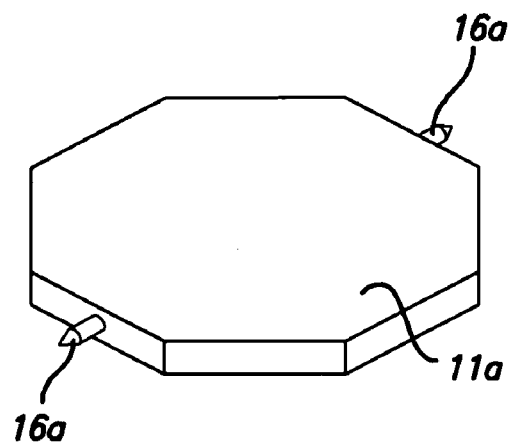
Figure 5A:
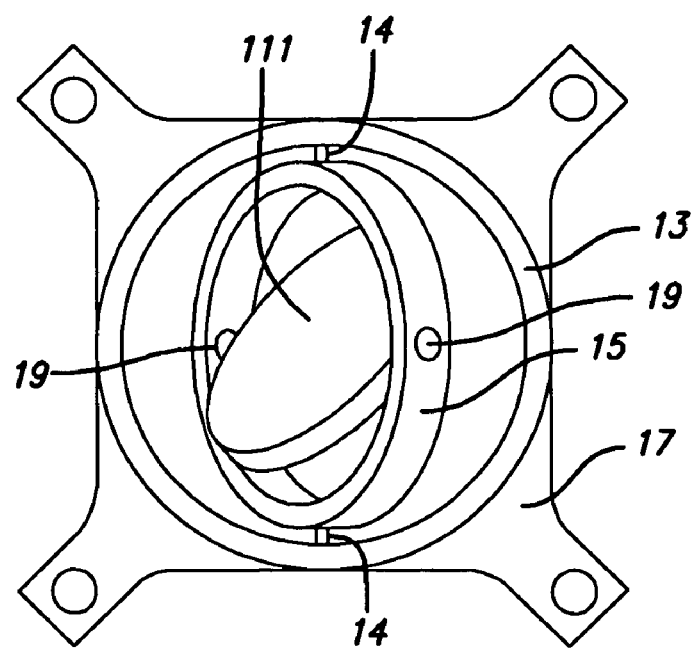
FIG. 5 is a pair of drawings—"A" and "B" views like FIGS. 4A and 4I respectively—but for a circular production mirror rather than the octagonal prototype.
Figure 5B:
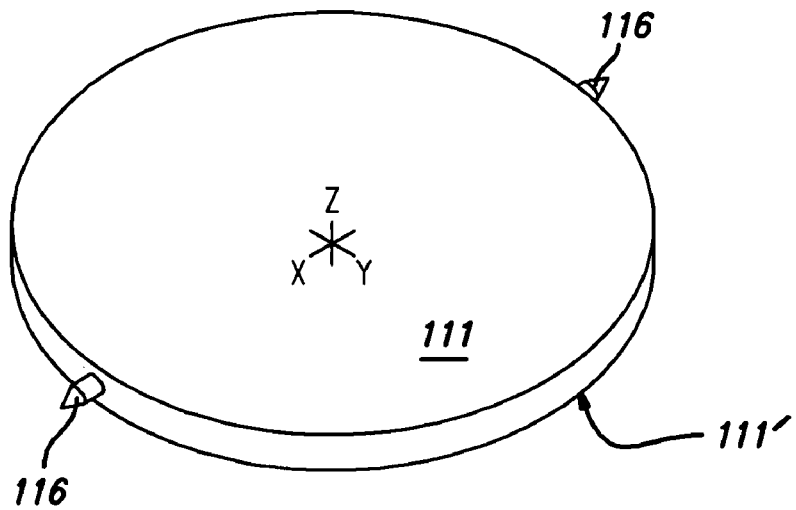

Because the center of gravity (CG) was not located through the center of the axis of the pivot points 16, this configuration (although quite excellent in comparison with all known prior art) was not ideal. Accordingly, the production version of the mirror subassembly contemplates simplifying the design by combining the mirror and magnet into one piece (FIGS. 4I, 5A, 5B). In this preferred design the production mirror consists of a magnetic material (grade-N50 neodymium)—plated and then polished to an optical-grade mirror finish, optionally on both sides. (Being symmetrical, such a mirror cannot be installed "upside down".)

This design allows alignment of the pivot points with the magnet CG. The back of the mirror, in this configuration, can be used as part of an optical-position sensor for the control feedback loop.

In such a design the mirror pivots form a nonmagnetic axle that rides in a bearing 19 (FIG. 4A). The axle pins 16 can be made part of the mirror assembly 25 and the bearings 19 part of the inner ring 15 (FIGS. 4A. 4B) or vice versa, as preferred.

(In purest principle it would even be possible to make one of the axle pins 16 part of the mirror assembly 25 and the mating bearing 19 part of the inner ring 15—but then to reverse these allocations for the opposite one axle pin 16, i. e. making it part of the inner ring 15, and its mating bearing 19 part of the mirror assembly 25. Such an arrangement might function poorly because of frictional or weight imbalance between the two edges of the mirror assembly. Analogous considerations apply to the axle pins 14 and mating bearings 19' at the outer ring.)

Alternatively the pivot points can be attached to an additional intermediate structure. The mirror/magnet can be mounted to that additional structure.

It will now be seen that preferred embodiments of our invention yield several important benefits: increased apertures that MEMS devices cannot provide, translational stability in X, Y, and Z axes that prior "big mirrors" do not provide, no requirement for isolation in high vibration environments, reduced power demand to drive the mirror, and very greatly reduced weight relative to other steering systems. Especially critical is the much higher bandwidth for step response.

In the current state of our FSM development, the natural resonant frequency of our mirror/magnet assembly is roughly two kilohertz. The driven response bandwidth is typically one hundred to two hundred hertz, but much higher (e. g. one kilohertz) with refined control-system design and components.

It is also very clear that the response bandwidth as driven can be made far higher still, with advanced electronics not yet available. Such new components will provide, for example, a faster CPU clock or A/D clock, or both. In addition the apparatus will preferably operate with higher magnetic fields.

For apertures below some 5 mm, such FSM embodiments are not usually applicable—but for fine diffraction control this limitation is not ordinarily meaningful. Also, consistency in the assembly process, as between devices, is not quite as good as in monosilicon MEMS constructions, made by is techniques similar to those used in integrated-circuit lithographic techniques.

INNER RING—The inner ring plays a key role in the design. In our prototype it is an aluminum ring approximately 12 mm in diameter and 2 mm thick. It also contains pivot points for both the mirror subassembly and the inner ring itself, allowing the mirror to rotate about both axes.

As with the mirror subassembly, the inner ring shown is a prototype. We may elect to change the shape and pivot configuration for the production version—for example to provide spring preload for the pivot points. The ring can be made of nonmagnetic material such as an aluminum alloy, beryllium, beryllium-copper, titanium alloy, tungsten, 300-series stainless steel, silica or other suitable substance.

OUTER RING—The outer ring 13 (FIGS. 4E, 4H) has two primary functions: it mounts the overall steering-mirror assembly to the base structure 23 (FIG. 1B), and holds one side of the pivots for the inner ring. In the production version we will either enlarge it or remove it completely, so that the electromagnetic coils 12, 21 can be mounted closer to the mirror assembly and thereby increase the torque that the electromagnets can apply to the mirror assembly. FIGS. 7 through 10 are after current websites at industrialjewels.com, particularly pages vee_jewel.htm, ring_jewel.htm, swissjewel.com/sapphire_ring_jewel_stock_sizes.htm; and smallparts.com/products/descriptions/vjpx.cfm—dimensions in the latter being stated in millimeters.

Figure 8:
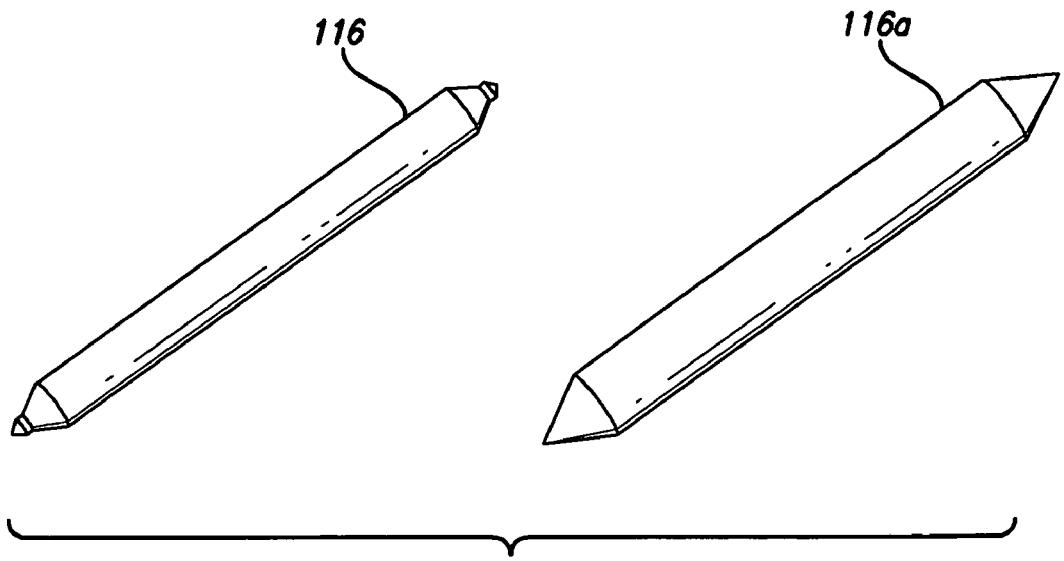
FIG. 8 is a perspective view of two stainless-steel pivots for use with the FIG. 12 bearing.
Figure 9:
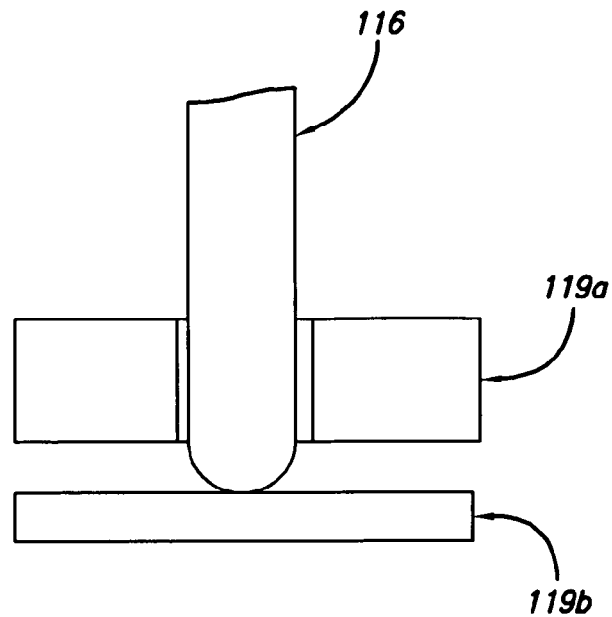
FIG. 9 is an elevation of a ring-style bearing, shown with a shaft and an end stone—with the ring itself in longitudinal section.
Figure 10:
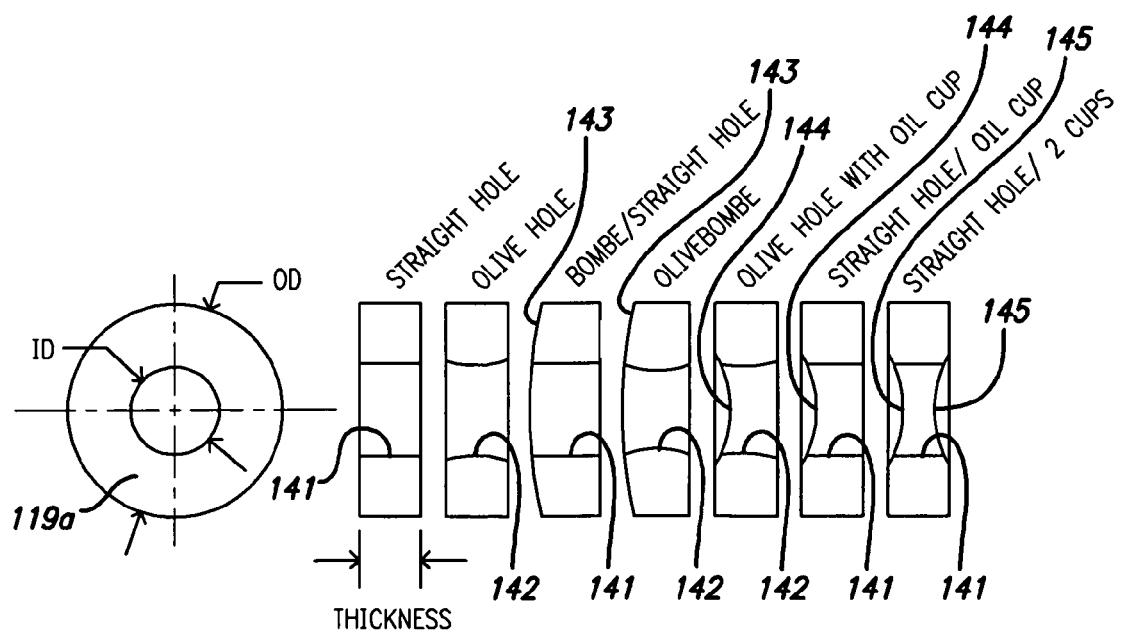
FIG. 10 is a set of mechanical layouts—namely one common front view and seven different side views in longitudinal section—for jewel (e. g. sapphire) bushings having seven corresponding different shapes, namely (from left): straight hole, "olive" hole (having a curved longitudinal section), "bombé" face (having a curved cross-section) with straight hole, bombéface with olive hole, oil-cup face with olive hole, oil-cup face with straight hole, and double-cup faces with straight hole, respectively.

PIVOT POINTS (JEWEL BEARINGS)—Two suitable jewel-bearing configurations are the "vee" (FIG. 7) and "ring" (FIGS. 9 and 10). Our prototype incorporates a vee bearing for both pivots; however, ring bearings are more rugged and may be preferred for final construction. The vee configuration uses nonmagnetic stainless-steel pivots (FIG. 8) that ride in vee bearings. These various components are used in precision instruments such as analog ohm/voltmeters and compasses, but never heretofore in steering-mirror systems.

The ring configuration has a steel shaft that rides in e. g. a ring-shaped sapphire bushing 119*a* (FIG. 9) and is held in place axially with a sapphire endstone 119*b*. If the bearing assembly will be used in a high-shock or -vibration environment the endstone is spring loaded. The latter arrangement is commonly used for light-shock applications; a silicone cushion, for high-shock loads up to 1000 g's. A ring jewel with an "olive" hole 142 (FIG. 10, hole with radius) offers lower friction. The radius surface of the hole provides minimum contact with the pivot, and thereby minimum friction.

From the foregoing discussion of our fast scanning-mirror (FSM) details, we now turn to details of our two-axis feedback sensors.

Figure 12:
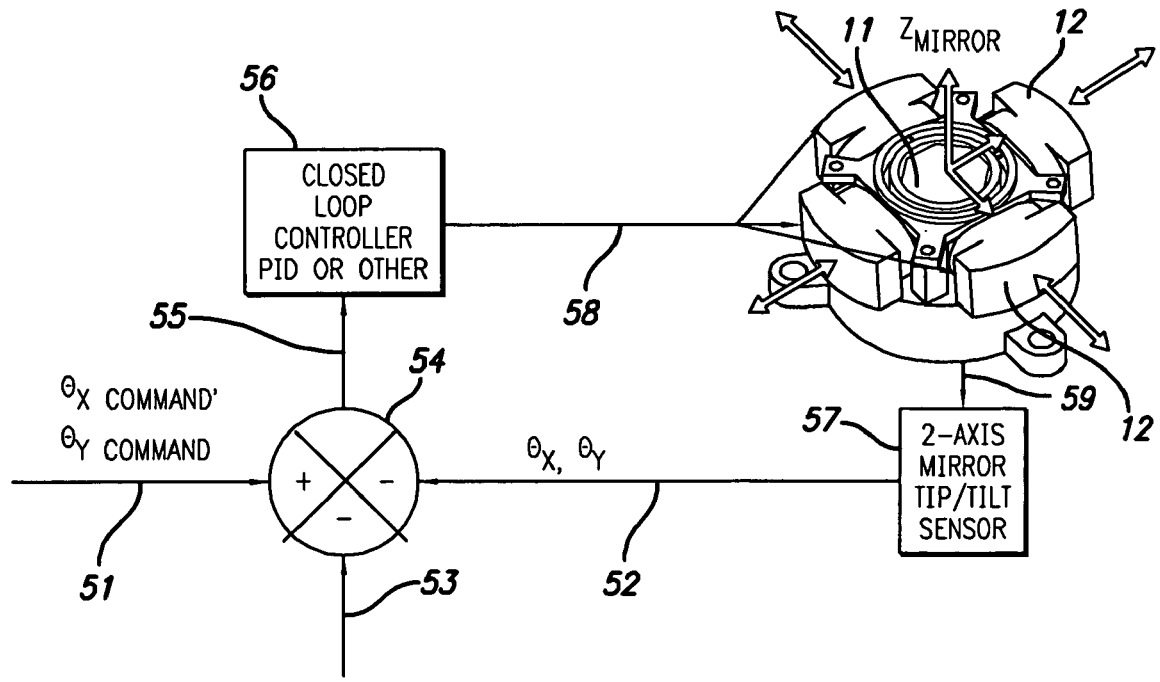
FIG. 12 is an electrical schematic, somewhat conceptual, of a circuit for closed-loop control of a scan mirror—the schematic being juxtaposed with a drive-apparatus drawing like FIG. 6B.
Figure 13:
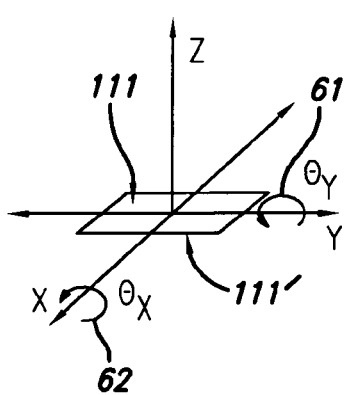
FIG. 13 is a basic conceptual diagram of three-dimensional geometry for a steerable mirror as shown in FIGS. 1 through 10.
Figure 14:
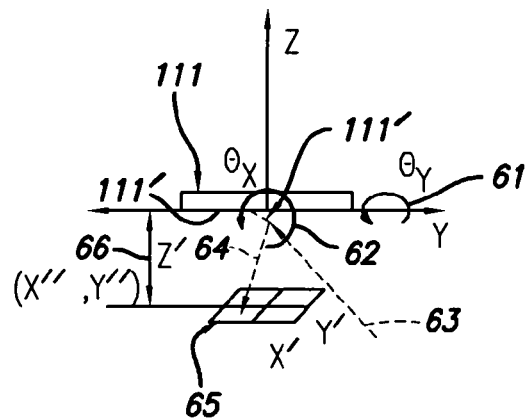
FIG. 14 is a like diagram indicating how mirror angular position is monitored by an embodiment of our invention that uses an areal detector and a reflector at the back surface (not used for beam steering) of a steering mirror.
Figure 15:
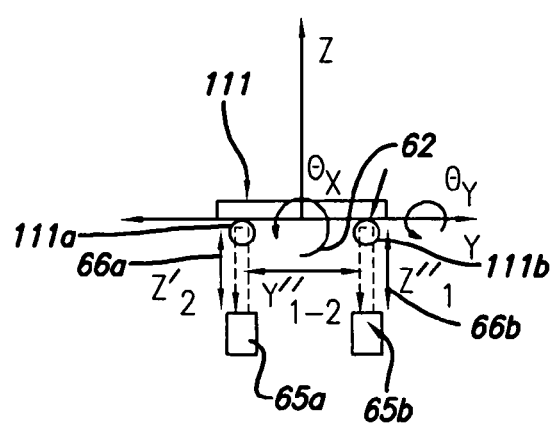
FIG. 15 is a like diagram indicating how mirror angular position is monitored by an alternative embodiment that uses a pair of retroreflectors at the back surface of the mirror, with a fringe-counting laser interferometer.

TWO-AXIS TIP/TILT SENSOR—We prefer to use a local tip/tilt sensor, which measures $q_X$ and $q_Y$ position, velocity or acceleration, in a negative-feedback control loop 52 (FIG. 12). This local feedback is combined with inertial feedback 53, and subtracted from the desired angular position, velocity or acceleration command 51.

For each rotational degree of freedom, this difference is provided to the controller—a position, integral, derivative ("PID") or other suitable controller. Resulting electromagnetic-coil commands (currents) 58 are then provided to the coils 12, driving the mirror by magnetically induced torque.

Preferred embodiments of our invention contemplate two approaches—primarily alternatives—for a sensor to measure changes in angle about the two rotational axes of a mirror. In a first approach, access to the back of the mirror is required, but the front (beam-steering reflective surface) of the mirror is left unobscured.

The mirror can rotate 62, 61 about two nominally orthogonal axes, X and Y (FIG. 13), relative to the front reflecting surface whose normal is Z. According to the first approach, a laser source 63 (FIG. 14) is directed toward an auxiliary reflecting element 111' located on the back surface of the mirror 111, i. e. the "–Z" side. This element reflects the laser-source beam 63 along a path 64 toward a two-dimensional ("2-D") areal detector 65.

This detector could be a position sensing detector, a quad detector or a detector array with multiple elements. The areal detector 65 measures the location (x', y') of the reflected laser beam 64 onto a plane parallel to the original nonrotated X-Y mirror plane X', Y'. As the mirror rotates about the X and/or Y axis the angular rotation about $q_X$ and $q_Y$ can be estimated, given knowledge of the (x',y') detector measurement and knowledge of the distance Z' from the mirror. The angles about the axes are respectively calculated by defining:

angle1=arcsin($x'/r$) and angle2=arcsin($y'/r$*cos(angle1))

where r=sqrt($x^2+y^2+z^2$)—or to the first order if we have small angles and the PSD is "far" away we can reduce this to arcsin(x'/Z') and arcsin(y'/Z'). In this regard, the distance of the mirror reflective surface from the center of rotation establishes the denominator for a sine or cosine effect.

The second preferred measurement approach uses a retroreflector interferometer pair 111*a*, 111*b* (FIG. 15) that measures the change in relative distance $Z'_2$, $Z''_1$ between fringe-counting interferometers 65*a*, 65*b* and the retroreflectors 111*a*, 111*b* respectively. The retroreflectors are attached to the back of the mirror 111; and the interferometers, to a fixed base (not shown).

By tracking the change in distance between the retroreflectors ($Z''_1$–$Z''_2$) and knowing the relative distance $Y''_{1-2}$ between elements 65*a*, 65*b* of the interferometer pair, this system finds the rotational angle $q_X$ about the X axis—as equal to arctan(($Z''_1$–$Z''_2$)/$Y''_{1-2}$. Similarly a third retroreflector interferometer set (not shown) that is not in line with the first pair 65*a*, 65*b* can be used with one or both of those other sets to measure rotation $q_Y$ about the Y axis.

A three-set configuration can also be used to measure displacements, in Z, of the plane containing the three retroreflective elements 111*a*, 111*b*. The retroreflective elements can include a sphere or cubical corner, which reflects entering light to leave the reflector parallel to the incoming light-propagation vector.

Figure 16:
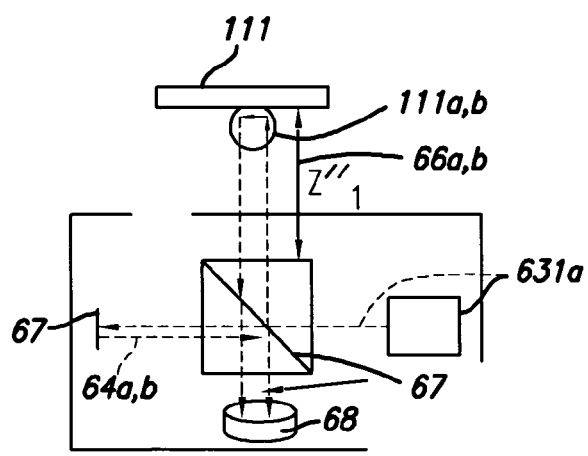
FIG. 16 is a like diagram showing detail of the FIG. 15 interferometer.
Figure 17:
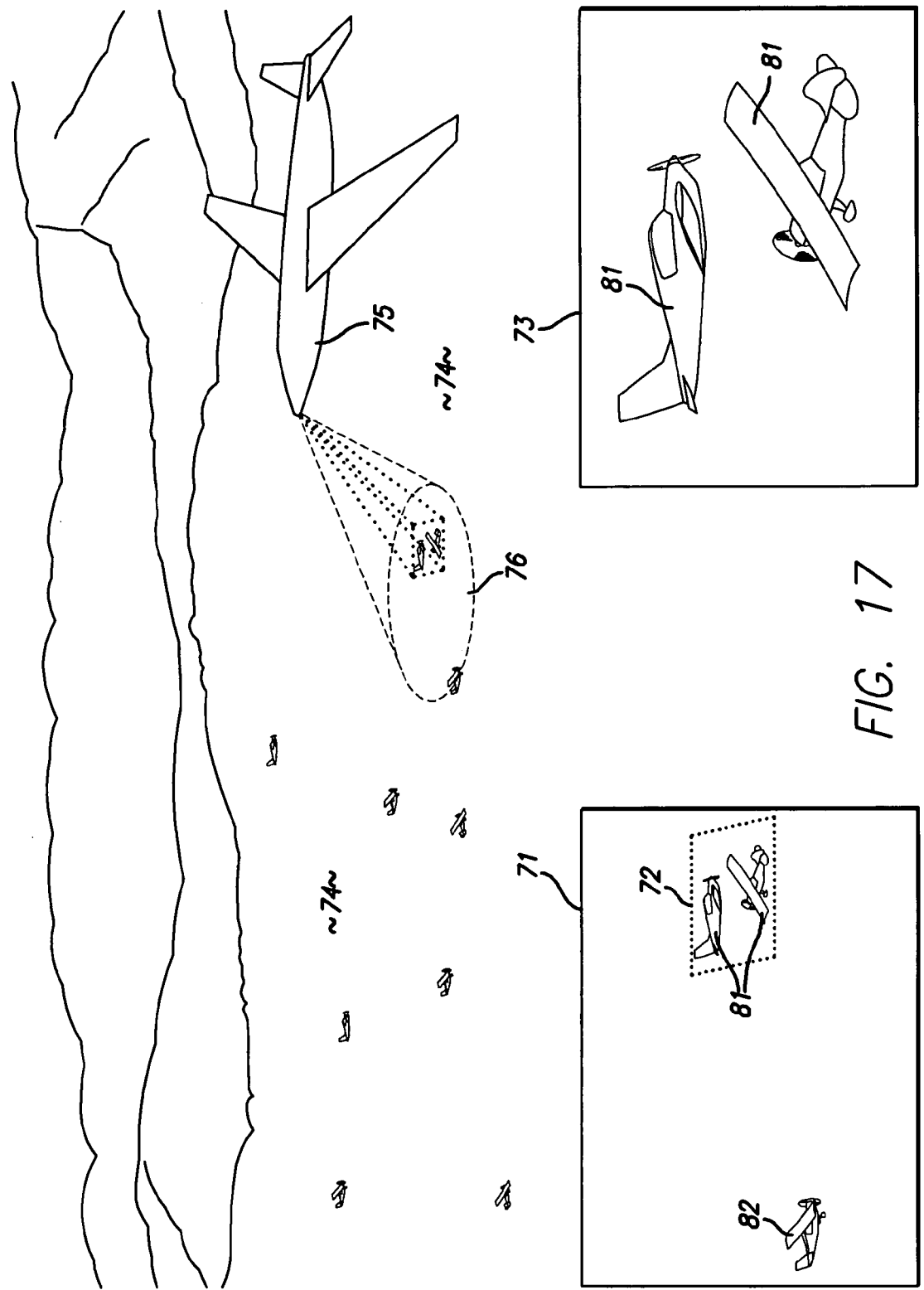
FIG. 17 is a conceptual perspective representation of an operational implementation of a roving foveal sensor, capable of simultaneously generating a wide-FOV (or wide-FOR) image and a narrow-FOV image (see inset view)—both at high resolution—with the corresponding narrow-FOV image inset into the wide-FOR (or wide-FOV) image, making a composite output view; and further showing a preferred embodiment of the invention collecting those two images; and more specifically the drawing shows general-aviation collision avoidance.

Each fringe-counting interferometer 65*a*, 65*b*, preferably a Twyman-Green configuration (FIG. 16), includes a laser 63 that directs a beam 63*a* to the front side of a splitter 67. Part of that beam 63*a* is reflected upward along a first path 69*a* to the retroreflector 111*a* or 111*b*, where that part of the beam is returned downward along a parallel path 69*b*, this time back through the splitter, to a detector 68. The remainder 63*a'* of the original beam 63*a* is reflected from the fixed mirror 67, along a return path 64*a*, 64*b* to the back side of the splitter 67 and then downward along a path 69*b* to the detector.

Depending on phase between the two beams 69*a*, 69*b*, constructive or destructive interference occurs—modulating the recombined beam to the detector 68 and thereby the detector output electrical (or other) signal 70.

In summary the interferometers measure change in Z, Z" etc. based on knowledge of the laser 63 wavelength—and based on counting fringes as light propagating along the moving paths 69*b* reflected from the retroreflectors 111*a*, 111*b* interferes with the fixed-path returns 64*a*, 64*b* from the fixed mirrors 67 in the interferometers.

With this approach it is possible to measure relative changes, or—by using two or more wavelengths—to measure the absolute distance. This latter possibility is an example of an approach that uses just one interferometer.

BERNSTEIN/DRAPER APPROACH—As noted earlier, our jewel-bearing fast scanning mirror is in general significantly superior to MEMS mirrors formed from monosilicon components with torsional flexures. Bandwidth measured for step response with jewel bearings has proven to be at least twice as high as for the MEMS devices. If monosilicon and torsional flexures are nevertheless preferred, a relatively simple process can be used to fabricate our servoed MEMS mirrors, requiring only three photo steps.

The starting material is a thick silicon-on-insulator ("SOI") wafer layer—on a 300 μm handle wafer, separated by oxide 1 μm thick. A metal mirror is deposited by sputtering, followed by liftoff. Inductively coupled plasma ("ICP") etching steps define the mirror, torsional springs, and monosilicon gimbal. A second plasma-etching step removes the handle wafer so that the mirror can move.

The thickness of the springs and mirror is established by the thickness of the starting SOI material. A magnet (preferably a permanent magnet) inserted in a cavity in the silicon mirror enables light-deflecting actuation about two axes by a set of four drive coils.

Positional feedback sensing for the mirror comes from the output of sensors such as PSDs, as described above, so that the deflection angle is determined by monitoring mirror-control signals. Sensitivity for this feedback is related to the operating principles of both the sensor and the above-mentioned mirror drive magnet. Full understanding of the feedback-sensitivity subsystem is a primary determinant of potential overall system performance.

There is some risk that for some imaging applications these MEMS-type mirrors may not perform as expected. For example, they may not rotate as far as desired or may be too fragile for a high-shock and -vibration environment—even after flexure optimization. Additionally, feedback sensors may not give sufficient positional accuracy for adequate closed-loop mirror control. As noted elsewhere in this document, such torsional-flexure mirrors (especially when large) are subject to bending out of plane; such distortion in turn leads to beam divergence and "splatter"—i. e., waste of substantial fractions of the beam power that are misdirected away from the nominal beam direction. To address these risks, we recommend initially fabricating a 10-mm (or larger) servoed mirror and fully characterizing its performance. Particularly advisable is demonstration of hemispherical pointing in both open- and closed-control-loop environments.

Also highly recommended is characterizing the sensor performance to optimize mirror positional feedback. Additionally, step-stare capability should be demonstrated in the laboratory to characterize imaging-stability requirements. Based on these performance results, design changes can be developed for production servoed mirrors.

Several improvements have already been considered in anticipation of potential problems in our current most-preferred servoed-beam-steering design. It is a major departure from earlier embodiments relying on the "large mirrors" patent document noted above or on the Bernstein/Draper-style mirror concepts.

Figure 3:
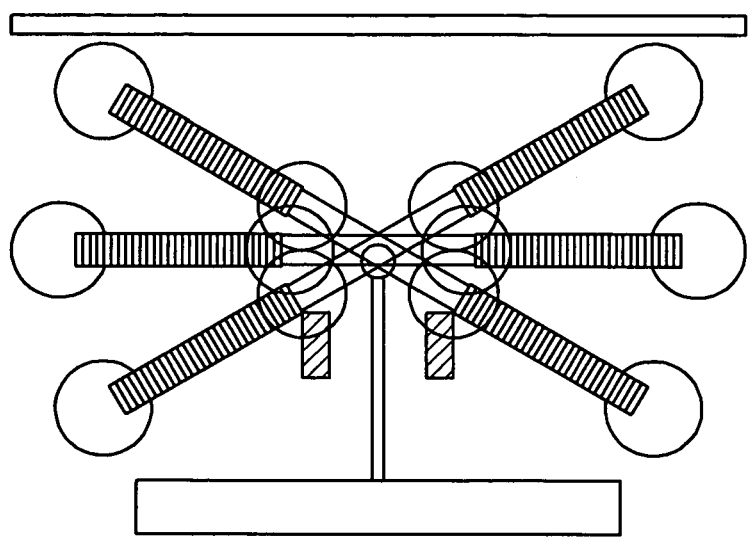
FIG. 3 is a diagram, highly schematic, of a new alternative servoed-steering-mirror FSM design that has an added ball joint for suspension—with outboard circles representing regions of high magnetic field in the precursor (i. e. current) design, and inboard circles showing regions of newly increased magnetic field in this design.

In the latter context for example, a minor design change can simultaneously impact vibration and shock concerns, along with sensor feedback sensitivity and accuracy. In those earlier embodiments, simply placing a hole in the permanent magnet that was mounted behind the mirror provided for the possibility of including ball-joint suspension (FIG. 3) while simultaneously increasing the magnetic field near the sensors.

Here regions marked by outboard circles represent relatively low magnetic fields in such precursor designs, whereas the inboard circles show how the magnetic field increased near the sensor—leading to increased mirror-position accuracy for some sensor types. Because of the ball-joint suspension, this design might have required an alternative sensor approach: the ball-joint post might have interfered with installation of some types of mirror-position sensors.

Essentially all these concerns disappear or are very strongly mitigated in our current jewel-bearing, nonmonosilicon, and nonMEMS embodiments. We recommend careful consideration of all recognized alternatives.

CONTROL-SUBSYSTEM CONSIDERATIONS—Demonstrating performance at the system level entails tests of so-called "persistent surveillance tracking" (step-stare and platform dynamics) with INS (inertial navigation system) feedback. Such investigation can be conducted in the laboratory with simulated platform motion. Specifically, it is helpful to integrate signals from mirror-position sensors with inertial data.

One low-risk approach to achieving this goal is to first establish open-loop control of the mirrors (i. e. without using mirror-feedback sensors). Hemispherical beam steering can then be demonstrated, with ability to project a beam through a commercial wide-FOV afocal lens to achieve the hemispherical beam steering, through integration of a simple visible laser.

The next objective should be closing the pointing control loop. In a laboratory environment with the system mounted to a stationary platform, closed-loop control and stability can be characterized easily.

A final step can be incorporating inertial-sensor feedback, to demonstrate closed-loop stabilization relative to an inertial reference frame. Mounting the system on a platform with known vibration dynamics can facilitate obtaining full characterization of the inertially stabilized system.

Although it is a salutary design goal to achieve mirror-pointing precision better than 0.1 mrad, this objective may overconstrain the problem—in the sense that inertial stabilization errors will be a combination of the mirror-pointing stability plus the INS performance capability. Typical INS systems used on small UAVs (unmanned airborne vehicles) tend to have attitude accuracies on the order of 5 to 7 mrad, and update rates of roughly 50 to 100 Hz. Such issues should be thoroughly investigated during development.

MIRROR SIZE, AND APPLICATIONS—Also as noted above, these steering-mirror advances include development of much larger mirrors than heretofore thought feasible for high-bandwidth, low-power and low-weight systems needing good mirror planarity, good directional controllability, and reasonable linearity of directional adjustments—particularly such mirrors of the jewel-bearing and equivalent ceramic and other refractory types (as well as secondarily the etched monosilicon types). In our jewel-bearing mirrors, again, we are perfecting units of size up to 2 and 5 cm and even much higher. We believe that our current regime of design techniques and scaling considerations will hold good to sizes on the order of 10 cm, and larger. (Our original choice of 10 cm was in part to make our prototype reduction to practice and follow-up more efficient, by adapting prototype components purchased from Draper.) Beyond that range, other unsuspected influences may well enter into design efforts; however, use of mirror arrays, and our known principles of array optimization for diffraction control, could extend the useful size range much farther than 10 cm.

As a practical matter, beam-deflector arrays or individual mirrors exceeding 10 cm may not be of interest now. This is so because modules of 10 and even 5 cm appear to fully satisfy current objectives, and very different solutions are available where bigger systems are desired. Nevertheless it appears that larger units are fully functional; therefore they remain of interest for technical applications that may become more-interesting in the future. Such applications may relate e. g. to high apertures for high-energy response beams.

More generally our current inventive work emphasizes mirror types of a much greater variety than in our earlier investigations. Those earlier efforts, to a large degree, pursued system designs using MEMS-type mirrors, as well as monosilicon etched planar structures with integral torsional flexures (or "hinges") serving as gimbals. Thus the present invention partly consists of introducing very large nonMEMS mirrors, nonplanar-silicon etched mirrors, and nontorsional-flexure steering mirrors.

Other aspects of the present invention, however, include very different applications of these same newer large steering mirrors. These new and different applications in particular include uses of these mirrors in lidar systems, and in other types of active optical systems (not to be confused with active optical elements), and in many other kinds of optical systems e. g. based on null-balance operation of the mirror steering apparatus.

The invention is not limited, however, to active systems. As seen elsewhere in this document, certain aspects of the invention have important applications in passive optical systems.

Many such systems, for instance, are systems for noticing and optically following objects outside the optical system, as set forth in several of our coowned patent documents listed at the beginning of this present document. Some of those earlier systems include provision of a "return" beam, is directed toward an external object to dazzle its operators or associated automatic equipment, or even to impair its structure or function; others include provision for spectral analysis of radiation from the noticed and followed external object; and still others are for imaging of a noticed and followed external object or group of objects.

Others of our earlier systems include an afocal element that enlarges or reduces the FOV or FOR, or both, to enhance those object-noticing and -following inventions. Thus our current mirror developments are especially effective when plowed back into our earlier system interests to further refine and advance such systems.

Also notable is that some very useful embodiments of our invention include no afocal element. In particular, because our newest refractory-bearing steering mirrors have such a very wide scanning angle, in most cases we are able to obtain adequate field of regard without an enlarging afocal element.

Even in such situations an afocal element can still be useful, operated in a reducing mode, to achieve very valuable finer pointing precision and thereby more precise steering. Merely by way of example, taking a reduction ratio of 5:1 in an afocal element can refine the precision of pointing from e. g. 100 µrad down to 20 µrad.

People skilled in this field will appreciate that there exist two different approaches to using an afocal optic in a reducing mode:

(1) the optic can be used in such a mode exclusively, if for instance the system designers and operators are confident that no enlarging usage will be meaningful for their particular combination of circumstances, applications, etc.; and (2) the optic can be used in both reducing and magnifying modes at will, e. g. in alternation, if the designers and operators see utility in providing such a varying capability.

We accordingly believe that both these two approaches fall very properly within the scope of certain of the appended claims. Accordingly both these types of afocal-element claims are in fact appended; moreover, notwithstanding any textual detail herein that may seem to suggest the contrary, the accompanying drawings (particularly FIGS. 21 through 23, and 26) shall be interpreted as illustrating either enlargement or reduction, or both, as appropriate to support those claims.

(Analogous observations can fairly be made about using an afocal element in an enlarging mode—i. e., exclusively enlarging, or both enlarging and reducing—are appropriate, depending on the circumstances.)

As to the wide scanning angle mentioned above, our fast scanning mirror is readily able to operate over a mechanical range of ±22½°, i. e. a full mechanical range of 45°. Further, since the optical deflection is twice the mechanical deflection, the effective optical range is ±22½°×2=±45°, or full range of 45°×2=90° total.

In fact a considerably greater mechanical and optical range is entirely feasible. In many practical circumstances, however, exceeding a ninety-degree overall range of deflection is not productive. In such circumstances, the beam from the mirror at extremes of an over-ninety-degree range is obscured by interfering objects—e. g. by the horizon.

For purposes of both energy collection and diffraction control, maximizing the system aperture is very helpful. In this connection too, our invention can exploit a reducing afocal element, or a cosine effect on effective aperture.

As mentioned above, some preferred embodiments of our invention comprise optical systems that are passive—meaning that they simply receive and analyze an incoming external optical beam, without either:

(1) initiating or generating such an incoming beam by emitting an outgoing beam at the outset; and (2) returning a reply beam in response to the incoming beam.

As will be seen, some of such passive systems according to our invention are closely related, functionally, to the active systems that are presented in this document and in our earlier coowned patent documents.

All these advances are thus valuable, and are especially important aspects of the improved mirror according to our present invention. The present document, taking into consideration the several coowned (and wholly incorporated by reference) patent documents mentioned above, does explain how to obtain the desired response bandwidth, low-power and low-weight modules with good mirror planarity, directional controllability, and reasonable linearity of directional adjustments. This document establishes such aspects as parts of the present invention.

POTENTIAL EQUIVALENTS TO JEWEL BEARINGS—The previously discussed "jewel bearing" construction has been found excellent in increasing the dynamic range and related frequency-response characteristics of our beam-steering deflectors. Recently, however, we have come to the realization that such advantageous construction does not depend upon use of actual jewels in the bearings.

Rather, we have found that entirely satisfactory bearings can be provided using ceramic or other refractory materials coated, molded or otherwise formed. Although the cost of the jewel bearings is quite modest, these alternative constructions are significant advancements simply in that they expand the range of materials and structures that can be used for practice (and included in patent coverage) of our invention.

FAST SCANNING MIRROR BEARING CONFIGURATIONS—Configuration of the bearings used for a fast scanning mirror should not be restricted to the use of jewel bearings. Many bearing types could be used depending on the application and mirror size. The single most-important property of the bearing evidently is low friction. The smaller the mirror, the more significant the friction becomes. Increase of mirror diameter requires larger forces to move the mirror due to the increase in inertia. The equivalent torque corresponding to bearing friction thus becomes a smaller portion of total torque required to move the mirror at high accelerations. As the mirror size increases, the number of options for bearings increases. Some of the bearings that may be useful in FSM designs are described below; this listing is not intended to be exhaustive.

Static and dynamic friction should be considered in selecting a bearing. Low static friction (sometimes called "breakaway" friction or "stiction") is required in applications where pointing stability is important.

It is very important to recognize, however, that ideal operation of fast scanning mirrors according to our invention does not result from the lowest possible friction. Preserving some small, nonzero amount of friction in the bearings actually stabilizes the mirror, and makes the mirror easier to control, though this technique does use somewhat more power.

The best friction level varies with practical applications contemplated, with bearing type, and with size and mass of the mirror, magnet etc. An overall objective is to find the most-favorable compromise between mirror stability and speed (i. e. bandwidth) of pointing or steering response. Merely by way of example, for a fast scanning mirror (FSM) using our jewel bearings and their ceramic and other refractory equivalents—at a mirror diameter of 10 mm as implemented according to the present document—our measurements to-date indicate that such a best compromise results from a coefficient of friction within the range 0.1 to 0.15 (dimensionless).

For other bearing types, such as e. g. air bearings or magnetic bearings, considerations such as just outlined are likely to be almost wholly inapplicable. Thus for air bearings, static friction is likely to be negligible—and friction varies strongly with rotational velocity of the mirror.

More specifically, in the air-bearing regime, friction typically is extremely low but varies (at least for high mirror-rotation speeds) with the square of velocity. Accordingly very different parametric values and control considerations typically obtain.

It is nevertheless true in general, regardless of bearing type, that as friction decreases to approach zero, any differential-equation analysis using a classical imaginary-number coordinate system tends to "blow up". That is, the so-called "poles" and "zeroes" of such an analysis typically tend to line up along the imaginary-number axis—a mathematical behavior that in the physical world corresponds to uncontrollable instability.

Fortunately such difficulties are overcome simply by very careful introduction of small amounts of friction. The particular amounts depend, again, upon the type of bearing and the values of other parameters found in the analysis.

CERAMIC BEARINGS—These are similar to jewel bearings, but their hard, low-friction surfaces can be formed into many shapes and bearing configurations. Thus ceramic bearings can be customized to meet particular needs of a variety of applications.

LOW-FRICTION COATINGS—These coatings are very versatile, especially in bearings for larger mirror sizes, as they can be applied to almost any surface, especially almost any machined surface. Low-friction coatings are applied by dipping, spraying or—perhaps most promisingly—vapor-phase deposition. Coating thickness can vary from 2 to 100 μm. A particularly advantageous construction may result from simply spraying or otherwise coating such suitable ceramic, or other refractory materials, into a hole or some to other constraining structure. Properties of such a hole or other structure, and other details of refractories design and use, can be learned straightforwardly from vendors, for example in vendor websites such as identified above.

Frictional properties of commercial materials, even commercially available bearings, should nevertheless be carefully validated by actual measurement for use in the analytical frameworks discussed in this document. Vendor data may be sufficiently accurate for e. g. simple comparative purposes such as vendors anticipate—as between different substances and different finished products—but this is not necessarily the same thing as use of such data in predictive calculations.

AIR BEARINGS—Such bearings consist of an air flow, or air in a sealed chamber, that supports a shaft or other movable (particularly rotary) element. Air bearings have low breakaway friction, and very low friction in general. They would be most straightforward and therefore most appropriate for the outer stage of our mirror support. A bearing for the inner, gimbal-like stage would require an air supply to the bearing over the outer rotation axis. An air bearing also requires large bearing surfaces, which would restrict use at the inner stage because of the corresponding increase in material and inertia.

Friction arising in air bearings calls for a different analysis than in jewel and other-refractory bearings. When moving quickly through air or other gases, mirrors and mirror/magnet assemblies (and generally most other articles) exhibit air friction that changes very strongly with velocity through the gas. As mentioned earlier, dominant behavior is quadratic variation with velocity. Modeling systems with such variation is feasible and should be performed before attempting to build a steering mirror with air bearings.

MAGNETIC BEARINGS—Use of magnetic support bearings may be awkward because of potential interference with magnetic rotation drive. Careful design, however, could minimize this limitation.

MAGNETICALLY STABILIZED BEARINGS—Dr. Benjamin Joffe, in U.S. Pat. No. 6,176,616, U.S. Pat. No. 6,093,989, U.S. Pat. No. 5,986,372, U.S. Pat. No. 5,524,499, U.S. Pat. No. 5,331, 861 and related patents, teaches a family of bearing configurations that can control bearing backlash, wobble, and to an extent friction. As above, there is a potential issue in interference with a magnetic drive; nevertheless, use of such bearings in our steering-mirror systems may provide significant advantages, particularly for larger mirrors.

FAST SCANNING MIRROR ("FSM") DESIGN GUIDELINES—Several tradeoffs must be considered in the design of an FSM. The inertia of the moving parts has a direct relationship to the torque required to meet dynamic scan requirements. The acceleration of the mirror on each axis of motion is related to the difference between the generated B field and the permanent magnet of the mirror.

Figure 11:
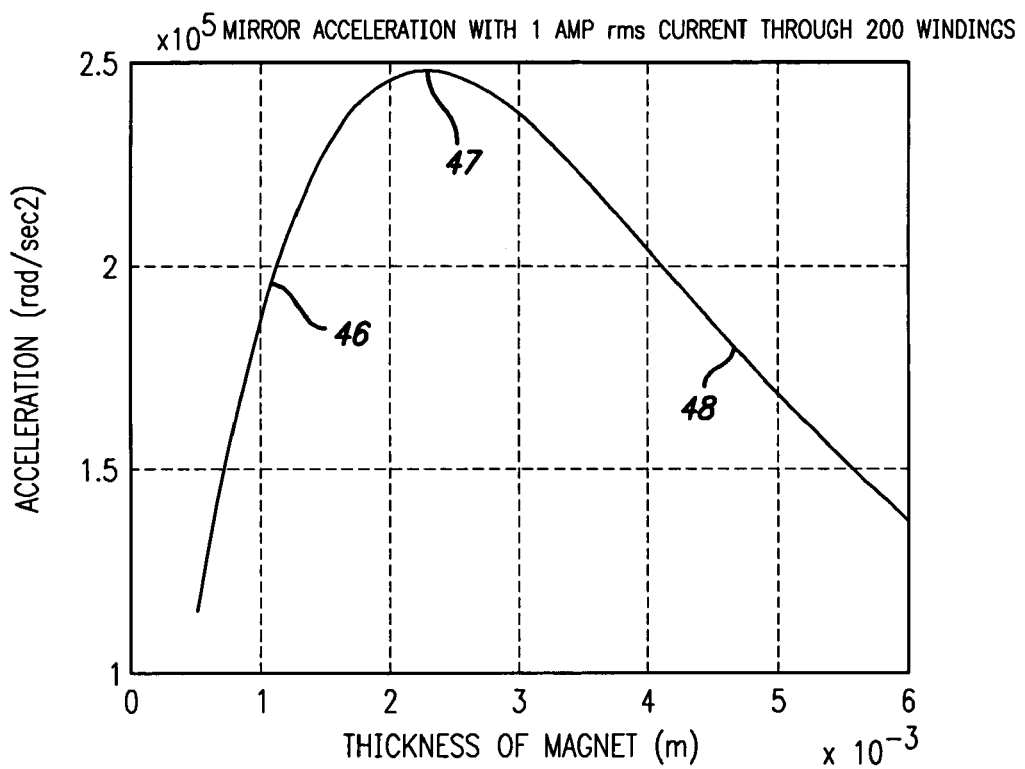
FIG. 11 is a graph of mirror acceleration vs. mirror thickness in meters, for driving current of one ampere is through 200 windings.

Increase in thickness of the mirror magnet has a diminishing return (FIG. 11). The functions graphed in FIGS. 11 and 40 strongly imply that maximum torque and minimum response time call for an optimum thickness—generally about 2.3 mm—for the magnet/mirror assembly; however, it must be recognized that these graphs apply only for a particular value (one centimeter) of diameter, for the assembly. This fact leads to a need for detailed consideration of scaling, which will be introduced very shortly. As will be understood from such details, determining optimum geometries is moderately complicated—but can be brought under control using the analytical framework presented in this document.

Other tradeoffs are available in the mirror construction, particularly as to the solid magnet or ring magnet. The ring magnet could be replaced by four individual magnets adjacent to the electromagnet cores. Benefits of an increased number of coils to generate a stronger driving magnetic field, however, are counterbalanced by space, power demand, and dissipated energy at the coils, and application performance requirements.

The drive mechanism is primarily useful for relatively small mirror applications, involving diameters e. g. below 5 cm. The drive efficiency for larger mirrors can be improved with more-conventional on-axis drive motors. For reasons indicated below, the torque required to drive the mirror at the same rate increases by, very roughly, the third power of the diameter.

Of particular interest in this regard are such inquiries as what happens to the inertia—and required torque, and magnetic-flux density, and electrical requirements—as overall mirror or aperture size rises. Additional details of such "scaling" may best be found from the mathematical analysis presented in following pages.

In particular as will be seen the mirror/magnet inertia typically rises with the fourth power of their diameter—driving up the response time—but response also falls linearly with the mirror/magnet diameter, due to the radius on their disc where force or torque is normally applied. The net effect of these two opposing tendencies is, roughly, an increase in response time with the diameter cubed—i. e., to for increase from 1 to 2 cm diameter, nominally an eightfold increase in response time.

This approximate cubic function is found under the assumption that the magnetic flux per unit cross-sectional area is constant with increasing magnet dimensions. Even this, however, is not the end of the matter as the response is subject to further adjustment (usually downward) for increased total flux in the magnet arising from such increased thickness.

A person skilled in this field can estimate such additional adjustment using the equations presented later in this text. Since increased thickness raises the available flux and therefore torque, the interaction of these several considerations leads to existence of an optimum mirror/magnet thickness—that cannot be simply read from the graphs of FIGS. 11 and 40, but should be found by applying all the mathematical constraints outlined in this document.

Other practical considerations arise, as for example the effect of air gaps in the magnetic circuit—at the inboard ends of the radial arms. For best response, to minimize these gaps the radial arms are brought as close to the central magnet (and mirror) as possible.

The magnet/mirror itself may be circular, as indicated elsewhere in this document. Instead, and preferably, that assembly may be elliptical so that it presents a substantially circular profile when partly rotated out of the plane of the overall structure—particularly when viewed along the normal to that structure. Such out-of-plane effects can be exploited to maximize torque and thus minimize response time when the mirror is at angles that demand highest torque for good response time.

If the magnet/mirror assembly is circular, its adjacent air gaps are best minimized by forming spherical surfaces at the inboard ends of the radial arms, to match the three-dimensional surface swept out by those arm ends. If instead the assembly is elliptical as noted just above, then a more-sophisticated ellipsoidal surface at the inboard arm ends makes a better match.

FSM Feedback design—The feedback design of our preferred sensor has been described as a position sensing detector ("PSD"). The mirror-position feedback device can be any type of device that provides the required resolution and dynamic response for the desired application. Some such devices are photodetector arrays, linear CCD arrays and the like.

Magnetics design—In modeling and designing the drive system of fast scanning mirrors ("FSM" or "MSM") according to preferred embodiments of our invention, two components come into play:

flux density (B), generated by a magnetic circuit; and
magnetic moment of a magnet Combining these models together enables calculation of the torque on the mirror. Then, given the torque and the inertia of the FSM, we can find the acceleration and response times. Below we provide an example of these modeling and design procedures.

Magnetic-Circuit Model of FSM—The magnetic-circuit model is a physically accurate, realistic representation of the apparatus that makes up our preferred FSM steering assembly. It includes a central, circular permanent magnet 411 (FIG. 33), preferably sintered NdFeB.

Closely adjacent to that magnet are four coils 412 (412a through 412d), each wound on a respective radial mu-metal core. In the prototype preferred embodiment of our invention the cores 412 are each 6.35 mm in diameter, and separating each core from the central magnet is a 1.53-mm air gap 413.

Disposed circumferentially around the four prototype cores, with their coils, is an octagonal mu-metal magnetic feedback path 416 with square cross-section, 6.35 mm across and 6.35 mm tall. This feedback path 416 (familiarly designated the "racetrack") is in intimate contact with the outboard ends of the four cores 412, and carries magnetic flux 414 between the several core ends.

More specifically, magnetic flux from the outward end of a representative core 412a flows to the racetrack 416, dividing itself into clockwise and counterclockwise paths 415 to the diametral core, i. e. to the aligned core 412d at the far side of the magnet. The flux then proceeds through that latter core 412d radially inward—across the associated air gap—to the central magnet.

The length of one such return path 415 (i. e. either a clockwise or a counterclockwise path) from air gap to air gap, in our prototype preferred embodiment, is 102 mm. In simplest principle the flux bypasses the pair of intermediate cores 412b, 412c that are at right angles to the two mutually diametral cores 412a, 412d just mentioned.

Critical to good operation of this apparatus is understanding (and well-designed control) of the magnetic signal in the feedback paths 415—ideally following the mathematical analyses set forth below. Our most-highly preferred embodiment controls the magnetic signal by pulse-width modulation ("PWM") of the driving signal. Although we use analog sensing of the magnetic flux in the feedback channel, we is digitize the various signals to implement the system in a semiconductor processor—i. e., we prefer digital control of the PWM; however, apart from convenience of using such a processor, analog current control could be used instead.

Figure 34:
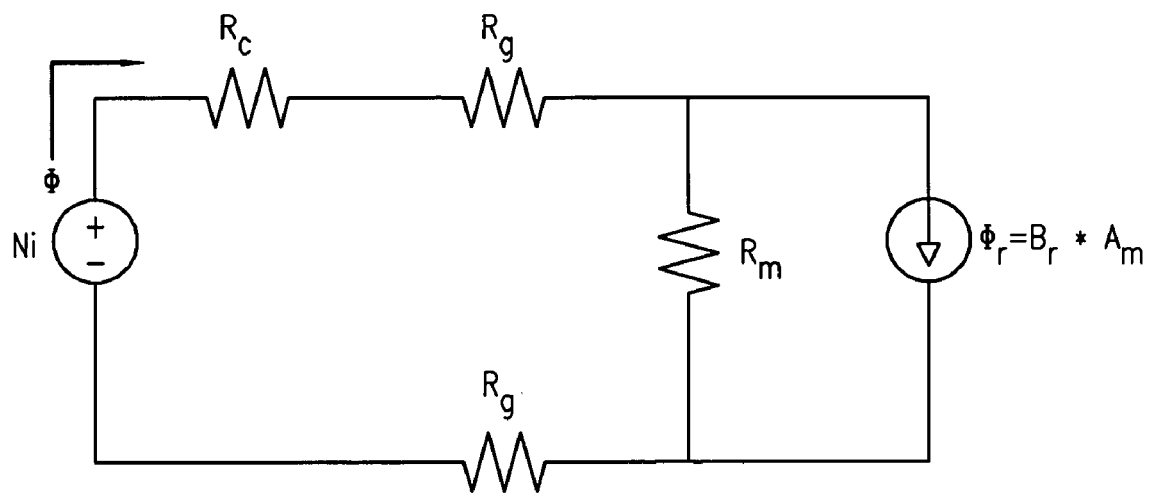
FIG. 34 is a simplified "electrical" model of the FIG. 33 magnetic circuit.
Figure 39:
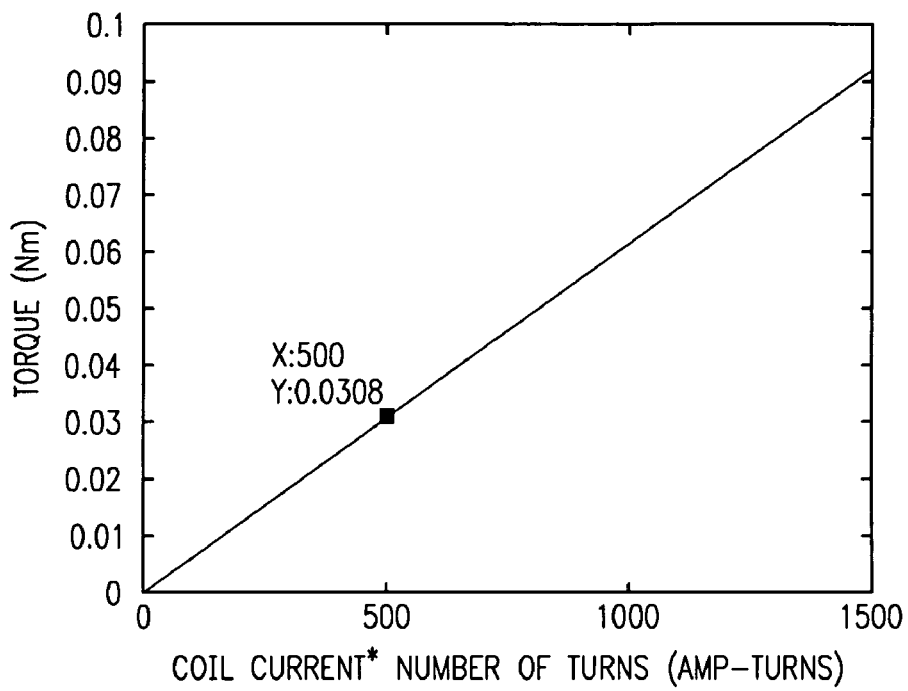
FIG. 39 is a graph of the torque developed at the mirror, as a function of number of ampere-turns in the driving coil.

The above magnetic circuit, in turn, for a helpful visualization of its operation can be modeled mathematically as an "electrical" circuit. Specifically, the electromagnet around the mu-metal core is modeled as a voltage source Ni (FIG. 34) with a resistor $R_c$ in series. The air gaps are modeled as resistors $R_g$; and the permanent magnet, as a current source $\phi_r$ with a resistor $R_m$ in parallel.

The core reluctance ($R_c$) is given as:

$$R_c = \frac{l_c}{\mu_c A_c}$$

where:

$l_c$=length of core $A_c$=cross-sectional area of core $\mu_c$=permeability of core (mu-metal)

The air-gap reluctance ($R_b$ or $R_g$ is written:

$$R_g = \frac{g}{\mu_0 A_g}$$

where:

g=air-gap size $A_c$=cross-sectional area of air gap $\mu_0$=permeability of free space (or air)

The permanent-magnet mutual reluctance ($R_m$) is:

$$R_m = \frac{d_m}{\mu_m A_m}$$

where:
$d_m$=diameter of magnet
$A_m$=cross-sectional area of magnet
$\mu_m$=permeability of magnet,
assuming that the remanence flux density of the permanent magnet in the direction of this circuit is zero.

("Remanence" is commonly defined as "the magnetization left behind in a medium after an external magnetic field is removed . . . . It is denoted in equations as $M_r$. In engineering applications it . . . is frequently denoted as [residual flux density] $B_R$ . . . " Wikipedia.org, 2008)

The flux $\phi$ flowing through that magnet is then:

$$\phi = \frac{Ni}{R_c + 2R_g + R_m}.$$

To find the flux density in the air gap, we divide this flux by the cross-sectional area of the gap:

$$B_g = \frac{\phi}{A_g}.$$

This variable is a linear function (FIG. 35) of current in the coils.

AIR-GAP GEOMETRY—Since the geometry and size of the air gaps have a large impact on the performance of the magnetic circuit, we consider them in further detail here. To find the cross-sectional area of the air gap, we start with the geometry of the gap.

At the outside of the central mirror and magnet 411, the adjacent arc-shaped inward end 412' of each radial core or "arm" 412 subtends an angle θ (FIG. 36):

$$\theta = 2\sin^{-1}\left(\frac{w_c}{2r_c}\right).$$

For our 10 mm FSM, this angle is θ=1.0155 rad. Then with the arc 412' length along the outside of the mirror given by:

$$L = \theta\left(\frac{d_m}{2}\right)$$

—and, assuming that the angular motion of the FSM is independent of mirror diameter, the air-gap area is:

$$A_g = L \cdot g = \theta\left(\frac{d_m}{2}\right)g = 1.0155\left(\frac{d_m}{2}\right)g.$$

MODEL PERMANENT MAGNET AS AIR-CORE COIL—The equation for is the flux density generated by a coil 417 (FIG. 37) with an air core is:

$$B_z = \mu_0 Ni$$

Next, to model the permanent magnet 411 as an air-core coil we set the remanence flux density ($B_r$) of the magnet to $B_z$ and solve for Ni.

$$Ni = \frac{B_r}{\mu_0} \quad \text{(amps/meter)}$$

(amps/meter)
Now assuming a single loop 418 (N=1) at the radius of the magnet and a width of the magnet equal to its length l, $$I = \frac{B_r}{u_o}l \quad \text{(amps)}.$$

(amps).
The magnetic moment of the magnet is:

$$\vec{m} = \pi\left(\frac{d_m}{2}\right)^2 I\hat{z}.$$

Torque acting on the magnet (FIG. 38) is:

$$\vec{T} = \vec{m} \times \vec{B}_g.$$

FSM PERFORMANCE ESTIMATES—To find the angular acceleration of the mirror, we divide the torque by the combined inertia of the magnet and mirror. The inertia increases with the magnet/mirror thickness quadratically; and the torque, linearly. The mirror inertia, however, is greater than that of the magnet. These relationships lead to a peak (mentioned earlier), in the acceleration as a function of magnet thickness (FIG. 11)—since the torque increases faster than the increasing inertia—but as the magnet thickness continues to grow, the inertia begins to overwhelm the torque.

Figure 40:
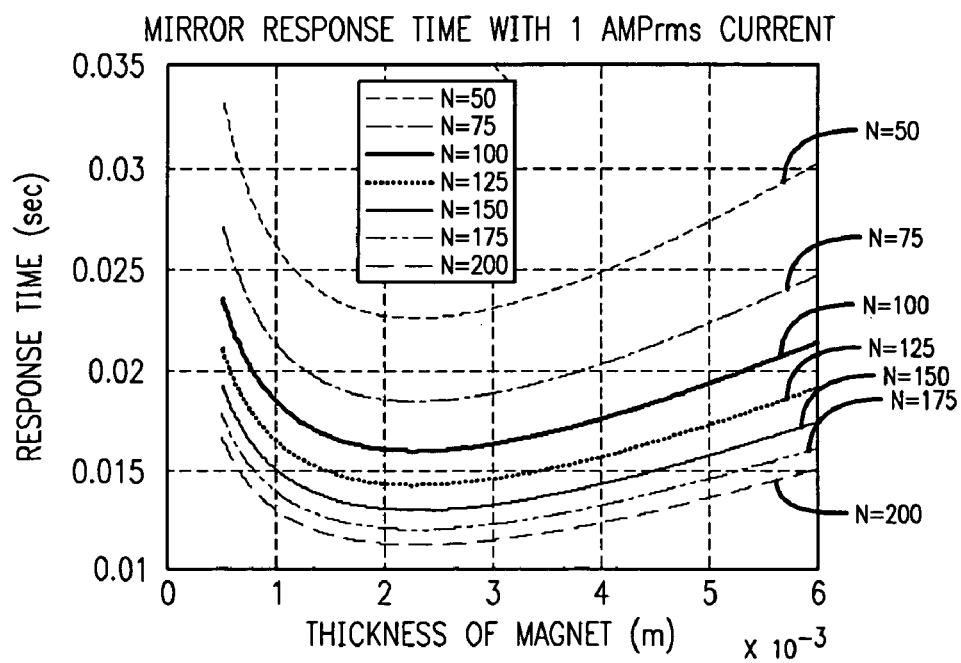
FIG. 40 is a plot of resulting response times for a 10-mm mirror and magnet (with no magnetic-circuit ring around the magnet), as a function of magnet thickness in meters.

The illustrated function is applicable to a mirror and magnet of diameter 10 mm. These acceleration figures can be used to determine the achievable response time (FIG. 40). This graph, too, applies to a 10 mm mirror and magnet, with no ring around the magnet.

Figure 41:
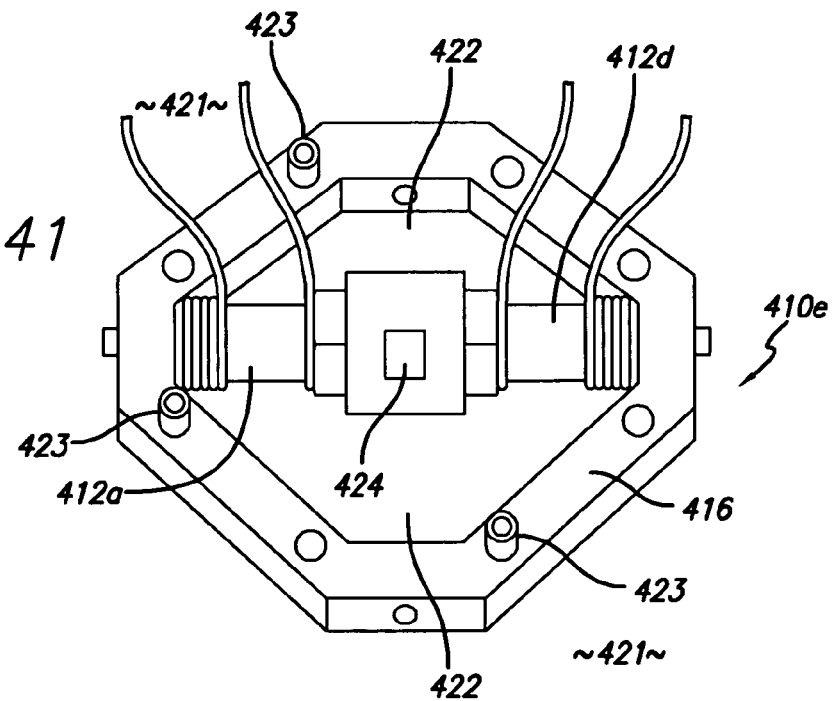
FIG. 41 is a perspective view of a prototype of the FIG. 33 magnetic circuit, assembled to our experimental structure—with a Hall-effect sensor under the intended position of the mirror.

ELECTROMAGNET PERFORMANCE EXPERIMENTS—The goal of this work was to compare several diverse magnetic-feedback coil designs to one another. For most-meaningful comparisons, we wanted the geometries (in particular the air-gap sizes) for the several coil types to be substantially identical. This was accomplished using a test structure (or "jig") 421 (FIG. 41) quickly made on a so-called "3D printer".

Such a "3D printer" device is a variant of a stereo-lithography machine that extrudes layers of plastic. (Ours uses the type of plastic known as "ABS", rather than curing resin.) It is commercially available as Model SST-1200 from the company Stratasys, Inc.—sometimes instead called Dimension, Inc.—of Eden Prairie, Minn. People skilled in this field will understand that many other ways of preparing our test structure could produce wholly equivalent results.

With this structure, a Hall-effect sensor 424 (used to measure the flux-density strength) was locked in place relative to the representative test coils 412a, 412b—within a recess 422 formed in the jig 421. Three screws 423 held the octagonal magnetic circuit 416 or "racetrack" to the jig; and we used two-part epoxy adhesive 435a, 435b (FIG. 42) to held the coils 412a, 412d and sensor 424 to the jig 421.

Figure 42:
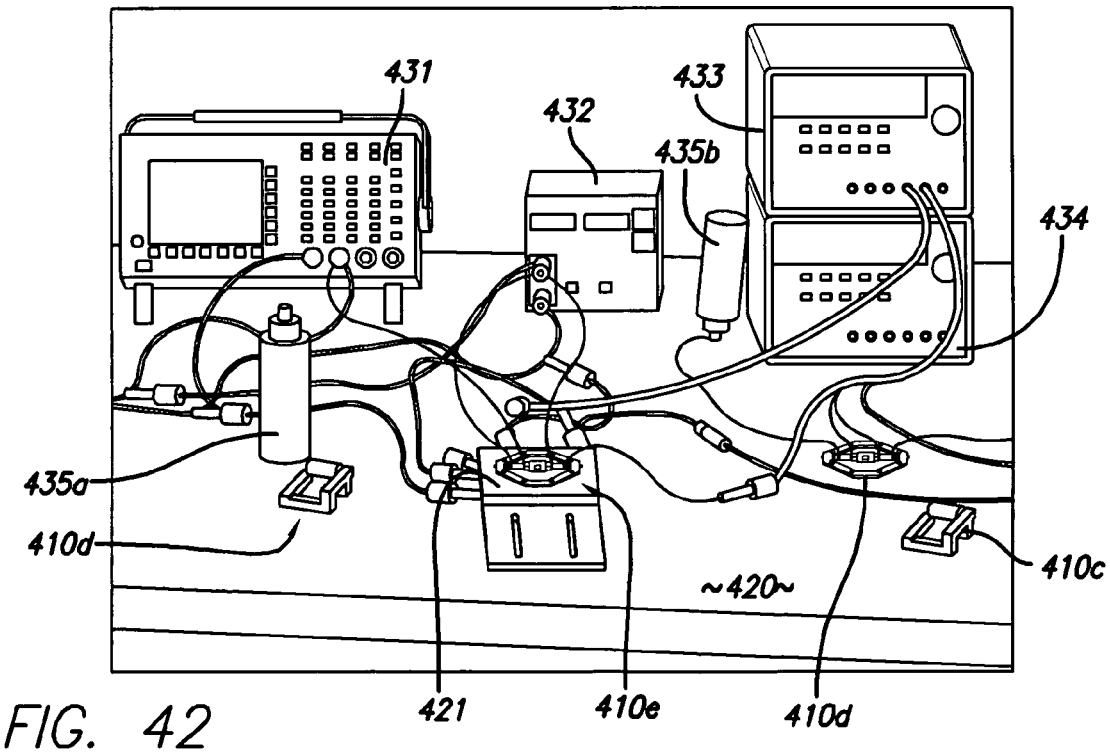
FIG. 42 is a like view of the prototype on our experimental bench with electronic modules ready for use.

The coils were driven with a current-limited power supply 433 (FIG. 42). The Hall-effect sensor 424 was driven by a separate power supply 432, and the sensor output monitored with an oscilloscope 431. The sensor itself was a Sentron 2SA-10 with magnetic sensitivity of 50 V=1 T.

In our simple experimental setup, a test module 410e (FIGS. 41 through 43) comprising the two-hundred-winding test coils and the octagonal racetrack 416, was supported on the jig 421; and the latter was in turn placed on a tabletop 420. Two mating test-coil modules 410c (FIG. 43, at left and right) of another design—the mu-metal core with a second-generation ("GenII") return, discussed below—were also similarly mounted and tested. Each controlled a respective one of the two mirror-rotation axes. Yet another tested module 410d had hundred-winding coils.

The values we were reading were extremely small (so small that system drift interfered with each measurement). Therefore we adopted this measurement procedure, changing the current by 0.5 A increments:
1) Turn the output off at the power supply
2) Set a current-limit value on the power supply
3) Set the scope acquisition mode to "average"
4) Set REF1 to "channel 1" to rebaseline the measurement
5) Turn the supply output back on
6) Record the power-supply current and voltage
7) Record the mean delta voltage from the oscilloscope
8) Return to step 1 and iterate for a new current setting.

Figure 33:
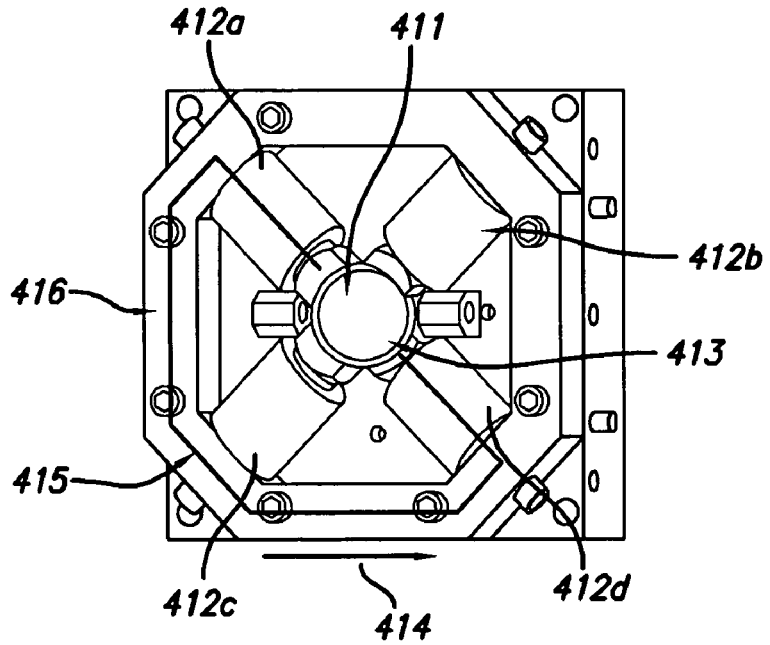
FIG. 33 is a plan view of a magnetic circuit used in certain of our FSM control-system experiments described in this document.
Figure 43:
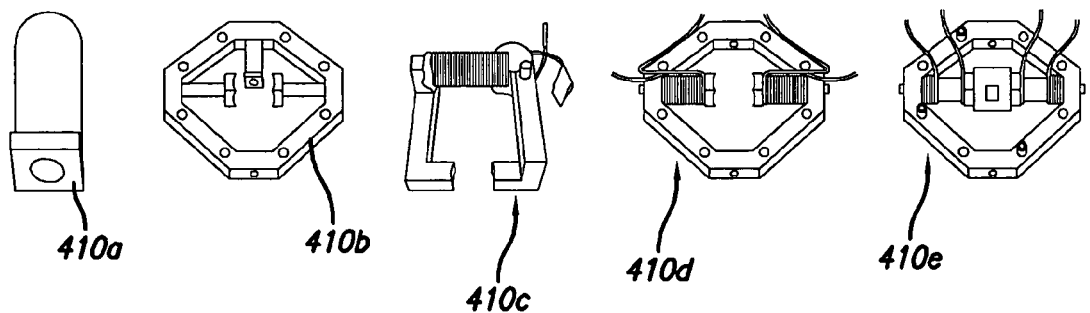
FIG. 43 is a set of five views of diverse prototype magnetic circuits used in the FIG. 42 experiments.

We followed this procedure for five configurations (FIG. 43). The "air-core coils" were, as the title implies, coils with no solid core at all. The design entitled "Mu-metal core with no return" did have a core—made of so-called "mu metal", which is known in the field—but the core was not enabled to provide any "magnetic feedback path" 416 (FIG. 33).

The third title, "Mu-metal core with FSM GenII return", refers to our second-generation ("GenII") prototype. For completeness here, we mention that the precursor first-generation "GenI" prototype (not shown) was the module, mentioned elsewhere in this document, that used an older Draper mirror assembly. In addition, we fashioned two related units 410d, 410e with a mu-metal core that also used a so-called "racetrack" return. Of these two, in one unit 410d the number of coil turns was a hundred; and in the other unit 410e, two hundred.

Figure 44:
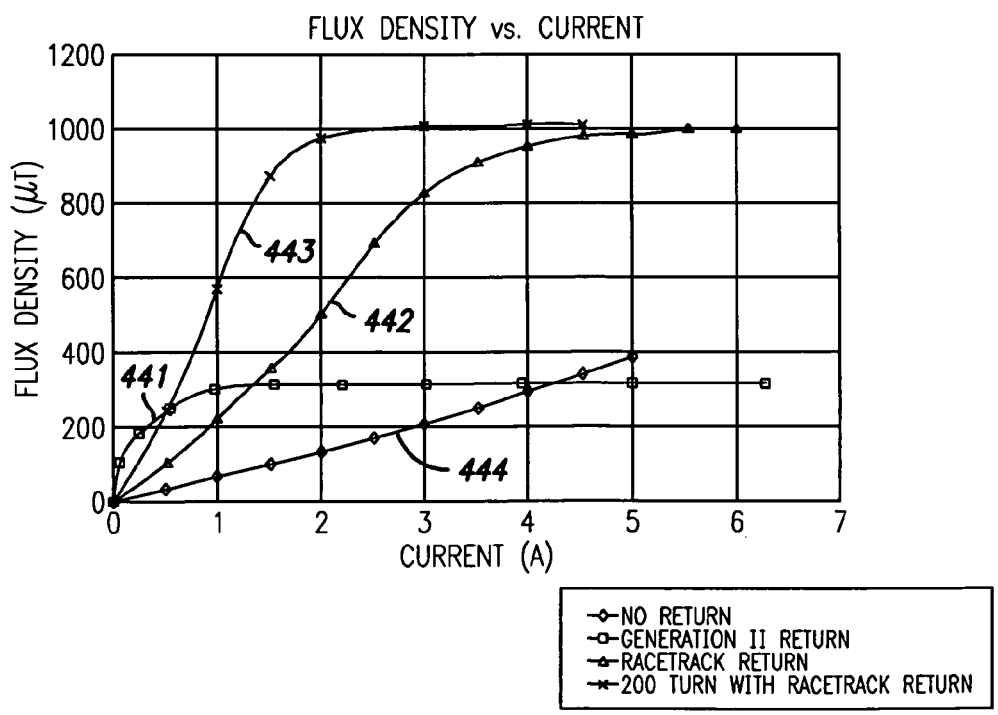
FIG. 44 is a graph of flux density vs. electrical current, in amperes, through the coils.

No measurable flux was found using the first design (the air-core coils). Measured flux density can be considered as a function of current (FIG. 44) for the remaining four designs. The steeper the slope of the graphed line, the greater the flux density supplied per unit current (i. e., higher gain). Our graph shows that while the GenII return has the highest slope 441, unfortunately it saturates quickly. The racetrack design has lower initial slope 442, but (much more favorably) does not saturate until the flux density is three times higher. By increasing the number of windings (to 200 turns from 100) in the racetrack design, we can make the slope 443 approach the GenII slope 441, but again without saturation until about 1 mT.

Figure 2:
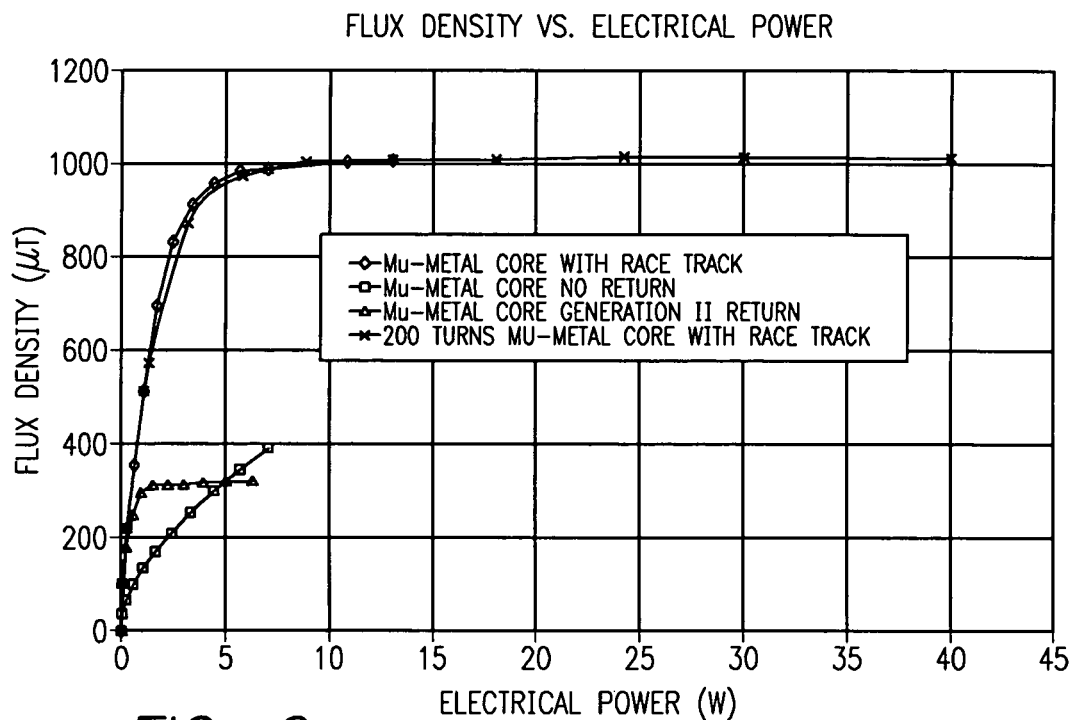
FIG. 2 is a graph of flux density vs. electrical power, in watts, through electromagnetic coils in certain embodiments of our invention.

Since energy-conversion efficiency is also important, we monitored the power-supply power as well, and plotted flux density against power (FIG. 2). This plot shows that the racetrack design has about three times greater flux-carrying capacity than the Gen-II design.

AFOCAL BEAM STEERING—An important category of systems enhanced and facilitated by preferred embodiments of our present invention is the category previously known as "AMBS" (afocal MEMS beam-steering) systems. As pointed out earlier in this document, however, the present invention sweeps more broadly than MEMS (microelectromechanical systems).

Preferred embodiments of the present invention in general favor the jewel-bearing construction that—as noted above—has far better response characteristics, including dynamic range. Also strongly preferred are the other low-friction bearings discussed above.

The use of afocal optics to enlarge or reduce the field of regard, however, remains a particularly valuable feature of the preferred embodiments. Since those embodiments encompass both MEMS and nonMEMS steering systems, the acronym "AMBS" is now best modified by dropping the "M"—leaving simply "ABS" for "afocal beam steering". The advantages of this feature, already set forth in other patent documents of our coowned series, will be reprised now.

In preferred embodiments, the invention provides a low-cost sensor system 210 (FIG. 21) capable of detecting and locating active illumination sources—or objects illuminated by such sources. In some preferred embodiments (FIGS. 22 through 24), the sensor system of the invention can also respond to the detected light source by returning a light beam 238 (FIG. 23) or even an object, and in some cases by initiating a distance-determining or other investigation (Function 4, FIG. 24) of the source or objects associated with the source.

In particularly preferred embodiments initial detection of a radiation source or illuminated object is qualified by filters that implement expectations as to the characteristics of such sources or objects that are of interest. For instance, when anticipated sources are infrared, or are in other particular spectral regions, spectral filters are placed at convenient positions in the optical path—usually but not necessarily associated with the fold mirror 221, and in particular taking the form of bandpass optical reflection/transmission filters.

Because our novel fast scan mirror 215, 216 (FIG. 21) has a very high range of angular deflection, we can now build an optical system that fully covers the desired field of regard even though the system has no afocal element at all. That is, in purest principle the afocal element 214 can simply be omitted. People skilled in this field will appreciate, however, that some practical considerations may limit application of this principle without appropriate compensations for the different operating conditions.

Figure 21:
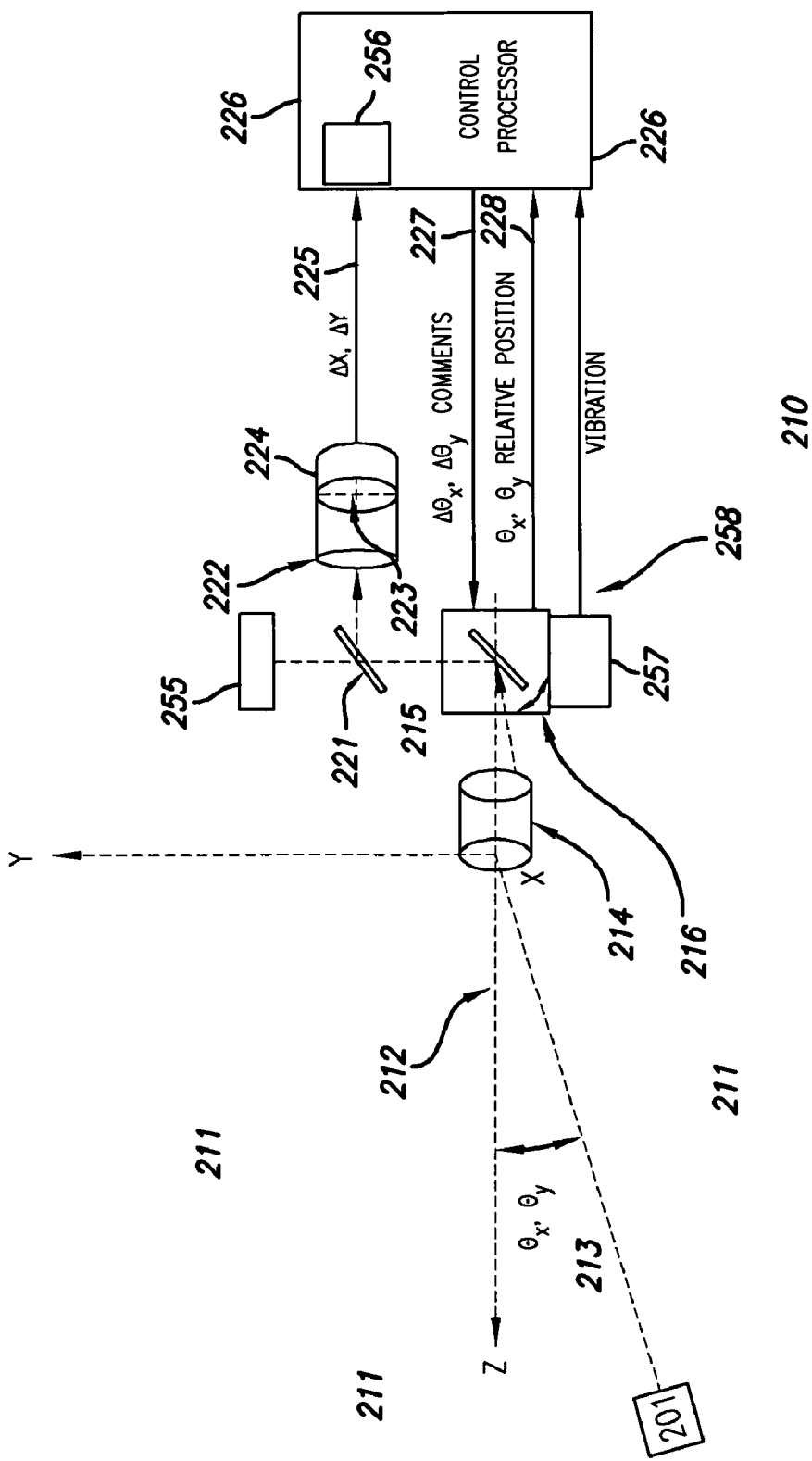
FIG. 21 is a block diagram, with most portions symbolically in side elevation but certain other portions (an aperture-lens assembly 14 and a lens/detector assembly 22) symbolically in isometric projection, of a basic first function—namely, a detection function—for preferred apparatus embodiments of the invention; this drawing, together with FIGS. 22, 23 and 25, shall be interpreted for purposes of this document as representing either an enlarging-only afocal system or a reducing-only afocal system, or an afocal system selectively capable of either operating approach.
Figure 21A:
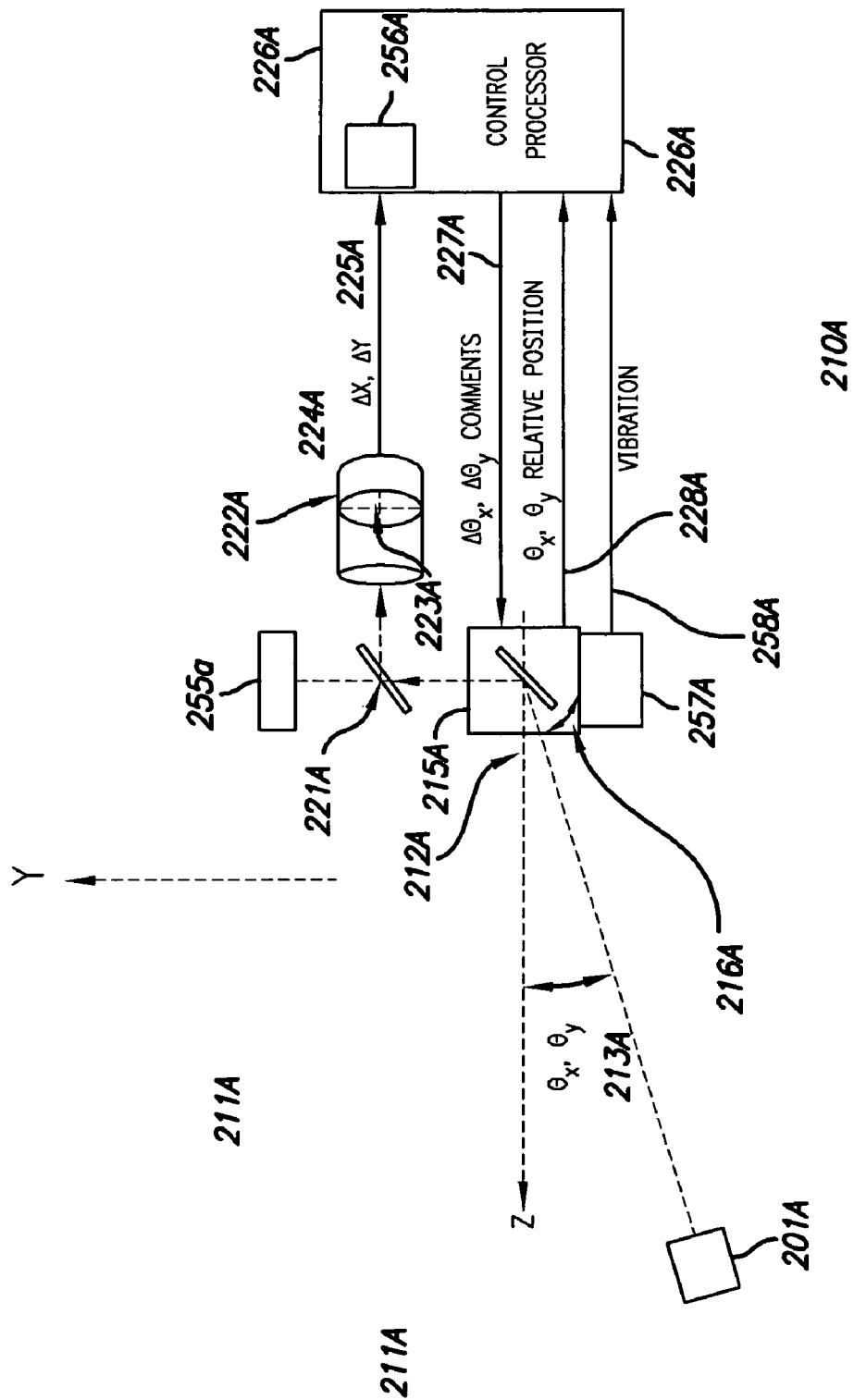
FIG. 21A is a like diagram, but having no afocal element at all—and capable of operation over a relatively large field of regard solely by virtue of operating a steering mirror over a sufficiently large mechanical-deflection range to achieve a sufficiently large optical-deflection range.
Figure 22:
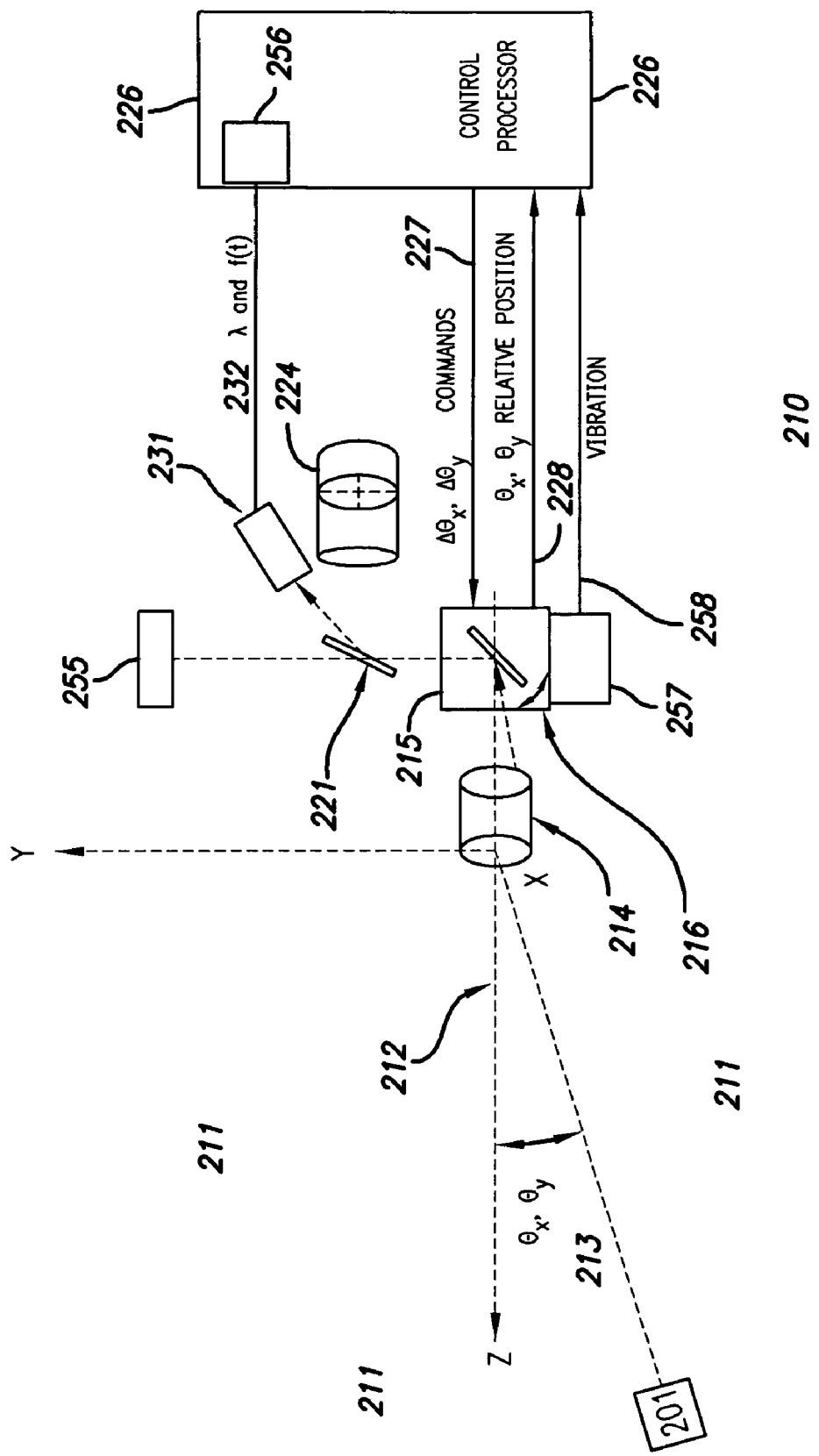
FIG. 22 is a like diagram showing an extension of the preferred apparatus embodiments to encompass a second function, namely optical analysis.

In a system according to our invention and with no afocal element, incoming radiation 213A (FIG. 21A) from a representative source 201A proceeds directly to the steering mirror 215A, 216A. The mirror control system 226A is calibrated appropriately for the different relationships between mirror angle and external pointing direction, in the absence of an afocal element.

As mentioned elsewhere in this document, for various purposes the fold mirror 221 (FIG. 21), FIG. 221A (FIG. 21A) can be advantageously implemented as a beam splitter, and incident-beam selectivity is simply an additional one of such purposes. In such arrangements, if it is preferable that certain spectral components of the beam not pass to the primary directionality detector 224, a dichroic or other bandpass or bandblocking filter can be used, as an alternative to a fold mirror 221. The filter transmits these undesired components to a radiation sink or to an auxiliary is detection system 255, while reflecting the desired radiation components to the detector—or conversely, depending on preferred system configuration.

Such advance filtering is not limited to spectral characteristics. By way of example, if anticipated sources are modulated temporally, the signal 225 from the optoelectronic detector 224 is advantageously filtered electronically 256 to exclude d. c. sources or sources having no significant bandwidth activity above a specific threshold frequency—or, more restrictively, to pass only a. c. signals having a particular specified modulation pattern or class of patterns.

Ideally the system detector 224 is a PSD, which has the ability to report positional coordinates ΔX, ΔY (on the PSD's own surface 225) of an impinging optical beam from a source 201 in a region without the necessity of scanning the region. As noted elsewhere in this document, it is also necessary to determine the mirror position. From these data and known characteristics of associated optics, as explained above, angular position $\theta_X$, $\theta_X$ of the source is readily calculated.

As mentioned earlier, however, a PSD is nonlinear and temperature sensitive when measuring large off-axis coordinates ΔX, ΔY and thus angles $\theta_X$, $\theta_Y$. Such drawbacks are neutralized, in preferred forms of the present invention, by operating in a null-balance mode as detailed below—so that the system relies on the PSD primarily only to determine whether the source is off axis and, if so, then in which direction; and not for quantitative reporting of large off-axis coordinates or their associated angles.

Figure 25:
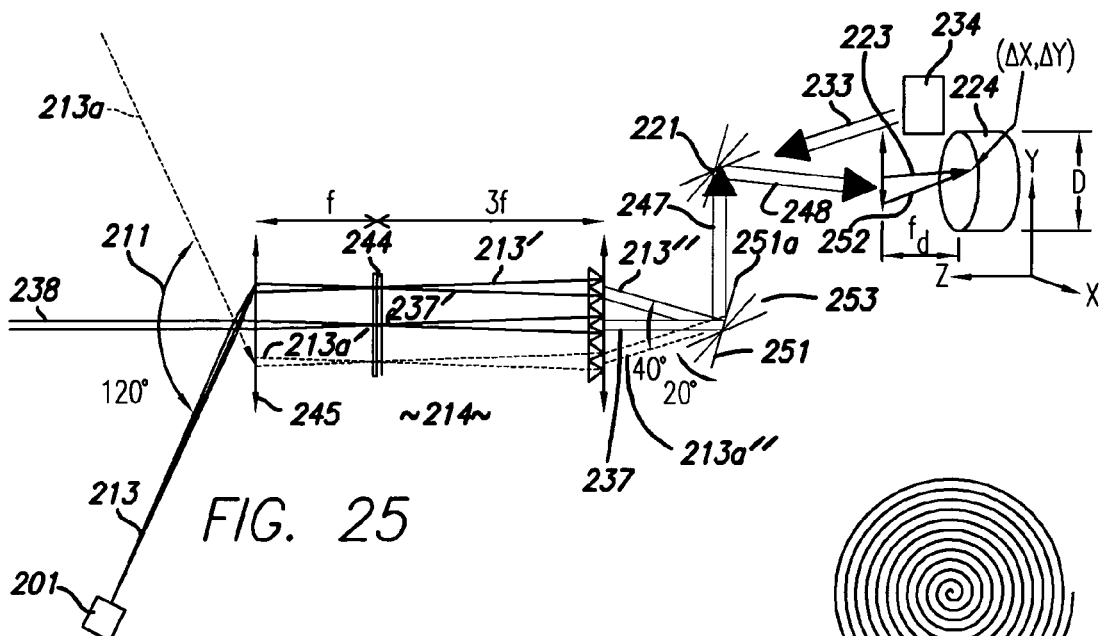
FIG. 25 is a diagram generally like FIGS. 21 through 23 but with the lens and detector assemblies 14, 22 enlarged for presentation of details.

After the sensor system (including the arithmetic preprocessing mentioned earlier) has determined initial values for the incident angles $\theta_X$, $\theta_Y$, the system very rapidly servocontrols itself to keep incident rays 213 at the center of the detector field. Most preferably such servocontrol 227 is implemented by one or more microelectromechanical (MEMS) mirrors or fast scanning mirrors (FSM) 215 disposed inside the optical system 210, i. e. along the optical path between the detector 224 and the collecting aperture 214, 245 (FIG. 25) of the system.

Such mirrors have extraordinarily low mass and inertia, and corresponding extremely high response speed—thus obviating the problem of sluggish response in earlier systems. Additional observations as to the new, larger MEMS or FSM mirrors appear later in this section. Placing the mirror or mirrors inside the system gains yet further advantages of angular displacement speed, in the visible volume 211 of space outside the optical system, particularly if a lens 245 is placed at the aperture to optically magnify the angular displacement of the mirrors.

This particular arrangement for servocontrol of the incoming light, to center the beam on the detector, is particularly advantageous when using a PSD. Whereas that type of detector measures large off-axis angles somewhat inaccurately, the system is easily made extremely accurate in measuring the angular correction 228 applied by the MEMS or FSM system to bring the source to the central, null position.

Throughout most of this document, for purposes of simplicity the notation "$\theta_X$, $\theta_Y$" has been used to represent both the off-axis angle of the beam 213 (FIG. 21) and the mirror-orientation 216 signals 228 relative to nominal or rest positions of the mirror or mirrors 215. As will be understood, these two different sets of angles 213, 228 are not at all the same—but when the system has servocontrolled itself to null the incident beam at the center of the detector 224, the two sets are related by straightforward transforms. Such transforms include the magnification factor introduced by the afocal package 214, as discussed at length elsewhere in this document, and also include the local calibration of the mirror actuator-stem positions relative to an internal standard, and also distortion in the afocal array 214 as well as the final focusing optic 223, and so forth.

The PSD itself can effectively monitor a far larger angular region 211 than it can image. This is a major advantage never fully exploited in conventional systems because of failure to use internal mirrors, or very small mirrors, and because of failure to servo the input source to a reproducible centerpoint on the detector.

Nevertheless a still further major advantage is gained by raster scanning 216 the PSD. The basic principle behind this is that the system views a small part of the field of regard at any instant in time, yet expands its coverage by searching for incident rays, thereby covering the entire field of regard 211. As will be seen, practical field of view using the various forms of the invention can range, representatively, from 20° to 180°.

This combination of the intrinsic angular-dynamic-range advantage of the PSD with the multiplicative advantage of a raster scan yields an enormous bandwidth, or bit depth, in overall determination of optical-source angular location $\theta_X$, $\theta_Y$. Moreover, once a light source 201 is detected and the MEMS or FSM mirrors operated by a processor 226 to center the source in the detector field, advantageously the processor sends the MEMS or FSM mirrors further signals to continue searching/scanning 216 in the general area of the detected rays—without losing the benefit of having the source near the detector center, where moderate angular accuracy is available. (Alternatively the native angular range of the PSD can be used for this purpose without additional mirror scanning.)

The optical system has been successfully servocontrolled to an incident ray when both coordinates ΔX and ΔY (FIG. 25) of the ray on the sensitive detector surface are zero as measured by the two-dimensional ("2-D") detector assembly (or in the case of a 1-D detector, when ΔX or ΔY is zero and the scan-mirror positions are noted). Once the system is servoing to the incident ray, as noted above it can function to determine not only angular location of the incident ray but also its wavelength λ and coded temporal modulation f(t); or can direct similar or different light rays 235-238 (FIG. 23) opposite the incident rays 213 along the same path, or laterally 243 with respect to that path—for communications, distance determination, optical enhancement or other purposes. In the case of light rays received from an adversary for guiding an object with destructive intent, an auxiliary laser 242 can be directed 241 to emit a very bright beam 243 of identical wavelength λ and temporal modulation f(t) onto a nearby (but progressively diverging) surface. This arrangement can closely mimic the original beam but in a different guiding location, and thereby draw off the object from the intended destination.

Various arrangements can be used to bring the auxiliary laser into optical alignment. One such arrangement is a variable-position fold mirror 221, 221' (FIGS. 22, 23 and 25); however, for simultaneous operations as noted earlier such a mirror can be replaced by a beam splitter, e. g. a polarized one for maximum radiation transfer, or by spectral-band-wise splitting devices such as dichroic filters.

Figure 24:
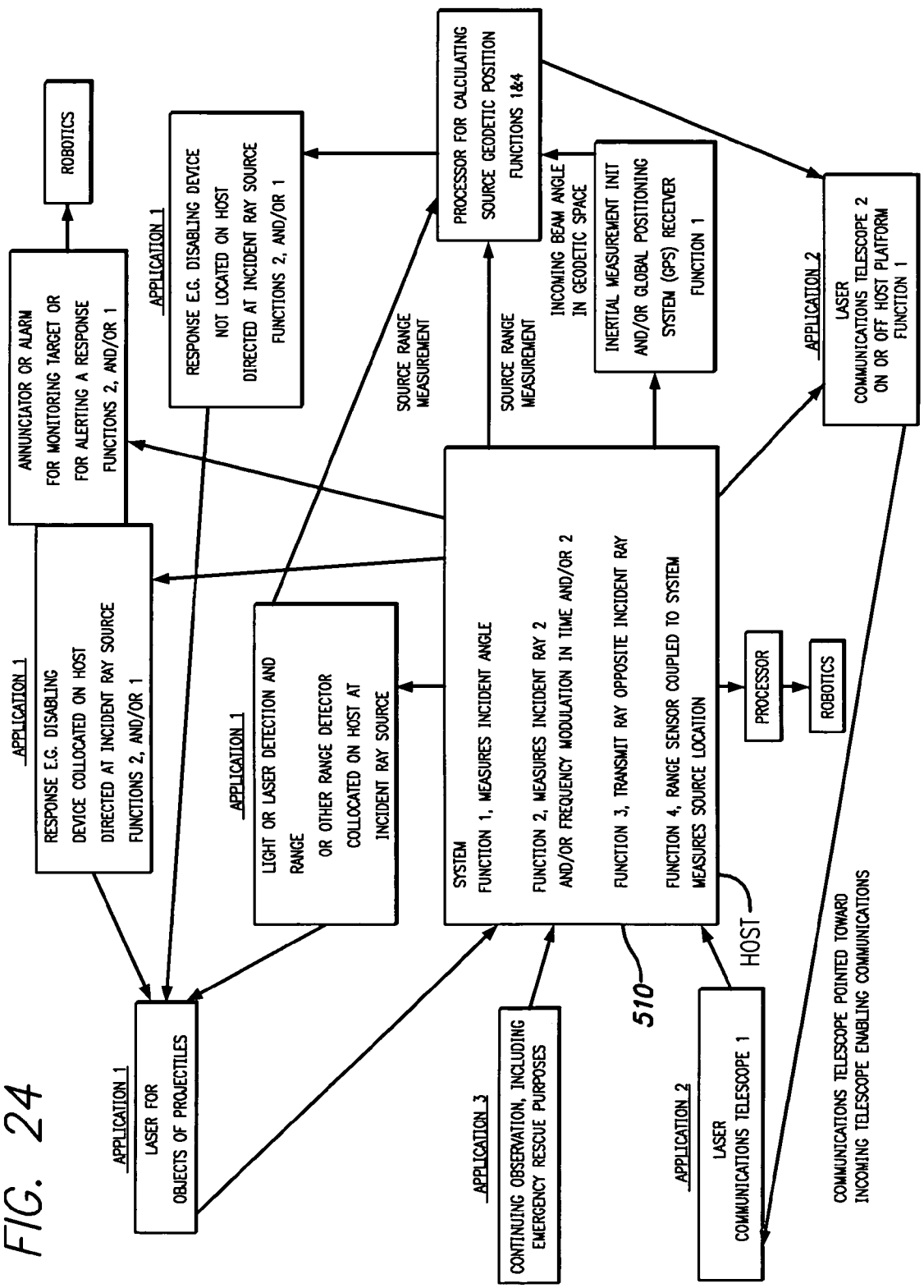
FIG. 24 is a multiapplication block diagram representing apparatus and procedures, using the apparatus embodiments of FIGS. 21 through 23 for the above-mentioned and other functions, and in a number of variegated applications.

The sensor system is ordinarily located on a host 510 (FIG. 24). An appropriate host is readily selected to optimize use of the invention for particular applications. In preferred embodiments, the host can be a vehicle including an automobile or truck, sea vessel, airplane, spacecraft, satellite or projectile, or even simply a human or animal or their paraphernalia. Hosts are not limited to these examples, but can basically consist of any carrier—even stationary—capable of supporting and maintaining the sensor, and exposing it to various kinds of articles or objects.

The sensor method or system specifications can vary and be optimized for use in particular applications. One of ordinary skill in the art can select preferred configurations of the system to suit a particular application. In preferred embodiments of the invention, the system can monitor a field of regard at approximately 10 Hz frame rate—evidencing the excellent sensitivity of the invention at high frequencies. The invention is capable, however, of monitoring in a range on the order of 1 Hz to 1 kHz—or even 10 kHz, depending on size of articles of interest, and the detector field of view. Overall, the invention provides a high degree of angular accuracy in determining the approach path of an incident ray.

Plural such sensor systems can be grouped and coordinated to provide up to 4π steradian coverage—i. e., for sensing in all directions at once. This kind of observation is appropriate for a host that is in the air or in outer space, and in some circumstances for a host that is waterborne. For a host on land, and for a water-surface-craft host in other circumstances (particularly, no need to monitor below the water surface) 2π steradian coverage ordinarily is entirely sufficient.

The sensor of the invention has the ability to monitor wavelengths ranging from ultraviolet (UV) to infrared (IR), particularly up to the midIR range.

Typically a MEMS mirror is limited in range to plus-or-minus ten to fifteen degrees about one or two orthogonal axes, i. e. through an overall excursion 216 of roughly 20° (FIGS. 25) to 30° for each axis. In our preferred embodiments, as noted earlier, a lens assembly 214 is advantageously used to significantly increase this range optically.

Most preferred embodiments of the invention eliminate the use of large external scan mirrors and macroscopic gimbals; as a result the invention is more rugged, and yet actually less expensive and several orders lighter and more compact than conventional sensor systems. For example, the size of the system, depending on the application, can be on the order of one millimeter, or less, to a few centimeters—rather than on the order of one centimeter to tens of centimeters as described earlier for conventional units.

Prior to introduction of the new, larger MEMS mirrors introduced in the Bernstein and Taylor patent documents discussed above, dimensions of an oscillating scan mirror 215 could be, merely by way of example, in a range from a few tens of microns wide to several millimeters or more; such a mirror could be roughly square, or could have a high aspect ratio such as 25:1 or 50:1. Nominally and ideally, however, the aspect ratio was approximately the square root of two, since the mirror surface—when at the center of its range of excursions—is usually, or most conveniently, inclined at 45° to both the incident and reflected beams. These observations as to aspect ratio hold true for the new generation of larger, magnetically driven mirrors as well.

Accordingly, while the older mirrors in their most preferable tested embodiments were e. g. silicon scan mirrors in the range of 1.5×2.1 mm (note that $1.5\sqrt{2} \cong 2.1$), the newer mirrors are advantageously 5 mm and above, in the shorter dimension, and $5\sqrt{2} \cong 7$ mm and above in the longer dimension. The magnetically driven mirrors are capable of construction up to (in the shorter dimension) preferably 10 mm, and more preferably 20 mm, and still more preferably even 30 mm, 50 mm or greater. The corresponding longer dimensions are respectively fourteen, twenty-eight, forty-two and seventy-four millimeters or more.

Again, these dimensions are not at all limiting. The earlier MEMS mirrors, as used in our invention, typically rotated about their own axes with excursion in the range of ±1° to ±10°—or even ±15° as previously noted.

The newer units, having a capability for greater clearance above the base as explained in coowned earlier documents, are also capable of much greater angular excursion such as ±30°. Although this added mobility is quite valuable in the environment of our invention, the greatest advantages of the newer mirrors lie simply in their larger dimensions—as these very greatly simplify major increases (well over an order of magnitude) in optical-energy throughput, leading to corresponding advances in signal-to-noise ratio and diffraction limit.

Such improvement in diffraction limit pushes the imaging sharpness to excellent new values exemplified elsewhere in this document (namely, very fine resolution and imaging sharpness), as is well understood from classical diffraction analysis. Nevertheless these mirrors are also capable of assembly into a multimirror array having quite stunning overall optical-transmission area.

Furthermore such an array in turn is amenable to the diffraction-control techniques set forth in the related '015, '869 and '103 provisional patent documents mentioned earlier. These documents teach how to force such a mirror array to operate at the diffraction limit of a single mirror of like overall size.

As set forth in our related patent documents, one way to achieve such enhancement is to use a wavefront sensor to directly measure irregularities in optical waves reflected from such an array—and then to refine the adjustments of all the mirrors in the array so that the mirrors all have (1) a common angle and (2) negligible relative-phase difference between adjacent mirrors in the array.

This second condition, negligible "relative" phase difference, allows overall pathlengths at the different mirrors to differ—but nevertheless eliminates phase degradation over the array by holding the differing adjacent pathlengths to very nearly 2π radians. Expressed in mathematical terminology, the pathlength differences at adjacent mirrors are "modulo 2π".

As also set forth in the related documents, a second way to achieve the single-mirror diffractive effect is to provide an auxiliary optical path—that traverses the main-path mirror set—and test the sharpness of imaging with an auxiliary laser beam in that path. A preferred way of accomplishing this is to generate a point-spread function or "PSF" for the auxiliary beam, and adjust the mirrors in the array in such a way as to optimize the PSF. The result is again the modulo 2π relationship for adjacent mirrors.

As a practical matter, this condition is met adequately when the differences are within ten to twenty percent of one wavelength of modulo 2π. This and other details are explained in the provisional applications earlier mentioned.

The system mass can be made just one-tenth to one kilogram, which is also generally several orders of magnitude lower than that of comparable known devices. Angular resolution is readily placed in the submilliradian or even tens-of-microradians range, i. e. less than three minutes of arc or even under one minute, versus the previously noted tens to hundreds of milliradians (two-thirds of a degree to tens of degrees) for sensors heretofore. Yet another major and remarkable advantage is that the system can eventually use off-the-shelf technology, requiring no expensive custom parts or instrumentation.

Initially, as noted in our copending precursor '595 application, the most highly preferred embodiments of the invention called for a custom mirror array of at least 5×5 mirrors—and more preferably 10×10 and even 30×30 mirrors—each individual mirror being at least 30 microns in the shorter dimension, up to at least 1.5 mm in that dimension and 2.1 mm in the longer, and with an afocal lens assembly that follows custom optical specifications but is otherwise conventionally fabricated. Using larger mirrors, 5 to 30 mm in the shorter dimension, it is possible to achieve substantially equal overall area with a much smaller number of mirrors—for example smaller in proportion to the square of the mirror linear dimension.

Since the linear dimension of the newer mirrors is typically greater by two to three orders of magnitude, the number of mirrors may be four to six orders smaller for the same collecting power. With this understanding, a previous mirror array of even 30×30 mirrors is equaled in area by less than one of the newer units. In short, one large mirror e. g. 311 or 312 (FIG. 31) potentially does the work of many previous, smaller mirrors.

Another approach to exploiting the potentially much greater size of magnetically driven mirrors, however, is to aim for a much larger overall steering-mirror area. For example, an array of 10×10 mirrors of the newer type comes to 100 times the collecting power of a single new mirror, and this in turn is six to eight orders' greater area than previously achievable. The result is enormously enhanced overall performance, in terms of both signal-to-noise ratio and (assuming adequate provisions for diffraction control) imaging sharpness.

A representative array may for example comprise six such mirrors 111-116, for example with two parallel, spaced-apart unitarily formed flexures 317a, 318a (FIG. 32), and resulting rotational axes 317, 318 (FIG. 31). As will now be clear to people skilled in this field, an alternative is an end-to-end two-mirror array 311-312 with likewise parallel, spaced-apart rotational flexures 317a, 318a and axes 317, 318; or a side-by-side two-mirror array 311, 314 with flexures aligned end-to-end to produce one common rotational axis 317—or a side-by-side, three-mirror array 314, 311, 316, likewise with a single common axis 317.

Skilled people in this field will further see that many other configurations are possible and usable, each with its to own combination of advantages and tradeoffs. In the representative single mirrors 311, . . . 316, as well as the representative array 311-316, advantageously each mirror e. g. 311 or 312 is provided with coils 311c, 311d—or 312, 312d—that may be energized substantially independently to create respective magnetic fields, at the two opposite sides of the corresponding axis 317 or 318.

These created fields in turn interact with other magnetic fields (e. g. fields of permanent magnets that may be in the base 319, or elsewhere as described in the Bernstein-Taylor documents) to develop separate magnetic forces 311a, 311b—or 312a, 312b—acting on each mirror at opposite sides of its rotational axis. In the case of oppositely directed forces 312a, 312b it is readily appreciated that the forces both urge the mirror 312 into rotation in a common angular direction, which may produce (all other things being equal) maximum torque and thus maximum angular-velocity response, for minimum electrical input power. Currently such a geometry and functionality appear ideal for, at least, a single-mirror system.

In precursor documents it was observed that then-favored component designs were expected to "quickly become standard in the field, and very shortly be available as commercial off-the-shelf units." In view of the new developments in MEMS-mirror or FSM technology, that observation must now be seen as unduly conservative—that is, the earlier designs have become not only standard but outpaced by the newer mirror configurations.

Most of the advances described herein, in practicing our present light-detecting, -characterizing and -response invention (i. e. in detailed construction and use of the invention) will be straightforward and clear, based upon the information in this document—considered together with the teachings of the other patent documents mentioned in the "RELATION BACK" and "RELATED DOCUMENTS" sections at the beginning of this document. One part of the invention, however, may bear specific elaboration here, and that is the use is of magnetically controlled MEMS or FSM mirrors to implement the fullest forms of diffraction control:

Piston Adjustment in a Magnetic MEMS Array

As made plain by coowned earlier patent documents, wholly incorporated herein, the control of diffraction to optimize imaging sharpness—with a steering mirror array—requires simply matching of certain adjacent-mirror conditions. Specifically, although matching the angles (called "tip" and "tilt" angles) of adjacent and nearby mirrors 311, 312 (FIG. 32) in the two rotational axes of the mirrors (only the "tilt" angle being shown) is critical for common pointing, and is also helpful to providing a partial smoothing of optical wavefronts, another kind of matching appears essential to full diffraction control.

That kind of matching is along, roughly, the piston dimension P of the array. By "piston" we mean the positioning of a mirror in the direction P normal to the common base (and rest plane) of the mirror array.

Depending on the particular steering angle which the array is commanded to provide, the ability of the array to produce an essentially coherent reflected wavefront requires coordinated fine adjustment in the tip, tilt and piston directions—all three. This coordination is required to ensure that the modulo-$2\pi$ condition is satisfied for the direction in which the reflected beam travels (or perhaps more accurately an average of the directions of the incident and reflected beams).

The need for some adjustment in the piston direction is may be recognized from the distance $\Delta$ (FIG. 32) between the tips of the adjacent mirrors 317, 318. That distance may be conceptualized as measured along the true piston direction P (normal to the base and to the mirror rest plane), or alternatively along a normal to the common plane of the rotated mirrors.

Another preference is to measure the distance along the incident/reflected average direction mentioned above; and this is, roughly, the convention illustrated in FIG. 32. However measured, the distance A is in general disruptive to the required in-phase relationship of wavefront elements or "wavelets"—in the overall reflected beam—because that distance, in general, fails to be a multiple of one wavelength, or even close to such a multiple.

Without correction, therefore, the wavefront elements from those adjacent mirror tips must in general interfere with one another destructively, at least in part. Given such interference the diffraction limit for each mirror is determined, substantially, by the linear extent (in each principal direction) of that mirror considered individually.

Our object, by contrast, is instead to condition the diffraction limit based upon the linear extent of the overall array. The well-known relationships of diffraction thereby provide a finer, sharper focus of each object imaged.

In purest principle, one way—which may perhaps be regarded as a "trivial" way, or alternatively as an extreme and very impractical way—to avoid or minimize partially destructive interference is to mechanically align the adjacent edges of the adjacent mirrors. In other words, one (or both) of the mirrors in theory can be moved to perfectly aligned positions 311, 312' (the latter being shown in the is broken line).

Since the mirrors are at the same angle, such alignment (if possible) actually would cause the mirrors all to form one single reflective surface, and constructive interference would be guaranteed. What makes this approach impractical and extreme is that, in general, extremely large piston excursions would be required.

Fortunately it is not necessary to attempt such an approach. It is necessary only to bring the adjacent mirror edges into, approximately, optical-phase alignment—not mechanical alignment. As long as the wavefront elements propagating from the two adjacent edges are substantially in phase, desired diffraction relationships obtain and imaging sharpness is very greatly enhanced.

Within a typical mechanical interedge distance Δ, for mirrors oriented at representative angles, typically there are many hundreds or thousands of optical wavelengths. Therefore the number of opportunities to find a substantially in-phase relation is typically an extremely large number.

By "substantially" in phase we mean wavefront elements in phase within about ten percent of one wavelength—part of a highly preferable embodiment of our invention. Even just holding the phase error under twenty percent is usually or often adequate for a significant enhancement of image quality, and offers a somewhat less-preferable embodiment of the invention.

In summary, the piston-direction adjustment of e. g. mirror 312 need not at all appear as in FIG. 32, where that mirror has been moved by essentially the entire distance A. A very tiny fraction of that distance generally suffices, and as already noted the optical-phase alignment need not be exact.

In any event, it will be clear that, at least in general, wavefront coherence demands adjustment in the piston direction. The term "piston" here is particularly apt, in that most MEMS mirrors in the earlier generation of nonmagnetically controlled devices actually had a kind of mechanical piston component, i. e. an extensile rod element, that physically protruded or extended in, generally, the dimension directly toward and away from the base (and rest plane) of the array, along the normal.

Accordingly "piston adjustment" referred literally to mechanically maneuvering that piston (or its connecting rod) for a net excursion inward and outward from the base. We say "net" because some MEMS-mirror configurations depend, in those earlier devices, upon operation of the piston or rod to achieve the tip and tilt adjustments too.

The interdependence of tip, tilt and piston controls persists in the current generation of MEMS devices, but in these devices the mechanisms of these adjustments are different. We shall now detail those new mechanisms.

It has been explained earlier that each mirror can have not just one but a pair of electromagnetic control coils 111c, 311d (FIG. 31)—or 312c, 312d—for forcing the mirror into rotation; and that passage of electrical currents through these coils in appropriate directions and magnitudes can—in effect—twist the mirror about the corresponding rotational axis. Here by the term "twist" we do not mean to suggest that the mirror is necessarily deformed in a twisting mode, but rather only that the whole mirror is bodily rotated by forces e. g. 312a, 312b applied separately at its two half-panels or lobes that are at opposite sides of the rotational axis 318.

Those forces 312a, 312b, when considered from the point of view of linear directions, are oppositely directed—but when considered from the point of view of torque about a central axis of rotation they are, generally speaking, operating in a common direction and additive. In other words, even though the two electromagnetic forces—assuming that they are oppositely directed in the linear sense—oppose each other in the linear sense and tend to cancel (to the extent that they are equal), they instead augment each other and tend to supplement each other in the rotational sense.

In this way the electromagnetic forces 312a, 312b adjust the mirror to a particular rotational balance point, a particular angle, that points the reflected or incoming beam (or both) in a particular direction—and also, as suggested just above, may be used to set the diffractive performance for a smoother wavefront.

Now, to the extent that those two oppositely directed forces are not equal, they do not cancel linearly; instead there is some residual of the larger one (e. g. 312b) of the forces that adds in the linear sense to the smaller one (e. g. 312a). In this case there is a net force in the (negative or positive) piston direction, so that the entire mirror is bodily drawn in toward the array base 319 or (as illustrated) thrust outward away from that base.

This net force and the resulting motion, and positioning of the mirror, toward or away from the base is in fact "piston adjustment". If such net force is opposed by other forces, for example restoring force due to springiness of the rotational flexures used to enable rotation of the mirror, adjustment of the net electromagnetic driving force results directly in a specific "piston" position, which can be calibrated.

If springiness in the flexures is not sufficient or suitable to produce this desirable result, then other sources of restoring force (even including counteracting forces produced electromagnetically, if desired) are readily provided—as will now be amply clear to people skilled in this field. Also it will now be clear to such people that the forces produced by electrical current through the respective coils, in their interaction with permanent magnets as discussed in the above-mentioned patent documents, are readily adjusted in such a way as to achieve any desired or needed combination of tip, tilt and piston settings.

Another way to represent the rotational and piston forces is to show the two forces 311a, 311b acting on the two ends of a single mirror 311 as both pointing in a common linear direction (FIG. 31)—particularly, outward from the base. This conceptualization perhaps more naturally explains the piston suspension of the mirror outward from the base. With this basic arrangement, a controllable incremental difference between the two forces 311b, 311a serves to rotate or "twist" the mirror 311 about its rotational axis 317—once again producing a desired combination of piston, tip and tilt adjustments.

Setting array mirrors e. g. 311, 312 for approximate optical in-phase relationships as described above does require some basis for determining when two adjacent wavefront elements are, or are not, in phase—or, alternatively, determining when the overall system is as well tuned as it can be. Our previously identified related patent documents describe how to do this.

A first way, also shown very generally in this present document, is to provide an auxiliary optical system 331-339, which in effect emulates the behavior of the main functional light paths through the overall system—but does so in a way that enables direct measurement and thus optimization of imaging quality. Thus a laser 331 directs an auxiliary beam 332 to a first beam-splitter 333, which in effect acts as a fold mirror, forwarding the laser beam 334 toward the mirror array 311-316 exactly parallel to the main optical path 321-322, 323-324.

After redirection (with, presumably, some wavefront distortion) by the array, the reflected beam 335 reaches a second splitter 336, and from it passes through a beam-conserving optical element 338—fully discussed in the co-owned '103 application—to an imaging detector 339. Focal elements (not shown) bring the laser beam 332, 334, 335, 337 to a focus on that detector 339.

The quality of that focus is developed as a so-called "point spread function" or "PSF". Thus the degree of perfection of the PSF as received at the imaging detector 339 serves as a figure of merit for the various mirror-disposition adjustments.

Various algorithms enable perturbation of the mirror adjustments to optimize the PSF. This step is preferably performed for each of a great number of steering angles of the two-axis mirror array, and the results stored in memory so that ideal adjustments can be very quickly and precisely summoned back for any particular steering-angle combination.

A second way to determine the phase quality of the mirror adjustments is to insert a wavefront sensor 351 directly into the main optical path 321-322, 323-324—as set forth in the coowned '015 patent document. Here the above-discussed auxiliary path 331-339 is omitted, and instead the wavefront sensor (typically including a sensor array) determines phase imperfections of the overall wavefront from the mirror.

In this case as well, the mirror settings can be perturbed according to any of various protocols, to optimize each part of the wavefront separately; or, alternatively, to optimize the overall quality in a more holistic fashion—as, for example, using a neural network. As with the PSF technique, such measurement is best performed as a function of steering angles, so that optimized tip, tilt and piston settings can be automatically recalled as soon as a pair of steering angles is invoked.

The use of such magnetically developed forces 311a, 311b or 312a, 312b—or both—together with mirror-setting optimization apparatus 331-339 or 351, serves to enable a steering-mirror array 311-316 to achieve diffraction-limited performance corresponding to the dimensions of the entire array—and at the same time to very rapidly and nimbly canvass a broad field of regard, through a wide field of view. This is accomplished by the combination of large angular deflections of the steering-mirror array itself, further magnified by an afocal optic 314.

The optic directs light collected from external objects along an optical path 321, 323 to the mirror array, and thence along the further path 322, 324 to a focusing lens and then a detector 324. Various detector types are appropriate, depending upon the particular operations preferred—as set forth in other sections of this document.

Several other optical subsystems are advantageously incorporated into the system of our invention, individually or in combination. They are discussed in other parts of this document or the related documents introduced earlier.

Any such other subsystem, or any combination or subcombination of them, may be placed at an appropriate position e.g. 351 along the main optical path. Such a subsystem may be placed in advance of the focusing lens 323 and detector 324, or may be included instead of the lens and detector, or if preferred may have access to the optical path in parallel with the lens and detector, via a beam-splitter (not shown).

For instance such a subsystem or combination or subcombination 351 may include, without limitation:
(1) a wavefront sensor as mentioned earlier;
(2) a spectral-analysis module;
(3) a ranging laser for projecting a ranging beam to an object at unknown distance outside the optical system, and a ranging-laser receiving module, distinct from the detector and focusing lens, for receiving and analyzing the ranging beam after reflection from such an object;
(4) a communication-beam transmission module for transmitting a first modulated communication beam toward such an object, and a communication-beam reception module, distinct from the detector and focusing lens, for receiving and interpreting a second modulated communication beam received from the object or from a region that includes the object;
(5) a powerful laser for projecting a beam to impair function or structural integrity of an external object;
(6) a laser for dazzling or confusing either a human operator or optical apparatus associated with such article, or both; or
(7) an auxiliary optical system that includes an imaging reception module, distinct from the detector and focusing lens, for receiving and interpreting an image beam received from such an object or from a region of such volume that includes such an object.

Preferably the afocal optic 314, and the mirror 311 (or array 311-316), are shared by the detector 324 with its focal lens 323 and by the subsystem, combination, or subcombination 351.

Figure 20:
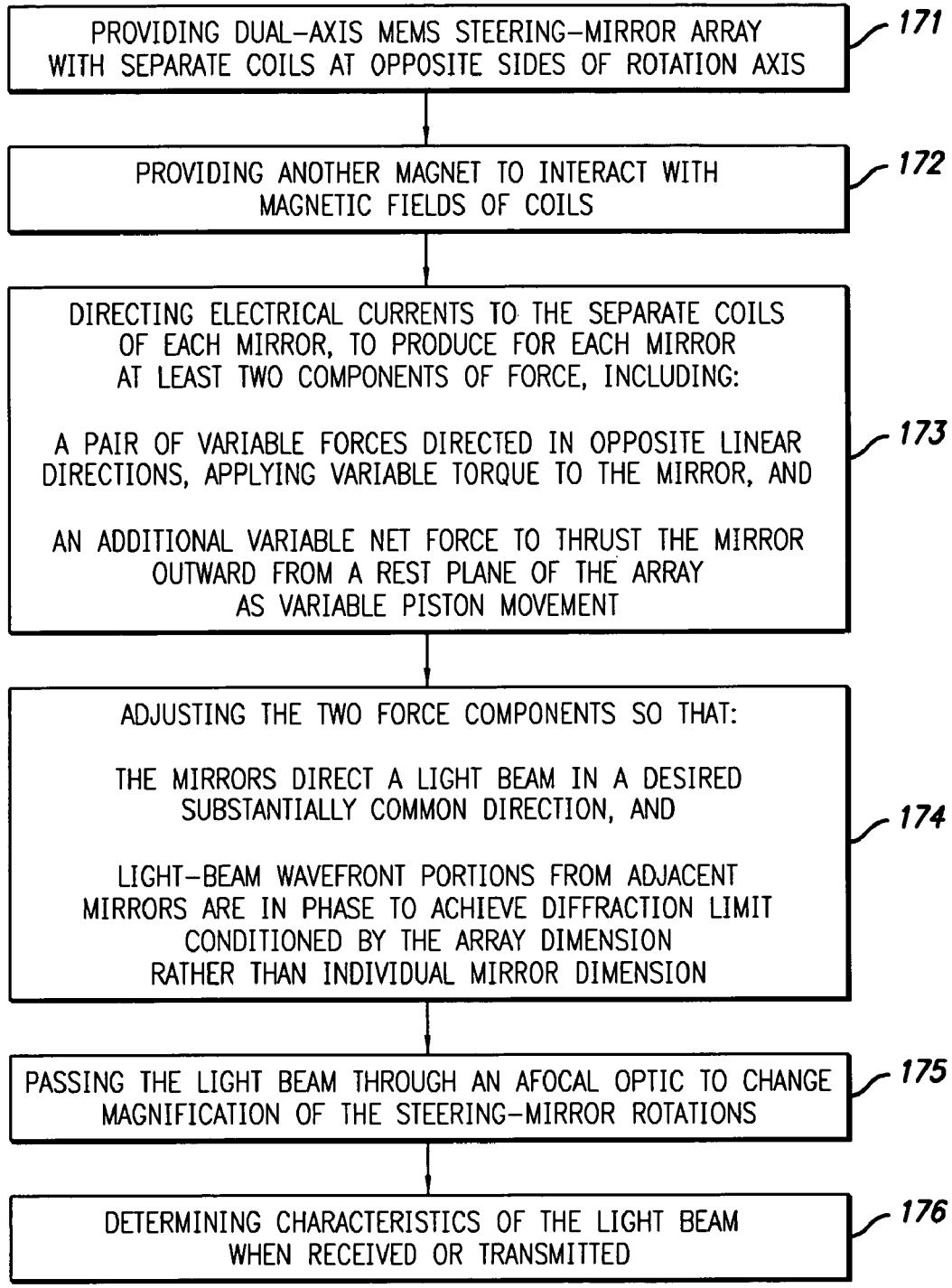
FIG. 20 is an operational flow chart, highly schematic and showing methods—according to our invention—that also make use of MEMS mirrors of that same new generation.

From the foregoing discussion it will be appreciated that our present invention provides a new method of operating an optical system. The method includes providing 171 (FIG. 20) an array of magnetically controlled dual-axis rotatable MEMS steering mirrors. Each mirror is considered to have separate electrical coils disposed at opposite sides of a rotational axis.

The method also includes providing 172 at least one other magnet whose magnetic field interacts with magnetic fields created by the coils. The interaction produces magnetically generated forces.

The method further includes the step of directing 173 electrical currents to the separate coils of each mirror, to produce at least two components of magnetically generated forces, including:
  a pair of variable forces directed in opposite linear directions, applying variable torque to the respective rotatable mirror, and
  an additional variable net force tending to thrust the respective mirror outward from (or draw it inward toward) a rest plane of the array, causing variable piston movement of the respective mirror.

An additional step is adjusting 174 the at least two components of forces so that the steering mirrors direct a light beam in a desired substantially common direction, and so that light-beam wavefront portions from adjacent steering mirrors are substantially in phase. (Foregoing discussions explain how this is done, including ways of monitoring and responding to the wavefront or the imaging quality directly.) The result is to achieve a diffraction limit conditioned substantially by the entire array dimension rather than an individual mirror dimension.

As the preceding sections of this document make clear, this method has application in various functions, some of which receive light beams for analysis and others transmit light beams for imaging or other kinds of investigation. In either case, preferably another step of the method is passing 175 the light beam through an afocal optic to change magnification of steering-mirror rotations. Still another step is determining 176 characteristics of the light beam when received or as (or after being) transmitted.

Often the several steps of this method are performed by respectively different people or institutions, or in respectively different locations or at respectively different times. The core steps of the method—steps performed once the full system is in place, but before the ultimate utilization steps (passing 175 and determining 176) may perhaps best be regarded as the directing step 173 and adjusting step 174.

Resolution, FOV, Dynamic Range, and Other Parameters

Remarkably, even though the present invention (including forms of the invention set forth in precursor applications) by virtue of its excellent diffraction characteristics achieves far finer resolution (for example from twenty-five to fifty microradians) than earlier sensors, at the same time it nevertheless also provides much broader effective field of regard (for example ninety degrees or roughly 1.6 radians). These dual advantages can be stated together in terms of an extremely high effective dynamic range (for example from roughly 32,000:1 to 64,000:1).

In the FOR-reducing embodiments of our invention, as explained elsewhere in this document, finer pointing precision is possible. In physical prototypes to-date, we have demonstrated precision of one milliradian. Ultimately, however, precision as fine as ten to one hundred microradians is a realistic goal. We believe that we will achieve the lower figure.

The invention can redirect a new beam 243 (FIG. 23) of light (usually generated locally—i. e. on the same platform) laterally for guidance of any objects away from the host. The invention can also provide determination of wavelength λ and frequency-modulation information f(t) in the received beam, so that those characteristics of the received rays can be mimicked 241 in the new beam—which is relayed to another location, either for communications purposes or to lead an approaching object to a different destination. Alternatively the new beam can be directed back along the same path 238 as received rays 213, to the extent that the field of regard of the optical system (or of the system together with other such optical systems being operated in parallel) is broad enough to provide appropriate directions for the new beam. These capabilities are entirely beyond those of the prior art.

Figure 23:
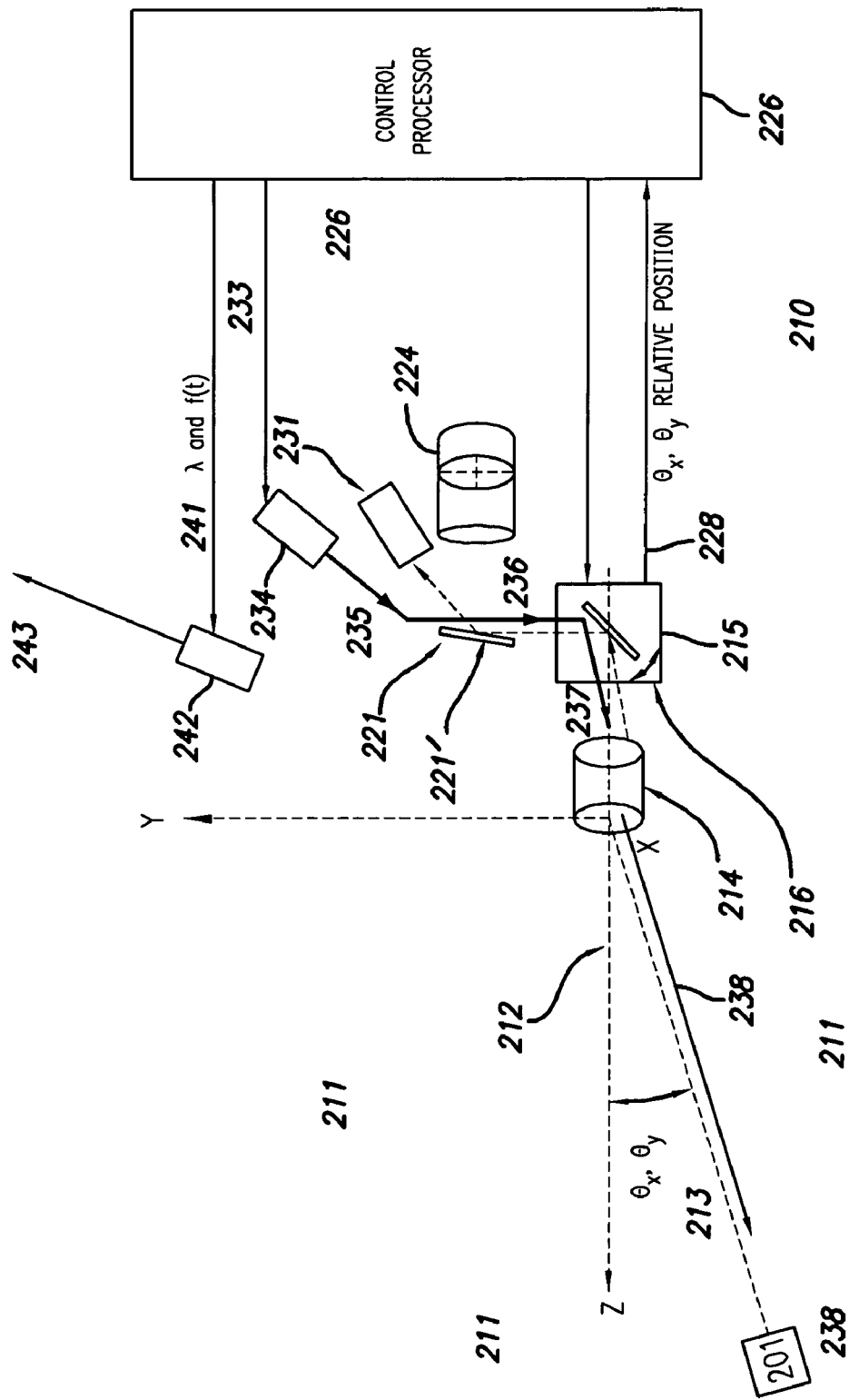
FIG. 23 is another like diagram but now showing a further extension to encompass dual forms of yet a third function, namely response.

Preferred embodiments of the method of the invention, corresponding to the apparatus discussed above, include the steps or functions of:
  detection and angular location of a light source (FIG. 21), determining characteristics of the received radiation (FIG. 22), and
  response (FIG. 23).

The first of these functions preferably includes these constituent steps:

STEP 1—Incident rays 213 from a light source 201 illuminate the system, on its host platform, at a relative angle $\theta_X$, $\theta_Y$.

STEP 2—What we ordinary call a "magnifying" afocal lens assembly 214 does in fact magnify a collimated or nominally collimated incident or exiting ray angle, $\theta_X$, $\theta_Y$ (i. e. outside the optical system) by the ratio of the two focal lengths designed into the assembly, 1:3 in this example. This change results, however, in much smaller off-axis angles of $\theta_X/3$, $\theta_Y/3$ inside the optical system 210—i. e. at the scan mirror or mirrors 215. This arrangement is optimal to effectively, or virtually, bring the incident rays within the native scan range of the MEMS scan system.

The lens assembly 214 is described as "afocal" because it is not used to focus the incoming rays directly onto the detector 224; rather the primary lens 245 forms (inside the lens assembly) only a virtual image 244, which the secondary lens 246 then recollimates—but only if the incoming beam 213a, 213 is itself at least approximately collimated—to produce substantially parallel rays in the beam approaching the detector assembly 222.

STEP 3—The MEMS scan mirror continuously raster-scans the field of regard. When the MEMS scan mirror intercepts laser energy at the corresponding original angles $\theta_X$, $\theta_Y$ (and reduced angles $\theta_X/3$, $\theta_Y/3$), the detector detects the energy and in turn transmits the signal to the control processor. The relative position reported at that same instant by the MEMS scan mirror assembly, and therefore corresponding to $\theta_X$, $\theta_Y$ is recorded by the control processor 226. To enable this result, a conventional two-axis angle sensor (not shown) that measures shaft angle of the MEMS mirror has been precalibrated to provide the corresponding field of regard angle ($\theta_X$, $\theta_Y$) relative to the optical axis.

STEP 4—The 2-D detector is fitted with a reimaging lens that focuses the incident beam at its conjugate location on the detector, relative to the system axis, provided that (1) the MEMS scan mirror is at an appropriate angle to direct the beam into the detector field of view, and (2) the incoming beam, within the envelope of extreme captured rays 213, 213a (FIG. 25), is collimated or very nearly so. This arrangement tends to somewhat diffuse the image of relatively nearby sources on the detector, and thus limit the response to light from relatively remote sources., The detector is thus aided in essentially disregarding illumination from nearby sources, which for purposes of preferred embodiments of the present invention are most-typically considered irrelevant. (As will be understood, contrary assumptions can be implemented instead, if desired, in other—generally conventional—optical trains.) Such exclusion of illumination that is not of interest, however, is generally secondary in relation to other selective features in the system—e. g. spectral filtering 221, 255, and a. c. signal filtering 256 or other arrangements for enhancing sensitivity to anticipated known modulation patterns.

The position-sensing detector next comes into play, sensing not only presence of the illumination but also the displacements $\Delta X$, $\Delta Y$ of its focal point (conjugate location) from the optical axis—and generating corresponding $\Delta X$, $\Delta Y$ signals for transmission to the control processor.

STEP 5—Mirror-bias commands $\Delta\theta_X$, $\Delta\theta_Y$, proportional to the $\Delta X$, $\Delta Y$ values, are generated by the control processor and sent to the MEMS scan-mirror assembly. These signals drive the conjugate location approximately to the optical axis; and as that location approaches the axis the error signals $\Delta X$, $\Delta Y$ become progressively more linear and stable, by virtue of the inherent behavior of the PSD 224, so that the eventual determination of incident-beam location is extremely precise, accurate, and stable. At each instant the source angles outside the optical system are related to the coordinates on the PSD surface by the final-stage focal length, i. e. each angle $\Delta\theta_X$ or $\Delta\theta_Y$ equals the corresponding $\Delta X$ or $\Delta Y$ coordinate divided by the 2-D detector imaging-optic focal length $f_D$ (FIG. 25)—subject to the angle-scaling effect of the afocal assembly 214, discussed at "step 2" above.

STEP 6—The $\Delta\theta_X$, $\Delta\theta_Y$ incident-ray relative position as then measured by the MEMS scan-mirror local angle sensors are made available, for later functions, as an accurate line-of-sight location of the incident ray relative to the system axis.

The second function of the system basically includes determining the wavelength and any accompanying temporal or spectral modulation of the incident ray or signal. Continuing the above sequence:

Step 7—A fold mirror 221 (FIG. 22) rotates to direct the incident beam 213 to a spectrometer or photodiode 231. The fold mirror is basically a simple, motorized mirror that redirects light; but in other preferred embodiments this mirror can be replaced by a MEMS mirror or, as noted earlier, a beam splitter. One or more splitters, in tandem as appropriate, are particularly advantageous to permit simultaneous operations of different types, e. g. detection, spectral analysis, imaging, distance probing, or active response—and combinations of these.

Step 8—A spectrometer 231 determines the incident ray wavelength. The detector in the spectrometer may acquire any temporal or spectral intensity or wavelength or temporal modulation to be detected and sent 232 to the control processor. Portions of this task may be assigned to the PSD 224, filter 256 (FIG. 21) and processor 226 for data acquisition during earlier steps 5 and 6.

The third system function is most typically an optical response that can take any of several forms. One form (FIG. 23), which makes use of directional information collected in the first function, is generation and projection of a very bright beam of radiation opposite the incident ray, to temporarily dazzle or confuse an operator or aiming apparatus at the source. Again continuing from the first-function sequence:

STEP 7—The fold mirror 221 (FIG. 23) rotates from its earlier positions 221' to align a powerful laser 234 along the optical axis, and thereby along the known path to the source.

STEP 8—The laser transmits a temporarily blinding beam 235-238 in a direction opposite the incident rays 213, but back along the same path, in response to a command 233 from the control processor 226.

A fourth function uses the information collected in the second function to generate and project a precisely wavelength-matched and temporal-modulation-matched beam to a nearby location, preferably one that progressively moves away from the host position, to draw any guided object away from the host. Friendly as well as hostile guided rendezvous can be facilitated in this way. This fourth function includes issuance of a processor command 241 (FIG. 23)—with necessary data λ, f(t)—to the auxiliary light is source, e. g. tunable modulated laser 242. At substantially the same time the determined information is advantageously transmitted (preferably as interpreted, encoded data) to a remote station to document, e. g. for subsequent refined avoidance, what has occurred.

As will be understood, if the application at hand calls for directing a beam into the originally searched input volume 211, rather than a location laterally offset from that volume, then instead of the auxiliary laser 242 it is possible to use the previously mentioned laser 234—i. e., the one that can be aligned with the main optical path through the lens assembly 214. This option is particularly practical in the case of a plural-sensor-system apparatus configured to scan 2π or 4π steradians as previously discussed. In such applications essentially all locations are within the scanned range of at least some one of the component sensor systems.

A complex of other possible responses, and alternative applications of the information gathered in the first two functions, is within the scope of the invention (FIG. 24). One such response is initiation of a distance probe operation to collect additional information about any such object that may be associated with the beam, or about facilities at the source, or both. Several of the references cited at the beginning of this document provide very extensive information about distance-determining capabilities and design. Other ranging methods may be substituted as desired. This form of the invention can also be used for any of various other applications, such as transmission of modulated optical signals for free-space laser communications.

For each of the various applications additional components may be added, such as additional processing capability for further processing data, an annunciator for alerting an operator or connecting to an alarm for monitoring the system, or robotics to perform additional functions in response to detection.

Particularly preferred applications, as shown, include use of the system in a vehicle or other host for detection of objects, or use of the system as a guide for a laser communications telescope—for which the system "communicates" angular, wavelength, frequency-modulation (or other temporal modulation) or other information between two telescopes. Also included is use of the system for continuous observation purposes such as recognition and location of emergency distress signals e. g. a beacon, or flares, or identification of approaching vehicles.

Furthermore the system can detect such light signals in outer space or even through large bodies of water. Thus objects can be identified and located regardless of whether they are floating in space, under the sea or on land. Other beneficial uses will appear from the drawing; however, it is to be understood that FIG. 4 is not intended to be exhaustive; i. e., not all functions of the invention described and discussed in this document appear in that drawing.

Because of the versatility of the system and its many functions, it has a wide range of applications spanning industries as diverse as telecommunications, optics, automotive, marine, aerospace, continuing observation, and search and rescue.

In a particularly preferred embodiment of the invention as set forth in the copending precursor application, the sensor system utilizes a two-axis scan mirror (FIG. 225) of dimensions 1.5×2.1 mm, with mechanical scan angle of plus-or-minus 10° to 15°—for a total excursion of 20° to 30°—about both axes. These various values, however, and related values, are preferably supplanted by those appropriate to the newer MEMS or FSM mirrors as detailed above. A two-axis scan mirror is not a requirement; a single-axis scan mirror with one-dimensional detector can be substituted. Using a two-axis scan mirror with a 2-D detector, however, allows greater flexibility in detecting throughout a volume or detecting in more than one dimension.

A ±10° or ±15° sweep 216, i. e. 20° or 30° full-excursion, of the MEMS or FSM mirror or mirrors 215 is doubled—by the effect of reflection—to produce a 40° or 60° deflection of the beam at that point. The MEMS/FSM system, in turn, is behind a lens assembly whose focal-length ratio (typically 1:3) triples that 40° or 60° deflection to provide, typically, a 120° to 180° overall field of regard. The two-axis MEMS scan mirror, operating at approximately four milliradians for approximately the magnification (again, typically three) times 2λ/d, repeatedly sweeps the full 120°×120° volume at more than 10 Hz. This then is the frame rate for a complete scan of that field of regard.

If a collimated or nominally collimated incident ray is directed toward the host within this overall field of view, the ray is projected—through its reimaging lens—onto the detector when the MEMS or FSM two-axis scanning mirror is at the corresponding angular position. The scan-mirror control system then drives the scan mirror to maintain the incident ray on the detector, ideally a position-sensing photodiode detector as described earlier—and preferably at its center.

This detector provides positional closed-loop feedback to the scan mirror, driving the focal point to minimize the ΔX and ΔY coordinates. In other words the beam is driven to the native origin on the photosensitive surface of the diode.

When in that condition, the angular positions of the mirror provide the corresponding azimuth and elevation angles $\Delta\theta_X$, $\Delta\theta_Y$ of the incident rays—based on the corresponding error coordinates ΔX, ΔY at the detector surface, and the corresponding known relative mirror angles as explained earlier. Limiting uncertainty of the input collimated laser-beam angle is the limiting resolution of the 2-D detector divided by the reimaging lens focal length $f_D$.

In addition to illuminating the PSD, the system advantageously includes a multiposition relay mirror (or fold mirror etc.) to alternatively direct the incident beam to other detectors such as a spectrometer used to determine incident-ray wavelength—or a beam-splitter to do so concurrently. If preferred, quad cells, focal plane arrays, or line arrays such as a charge-coupled device (CCD) or other light sensitive arrays can be used instead. Ideally each individual detector of an array can be provided with its own individual microlens. Nevertheless the previously mentioned quantization effect remains a concern, and array detectors are generally slower than PSDs, particularly when taking into account the necessary algorithmic procedures for readout and interpretation of optical signals.

The same multiposition mirror can also serve to route output rays, from an onboard laser or other bright lamp, back along the original optical path toward the source of the initially detected incident beam—to blind the source operator, or locate the source facility, or communicate with it, all as set forth earlier.

In practice of many of the preferred embodiments of the invention—but particularly for situations in which the system cannot lock on to an active source, usually because no active optical source is present or none is being concurrently detected and tracked—it is especially helpful to provide a vibration-sensing subsystem 257 (FIGS. 21 and 22) adjacent to the scan mirror or mirrors, and a correctional-data path 258 for flow of vibration information from the outputs of these sensors to the main processor. (Although included in FIG. 21, such provisions most typically are in order only when no positional detection is available, e. g. as in FIG. 22 with the detector 24 out of service, or absent. Vibration sensing 257, 258 and input filtering 255, 256 are omitted from FIGS. 23 and 25 only to avoid further clutter in those drawings.) This sensing module 257 with its correction path 258 enables a spectrometer, or an imaging system or distance-determining system, that is part of the invention embodiments to form a stable, high-resolution 2-D or 3-D image despite vibration in the host platform.

Most typically the vibration sensor includes a gyroscope or set of accelerometers, separated by known lever arms. These devices provide enough information—most typically with respect to five degrees of freedom—to enable the system to incorporate compensating maneuvers of its moving mirrors, canceling out the effects of such vibration. These devices should be augmented by a GPS sensor for geodetic coordinates.

Sensing elements 257 positioned along the plane of a supporting base of the moving mirror or mirror assembly 215 can for example include three linked accelerometers sensitive to motion normal to that plane; and two others, to motion in that plane—ordinarily but not necessarily parallel to orthogonal edges of the base. Such vibration-sensing devices in effect define instantaneous characteristics of any host-platform vibration. Such sensing subsystems in themselves are well known and conventional. The data they produce must flow to the processor 226 and be interpreted promptly enough to enable effective feedback into the control circuits of the moving mirror or mirrors, to achieve cancellation within desired imaging accuracy of the overall system.

Vibration sensing, like other functions involving detection of relative position as between the MEMS/FSM mirrors and the base or platform—when using the newer, magnetically driven mirrors—ideally may be performed through use of magnetic pickups, e. g. auxiliary coils built into the individual MEMS mirrors. This sensing strategy is particularly favorable for the same reasons that the magnetic mirror drive itself is advantageous, namely that action and sensing at a greater distance is more practical with magnetism than with mechanical, electrostatic or piezoelectric phenomena.

Figure 26:
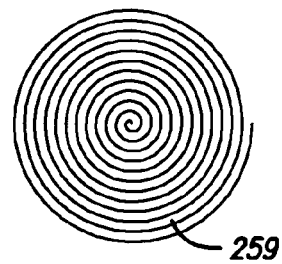
FIG. 26 is a diagram conceptually representing a spiral-scanning raster pattern for use in any of the FIG. 21 through FIG. 25 systems and methods.
Figure 27:
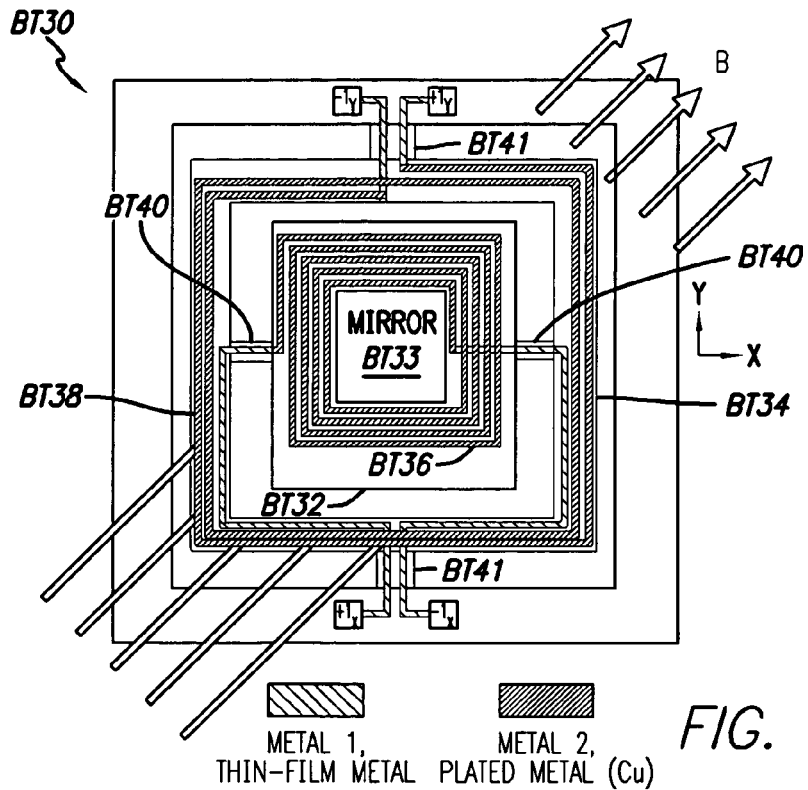
FIG. 27 is a detailed top plan, somewhat schematic, of a prior-art MEMS mirror assembly with integral gimbal system—and showing direction of a magnetic-excitation field (after the "prior art" FIG. 2 in the above-discussed '921 patent of Bernstein, Taylor et al.)
Figure 28:
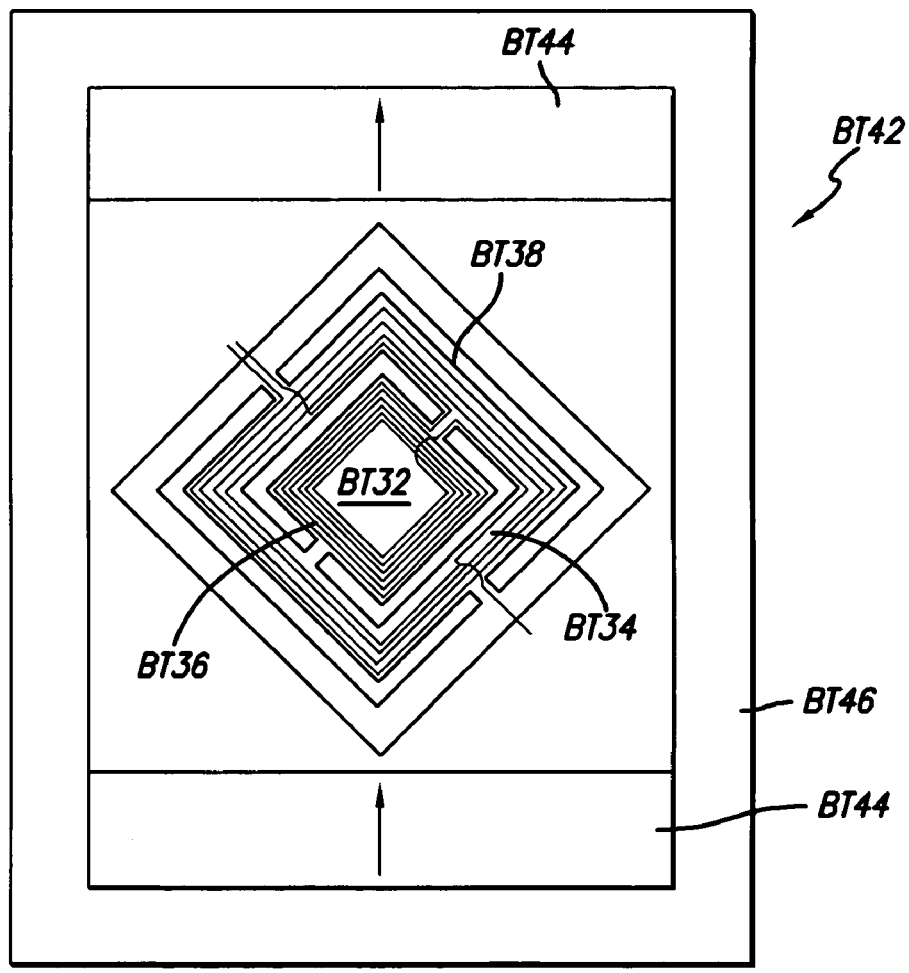
FIG. 28 is a simplified view of the same assembly, together with magnets for imposing such excitation (after "prior art" FIG. 3 in the same patent)
Figure 29:
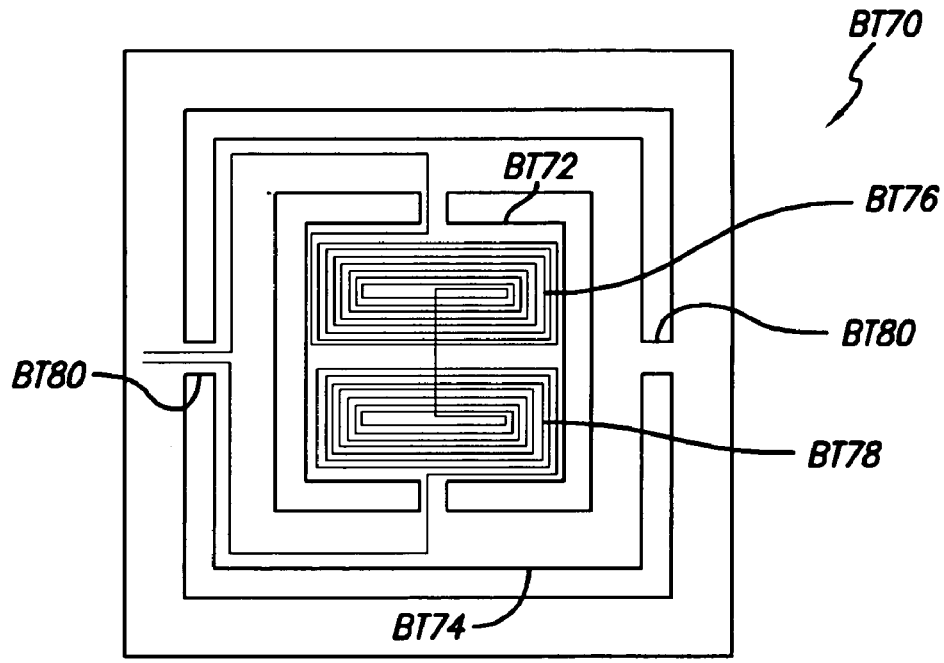
FIG. 29 is a like view, but of a first part of an embodiment of the invention that is taught in the '921 patent (after FIG. 8A in the same patent), having separate "X-axis control coils" on the mirror pad, at opposite sides of the horizontal flexure and associated rotation axis—and is prior art with respect to this present patent document, but not with respect to the '921 patent.
Figure 30:
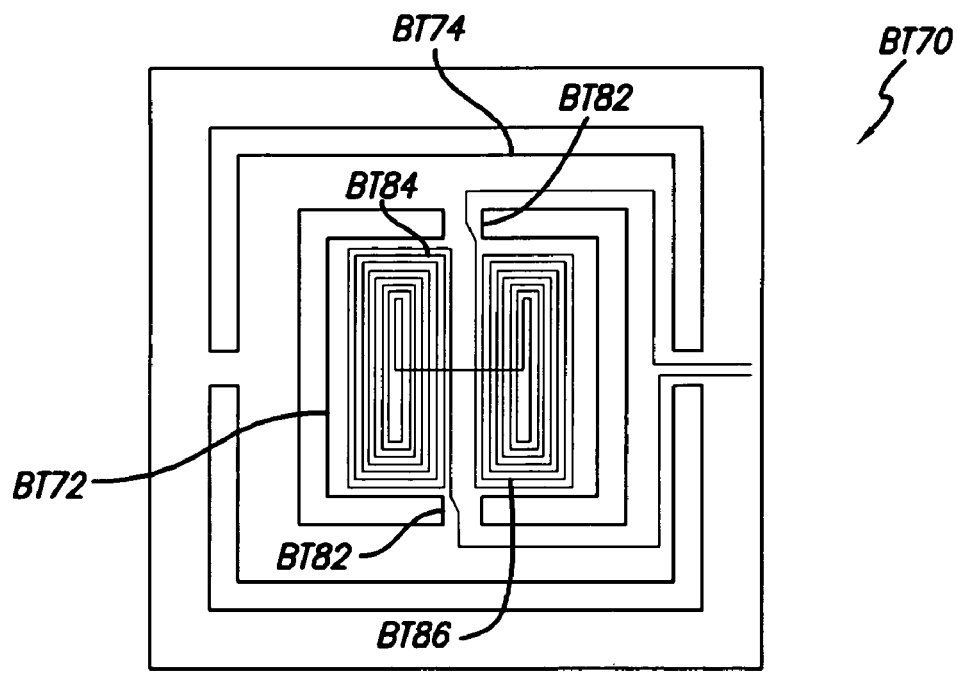
FIG. 30 is a like view of a second part of the same embodiment (after FIG. 8B in the same patent), but instead having separate "Y-axis control coils" on the mirror pad, at opposite sides of the vertical flexure and associated axis—likewise prior art with respect to this document but not to the '921 patent.

For most purposes of the present invention, as previously mentioned, raster scans are advantageously performed using a spiraling pattern 259 (FIG. 26). With moving mirrors, executing such a pattern is most typically far more energy-efficient and fast than tracing a more-conventional rectangular-envelope serpentine pattern. For optimum speed and efficiency the sequence reverses direction at each end—i. e., outward in one scan, inward in the next, and so forth. As in any raster operation, the number and pitch of the spiral revolutions should be selected with care to obtain good resolution without significant gaps in the image.

DETAILS OF THE ROVING FOVEAL SENSOR APPLICATION—In certain preferred embodiments of the invention the objective system is capable of pointing over a full-hemispherical field of regard (FOR). Concurrently preferred embodiments of this invention can deliver geolocation information, based on platform position and attitude derived from an inertial-navigation system ("INS").

The most highly preferred embodiment of our invention utilizes an afocal optical front end with a hemispherical FOR. In this approach servoed-beam steering—according to the coowned patent documents noted above—provides the active pointing capability within the FOR.

The term "foveal" refers to the high-resolution portion of the human retina, particularly the portion at the center of the retina. A related phrase is "foveated camera".

According to certain preferred embodiments of our invention, a "roving foveal" camera—consisting of two or more detector planes providing both a wide field of view ("WFOV") and a steerable narrow field of view ("NFOV")—can be designed using an appropriately configured optical system, an optical beam splitter and a fast steering mirror. (For purposes of this document, "WFOV" is essentially synonymous with "field of regard" ["WFOR"], or wide field of regard ["WFOR"].)

Preferred roving-foveal embodiments of our invention are addressed primarily in separate coowned patent documents, covering three basic configurations. The present document takes up only one of those configurations, particularly one that appears to be most directly or most naturally associated with the mirror innovations presented in this document.

Figure 18:
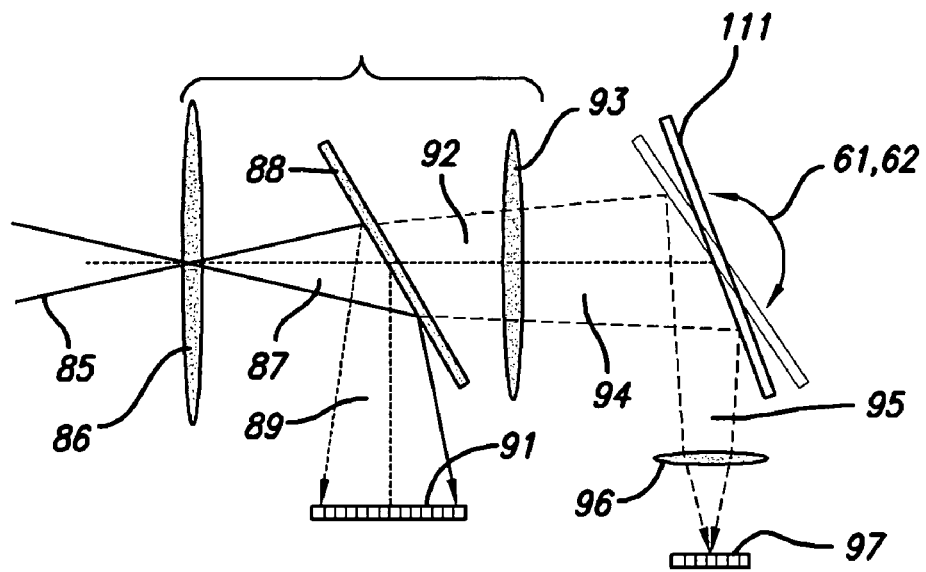
FIG. 18 is an optical diagram, somewhat conceptual, of the roving foveal design—one of three configurations that each include a beam splitter for picking off a large-FOR "staring" detector from inside an afocal optical assembly; is but here more specifically the drawing showing a preferred configuration in which a narrow-FOV image is movable with respect to the wider-FOV or FOR image, for viewing, so that an inset narrow-FOV image can be placed—relative to the wider image—as preferred by an operator or system designer, and indeed can be moved about, in relation to the wider image, in real time.
Figure 19:
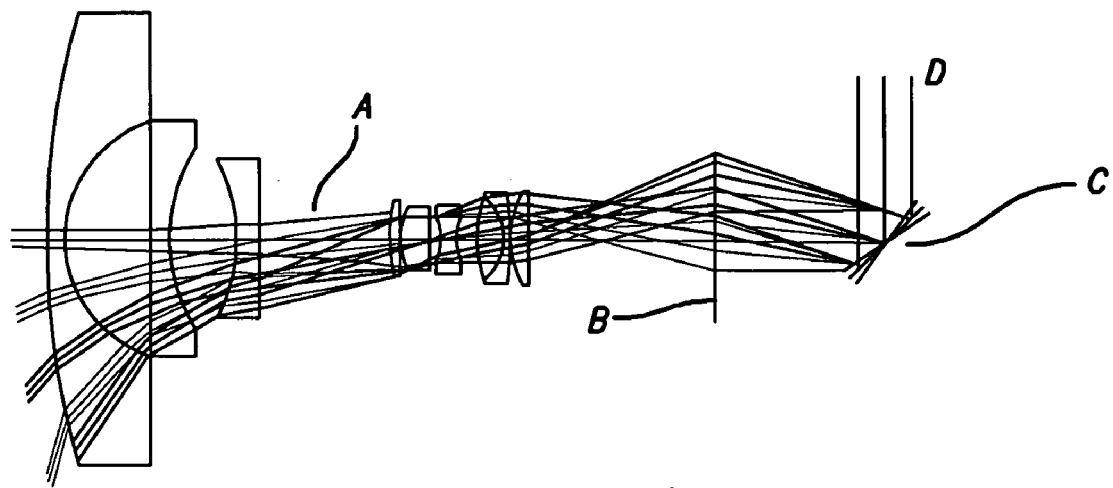
FIG. 19 is an exemplary optical design schematic of a color-corrected afocal optical system according to a preferred embodiment of the invention, for operation with visible light.

In this configuration, first, WFOV and NFOV imagers 91, 97 (FIG. 18) can share a common optical aperture 85, 86 using a beam splitter 88 (e. g. a 50/50 splitter). This feature allows the optical radiation to traverse different pathways 89, 92-94-95 respectively corresponding to the two imagers 91, 97.

Second, this class encompasses two different configurations, but again we take up only one of those here: optical data for the WFOV imager 91 are split out before the fast steering mirror 111, making that WFOV movable in relation to the NFOV. (In purest principle, instead the NFOV optical data could be split out first; however, such a variant could be awkward to design for the desired size relationships as between the two images.)

It is very specifically this movable-field capability that enables the NFOV high-resolution imager to "roam" or "rove" within, or in relation to, the WFOV image space. This mode of operation (as well as, therefore, this optical configuration) is now the most highly preferred embodiment. It gives an operator or system designer maximum flexibility to juxtapose the plural scene views however the operator or designer may prefer, for optimum information content.

In all or most cases the detector array can be sensitive at any optical wavelength, and can be multispectral—and therefore limited only by the availability of specific detector arrays (now and in the future). Additionally, the optical front end may if desired comprise an afocal lens, most typically but not necessarily wide-angle.

As in the coowned prior patent documents mentioned above, the afocal front end if present can be used to obtain large FOV angles unachievable with the mirror alone (i. e. for steering mirrors that have an angular limit).

Advancing imaging technology with electronically addressable pointing (without a large external gimbal box such as used in older conventional systems) provides the basis for such lightweight, low-power, and reliable imaging performance. According to our invention the objective system can point over a hemispherical field-of-regard (FOR) while delivering geolocation/targeting information based—as mentioned earlier—on INS knowledge of platform position and pointing. Such a system can provide enhanced low-cost imaging and pointing capability.

Because preferred embodiments of our invention can integrate feedback from an onboard INS system, image stabilization is also possible. This ability typically has not been available on small UAVs heretofore, since conventional stabilized imaging systems usually require scanning systems that exceed weight limitations for these craft. These new stabilization and pointing capabilities in preferred low-weight, low-power embodiments of our invention present a new set of possibilities for a great range of users—including but not limited to (as one extreme example) air-traffic controllers in a tower or a regional control facility, and (at an opposite extreme) soldiers on a battlefield.

Furthermore the simple provision of image stabilization facilitates analysis by ground operators and mitigates mental processing demands for interpreting imagery. Finally, integration of the pointing system with the INS enables object-locating capability (geolocation) within our small platform. Accuracy of geolocation is based on the accuracy of platform orientation (INS accuracy), and of platform position (INS and for some applications an altimeter), and pointing accuracy.

Our invention contemplates sensor pointing accuracy on the order of 0.1 mrad. For moderate INS performance of 7 mrad attitude precision and 5 m positional precision (e. g. so-called "spherical error probable" or "SEP"), this implies approximately 8.5 m pointing precision (e. g. "circular error probable" or "CEP") at 1 km ranges, in a plane perpendicular to the line of sight. This type of pointing location may be used in a variety of ways, for example:
- object coordinates may be handed off to another platform or facility to perform any one of a wide range of application objectives;
- in applications requiring an immediate rapid response (e. g. in collision avoidance or military contexts) a course correction or a direct call for fire may occur; or
- information may be simply cached for application planning purposes to be performed at a later date.

For any new-capability innovation, new applications are often developed by the user community. As systems in accordance with our invention become smaller and more affordable, they become more numerous in many use environments such as mentioned in this document—and others as well. As a consequence, understanding ways in which to best utilize them in a collective and networked manner will also be recognized by people in these fields. This concept offers an alternative to a large, centralized, high-value-asset approach—with the possibility of equal or even greater operational capability.

Preferred embodiments of our invention are compatible with a variety of alternative applications, in addition to those already introduced. One example includes replacing the afocal hemispherical optics with a panoramic annular lens, for stationary installations.

Further Technical Details

The technical objectives of preferred embodiments are best derived from system objectives—e. g., a low-cost, lightweight (under 2 kg or 5 pounds), low-power, persistent visible and infrared imaging and pointing capability for UAVs and various other platforms. Our invention contemplates these system characteristics:
(1) fast optronic pointability,
(2) ±90-degree field of regard (FOR),
(3) in roving-foveal applications, a wide FOV (or FOR) for broad-region imaging with continued monitoring, and a narrow FOV for pointing at and following relatively small objects or regions,
(4) image registration/stabilization and object geolocation, and
(5) passive visible and IR capability, and active capability as described in this document.

System Design

A key system-level objective, in implementing preferred embodiments of our invention, is to develop a detailed system design and a performance model exhibiting integrated performance that satisfies the above-mentioned descriptions. To avoid iterative efforts we recommend that, based on the system design, elements necessary for a prototype demonstration be developed. Specific goals of such a demonstration ideally include ability to perform not only pointing functions but also pointing stabilization using INS inputs to support geolocation, as stated earlier. Although individual subsystem specific performance measures (e. g., wavefront error ["WFE"], response time, modulation transfer function ["MTF"], stability, etc.) naturally should be determined individually, the overall system performance measurements noted here are best made in an operational context.

We advise against performing integrated system-design work without first demonstrating the key technology components individually. Thus we recommend starting any design effort with work on only the servoed-steering subsystem.

A much lower "risk"—but yet a major task and major design challenge—is design of the optical layout for the system. What is needed is an afocal wide-FOR design that produces images of sufficient quality to be operationally useful. Within this design-tradeoff space is consideration of the spectral region or regions of interest and, for visible-spectrum systems, the desire to color-correct the optical design. Since spectral bandwidth and color correction can entail major financial stakes, such decisions should be based firmly on overall system goals.

An exemplary color-corrected optical design (FIG. 3) has a ±10° scan angle for the two-axis servoed-mirror—and exhibits some of the challenges faced in wide-FOV imaging. First, the effective entrance pupil of the system is compressed—which is a function of the angular magnification considered together with the clear aperture of the servoed mirror. In this example, derived from our somewhat-earlier work, the effective entrance pupil is on the order of 1 cm.

Another issue is related to the number of optical elements. A color-corrected system has a relatively large number of optical elements, and this adversely impacts both size and weight objectives. This problem can be alleviated by going to longer wavelengths, or imposing single-wavelength operation on the system—but such mitigations carry their own undesired limitations.

A final challenge exemplified by such an optical layout is the issue of adequate image quality. In this example the MTF of the system corresponds to roughly fifty line pairs per millimeter, which is usually the minimum acceptable resolution for a detector array with pixels of 10 μm pitch.

In the aggregate, such design constraints can be managed in only a limited number of ways. In the case of the effective entrance pupil, three factors can be traded-off in relation to the radiometric requirements: total FOR, servoed scan angle, and mirror size. Simplification of the design by specifying single-wavelength operation is also a reasonable consideration—provided, naturally, that quality color imaging is not required. Meeting image-quality requirements will, most typically, be a result of experienced optical-design efforts rather than rigorous scientific methods; however, our design goal of fifty line pairs per millimeter should be reasonably easy to meet, considering the performance of the design under discussion.

Detailed designs should be explored to provide requirements flow-down to the active optical-element development effort. Key parameters of interest are the diameter of each active optical element (or, for polygonally or irregularly shaped components, a representative or maximum transverse dimension).

As suggested above, we recommend that after design the system be modeled to verify that the design meets all objective and inferred requirements, such as radiometric properties and platform vibration. Although typically a prototype system is intended as a laboratory demonstration unit (e. g. breadboard unit) only, and not expected to be integrated onto a platform, ideally the design will show traceability to achieving target geolocation capabilities. Such "traceability" is best demonstrated and quantified through analysis in which pointing feedback of the MEMS-mirror or FSM position is combined with the platform attitude, global position and knowledge of the local terrain to provide an estimate of an object's coordinates.

The primary role of the servoed-beam-steering subsystem is to provide pointing stabilization using INS inputs, to support image-based tracking functions. To that end the main objectives of the servoed-beam-steering task are to demonstrate a compact, low-power beam-steering package that can provide appropriate angular deflection and pointing accuracy for system requirements. It is further advisable to demonstrate closed-loop control of the servoed-device, to provide active inertial stabilization of the imaging system under realistic platform dynamics.

The previously mentioned CatsEye™ laser threat-warning program and our present development activities have led to current preference for an octagonal or ideally circular, electromagnetically driven mirror assembly with an aperture of at least 1 cm (FIGS. 1, 2A, 4 and 5,) or preferably 2 to 5 cm and even greater. The mirror may be a micromechanical type, e. g. MEMS with torsional flexures as illustrated, or preferably a fast scanning mirror (FSM) with ceramic or other refractory bearings. (As mentioned earlier, our previous work introduced the extremely advantageous use of jewel bearings for steering mirrors; we have now noted that much the same benefits can be obtained with other refractory materials, replacing jewels. That advance is discussed in detail elsewhere in this document.)

The approach currently pursued has demonstrated mechanical deflection range (mentioned earlier) of ±22 degrees, utilizing a PSD mirror-position sensor for active positional feedback. This design provides the necessary accuracy and dynamic range for image stabilization and pointing, in the e. g., proposed system. A similar unit with a 1 cm square aperture (FIG. 2B) has successfully demonstrated two-axis, large-angle beam deflection. Mechanical improvements—in addition to the square aperture—optimize spring stiffness.

Our early research and development work particularly explored the use of Hall-effect sensors to provide positional feedback for the mirror-steering control system. Although Hall sensors initially appeared to show great promise, after extensive effort we have concluded that other sensor types are far more suitable. The Hall-effect devices we investigated had only four-bit resolution, not at all adequate; and furthermore were subject to very objectionable crosstalk—on account of their sensitivity to signals in the mirror-drive coils.

We have been much more satisfied with use of position-sensing detectors (PSDs) to monitor mirror position. This sort of sensing strategy can be straightforwardly implemented in a system using our refractory-bearing mirror mount—especially since in that case we have access to the back side of the steering mirror. A separate mirror-monitoring light beam is deflected by the back of the mirror, depending on the mirror angle, and reaches a PSD dedicated to monitoring mirror position. (In principle such a system can use the front of the mirror if preferred, but such an arrangement is sometimes partly incompatible with the best use of the front of the mirror for deflecting the imaging or pointing beam.) The mirror-position monitoring path typically has its own radiation source, and the system reads PSD output signals directly to determine the actual position on the PSD that is struck by the beam.

The PSD under discussion here is not the same detector used to measure object direction or system-pointing direction, and in this (mirror-position measuring) situation it is permissible to measure beam position off-axis relative to the detector—even though these units are progressively nonlinear in position as an incident beam spot is successively farther from center. Linearity is not critical in such modules, as the calibrating relationship between mirror angle and PSD spot position can be rather fully characterized. Consequently null-balance operation, though very precise and accurate, is not required to calibrate the mirror angles very adequately.

In regard to the above discussion of aperture size, our mention of a 1 cm aperture is intended as representative rather than as a maximum size. As explained in some of the coowned prior patent documents introduced earlier, we regard mirror sizes on the order of 2 cm, 3 cm, and more as practical and desirable.

Since preparation of that document, however, we have considered design of mirrors that are 5 cm across, and even larger. We believe that, by exploiting the steering-mirror (and steering-deflector) design principles presented in this document, our invention has broken through the size limitations previously recognized as the state of the art.

Now, in view of that breakthrough, natural barriers to making steering deflectors of nearly arbitrary size seem very attenuated. We say this considering, in particular, the possibility of using arrays of mirrors, rather than individual mirrors, as steering devices. As noted earlier, our investigations indicate that the overall size of steering arrays can be readily increased well beyond five centimeters—to ten and even fifteen centimeters—although in practice such deflectors nowadays may have little application, since five-centimeter units appear to serve very well.

On the other hand, we believe that in due course, devices according to our invention will prove very useful in a number of special situations such as rapid pointing toward relatively dim external articles, in passive optical systems—and rapid steering of very bright response beams. For the time being, preferred embodiments of our invention have particular utility in a marketplace niche of very generally 5 mm to 5 or 10 cm.

We believe that, when the large-mirror design techniques are combined with array techniques, the potential result is steering arrays on the order of 15 cm or more, and diffraction-limit properties equivalent to those of individual mirrors having such dimensions. Mirrors of such sizes, however, are not limited to the torsional-flexure monosilicon constructions introduced in that earlier document.

To the contrary, the larger mirrors are implemented even more effectively—much more—in the jewel-bearing embodiment of another of our above-introduced patent documents. We find that the jewel-bearing and other refractory-bearing embodiment is far superior in control-response bandwidth, angular-setting stability when the mirror is not continuously held in position by the control system, and related dynamic characteristics.

In addition, it appears that the larger mirrors as designed and used in our jewel- and other-refractory-bearing mounts can be significantly more planar in operation than the torsional-flexure units. As a result, a larger fraction of a radiation beam steered from these devices is actually pointed in the nominal direction and reaches the nominal position.

Further, as detailed in our previous patent document dealing with the jewel- and other-refractory-system, performance of that system is much better than the MEMS and other monosilicon options, in regard to response bandwidth, mirror planarity, directional controllability, linearity of directional adjustments. and stability of mirror direction when the control signals are removed.

The foregoing disclosures are intended as exemplary, not to limit the specific configurations or operations of is our invention.

In certain of the appended apparatus claims, in reciting elements of the invention in the bodies of the claims, the term "such" is used as a definite article—i. e. instead of the word "the" or "said"—but only in cross-references back to elements of the environment or context of the claimed invention that first appear in the claim preambles. The purpose of this convention is to most-clearly point out those environmental or contextual features, so that they are not mistaken for or confused with components of the invention itself.

We claim:

1. An optical system dynamically determining associated angular direction throughout a specified range of angular directions, of an external article in a volume outside the system; said optical system comprising:
   a radiation source;
   an optical detector;
   an entrance aperture;
   an afocal element, associated with the aperture, enlarging the field of regard of such external article and such volume as seen by the source and detector;
   disposed along an optical path between (1) selectively, the source or detector and (2) the entrance aperture: at least one mirror rotatable about plural axes and causing the source and detector to address varying portions of such volume outside the optical system; and
   each mirror of the at least one mirror having dimensions in a range exceeding five millimeters;
   wherein, due to said enlarging of the field of regard together with rotation of the at least one mirror, and substantially without changing magnitude of said enlarging, such external article receives radiation from the source and returns said radiation to the detector throughout the specified range; and
   wherein the aperture, afocal element, and at least one mirror together form a common optical path for said radiation from the source and to the detector.

2. The optical system of claim 1, wherein:
said range of mirror dimensions does not exceed fifteen centimeters.

3. The optical system of claim 1, wherein:
the mirror dimensions are in a range exceeding one centimeter.

4. The optical system of claim 1, wherein:
the mirror dimensions are in a range exceeding five centimeters.

5. The optical system of claim 1, wherein:
the mirror dimensions are in a range exceeding ten centimeters.

6. The optical system of claim 1, wherein:
the at least one mirror comprises a two-axis mirror in a gimbal-like mount having jewel, ceramic or other refractory bearings.

7. The optical system of claim 1:
wherein the at least one mirror comprises a two-axis mirror in a gimbal-like mount having jewel, ceramic or other refractory bearings;
further comprising means for monitoring mirror position to develop positional or rotational feedback information used in rotating the at least one mirror.

8. The optical system of claim 7, wherein the monitoring means comprise:
an auxiliary optical system that directs an auxiliary radiation beam to the back of the mirror and responds to the auxiliary beam after return from the back of the mirror, to determine rotational angle of the mirror.

9. The optical system of claim 1, wherein:
the at least one mirror comprises a two-axis mirror supported in a gimbal-like mount having air bearings or magnetic bearings.

10. The optical system of claim 1, wherein:
the optical detector is a position-sensing detector (PSD) that detects radiation returned from such external article and tracks such article by inducing rotation of the at least one mirror to maintain such article centered on the detector.

11. The optical system of claim 10, wherein:
the mirror dimensions are large enough to sharpen the diffraction limit sufficiently for beam divergence on the order of forty to fifty microradians or finer, at visible wavelengths.

12. The optical system of claim 11, wherein:
maximum transverse dimensions of the mirror are on the order of three centimeters.

13. The optical system of claim 10, wherein:
the at least one mirror comprises an array of mirrors having overall array dimensions large enough to sharpen the diffraction limit sufficiently for beam divergence on the order of twenty-five to thirty microradians at visible wavelengths.

14. The optical system of claim 13, wherein:
maximum transverse dimensions of the mirror array are on the order of five centimeters.

15. The optical system of claim 1:
wherein the at least one mirror comprises a mirror array addressing such varying external portions of such volume outside the optical system; and further comprising:
a detector that detects radiation from such external article and tracks such article by inducing rotation of the reflector to maintain such article centered on the detector; and
means for enabling direct measurement and optimization of imaging quality; said enabling means comprising:
an auxiliary optical system emulating the behavior of light paths, to or from such varying external portions, at the array;
said auxiliary optical system comprising a laser directing an auxiliary beam to a first beam-splitter that forwards a portion of the beam energy toward the mirror array, parallel to said light paths to or from such varying external portions, and from the array to focus on an imaging detector; and means for developing focal quality at the imaging detector as a point spread function and using the point spread function as a figure of merit for adjustments of the mirror.

16. The optical system of claim 15, wherein the developing- and using means comprise:

means for perturbing mirror adjustments to optimize the point spread function, for plural steering angles of the array, and storing the optimized results; and means for retrieving the mirror adjustments for each optimized point spread function, to reset the adjustments for any desired steering-angle combination.

17. An optical system dynamically determining associated angular direction throughout a specified range of angular directions, of at least one external article in a volume outside the system; said optical system comprising:

a radiation source;

an optical detector;

an entrance aperture;

an afocal element, associated with the aperture, enlarging or reducing the field of regard of such external article and such volume as seen by the source and detector;

disposed along an optical path between (1) selectively, the source or detector and (2) the entrance aperture: at least one mirror, rotatable about plural axes, and causing the source and detector to address varying portions of such volume outside the optical system; and wherein each said at least one mirror comprises a two-axis mirror in a steerable mount having jewel, ceramic or other refractory bearings;

wherein, when enlarging the field of regard, due to said enlarging together with rotation of said at least one mirror, substantially without changing magnitude of said enlarging, such external article receives radiation from the source and returns said radiation to the detector throughout the specified range; and wherein the aperture, afocal element, and each said at least one mirror together form a respective common optical path for said radiation from the source and to the detector.

18. The optical system of claim 17, comprising:

means for controlling each said at least one mirror in rotation about the plural axes, to detect and track such external articles.

19. The optical system of claim 18, wherein the controlling means comprise:

a magnet fixed to or integral with the mirror; and means for applying variable magnetic fields to interact with the magnet and magnetically develop torque that rotates the mirror.

20. The optical system of claim 19, wherein the controlling means further comprise:

means for monitoring the mirror position to develop positional or rotational feedback information used in rotating the mirror.

21. The optical system of claim 20, wherein the monitoring means comprise:

an auxiliary optical system that directs an auxiliary radiation beam to the back of the mirror and responds to the auxiliary beam after return from the back of the mirror, to determine rotational angle of the mirror.

22. The optical system of claim 21, wherein the auxiliary optical system comprises:

a position-sensing detector (PSD) that determines displacement of the returned beam at the back of the mirror.

23. The optical system of claim 21, wherein the auxiliary optical system comprises:

an interferometer that counts fringes to determine position of the mirror directly.

24. The optical system of claim 17, comprising:

means for controlling each said at least one mirror in rotation about the plural axes, to follow a raster pattern for imaging at least portions of such external volume.

25. The mirror of claim 24, wherein:

the raster pattern is a spiral pattern.

26. The mirror of claim 24, wherein:

the raster pattern is a spiral pattern that reverses direction, as between outward and inward spiraling, for alternate passes through the pattern.

27. The optical system of claim 17, further comprising:

a beam-splitter tapping a wide-field-of-regard, high-resolution image out of the optical system to a first imaging detector, at a point before incoming radiation in the system reaches the at least one mirror;

a second imaging detector receiving a narrow-field-of-view, high-resolution image from the at least one mirror;

means for interpreting resulting electronic signals from both imaging detectors, to display two nested portions of such volume on a single common visual monitor; and means for controlling the mirror to position said narrow-field-of-view, high-resolution image selectively within said wide-field-of-regard, high-resolution image on the single monitor.

28. A method of operating an optical system that has a dual-axis MEMS steering array with individual mirrors having:

transverse dimensions exceeding one centimeter, and separate magnetic-field-inducing coils at opposite sides of each rotation axis, and another magnet to interact with magnetic fields induced by said coils;

said method comprising the steps of:

directing electrical currents to the separate coils of each mirror, to produce for each mirror at least two components of force, including:

a pair of variable forces directed in opposite linear directions, applying variable torque to the mirror, and an additional variable net force thrusting the mirror outward from, or drawing the mirror inward toward, a rest plane or backing of the array as variable piston movement;

passing a light beam through an afocal optic to change magnification of the steering-array rotations; and determining characteristics of the light beam when received or transmitted.

29. The method of claim 28, further comprising a preliminary step of:

selecting a maximum transverse array dimension of approximately three centimeters or greater;

wherein the resolution is on the order of forty to fifty microradians, or finer.

30. The method of claim 29, wherein the preliminary step comprises:

selecting the maximum transverse array dimension as approximately five centimeters or greater.

31. The method of claim 29, wherein the preliminary step comprises:
selecting the maximum transverse array dimension as approximately ten centimeters or greater.

32. The method of claim 29, wherein the preliminary step comprises:
selecting the maximum transverse array dimension as not exceeding fifteen centimeters.

33. The method of claim 28, further comprising the steps of adjusting the two force components so that:
the mirrors direct a light beam in a desired substantially common direction; and
light-beam wavefront portions from adjacent mirrors are generally in phase, to achieve diffraction limit conditioned by the array dimension rather than by the individual mirror dimensions.

34. The method of claim 33, wherein:
said generally-in-phase light-beam wavefront portions are in phase within roughly ten to twenty percent of one wavelength.

35. A method of operating an optical system that has a laser source for transmitting a radiation beam to an external object, and has a dual-axis reflective steering device with overall transverse dimensions exceeding one centimeter, rotatable on jewel, ceramic or other refractory bearings; said method comprising the steps of:
first, utilizing the dual-axis steering device to receive, and measure an incident angle of, an incident ray from the external object;
second, utilizing the dual-axis steering device to direct such a radiation beam from the laser source toward the external object in response to the received and measured incident ray.

36. The method of claim 35, wherein the second utilizing step comprises:
directing such a radiation beam to disrupt functioning or impair structural integrity of the external object.

37. The method of claim 35, wherein the first utilizing step comprises:
operating the mirror at a peak of acceleration as a function of mirror thickness.

38. The method of claim 35, wherein the first utilizing step comprises:
preparing the mirror and magnet with a diameter of roughly one centimeter and thickness of roughly two or three millimeters.

39. The method of claim 35, wherein the first utilizing step comprises:
preparing the mirror with diameter and thickness scaled from diameter of roughly one centimeter and thickness of roughly two or three millimeters, generally:
in inverse proportion to fourth power of mirror-and-magnet diameter, to account for inertia; and
in linear proportion to mirror-and-magnet diameter, to account for location of application of most driving force;
for approximate net inverse proportion to the cube of the diameter, subject to further adjustment for increased flux in the magnet arising from such increased thickness.

40. The method of claim 35, wherein the first utilizing step comprises:
operating the mirror at a minimum of response time as a function of mirror thickness.

41. An optical system dynamically determining associated angular direction throughout a specified range of angular directions, of an external article in a volume outside the system; said optical system comprising:
a radiation source;
an optical detector;
an entrance aperture;
an afocal element, associated with the aperture, enlarging or reducing the field of regard of such external article and such volume as seen by the source and detector;
disposed along an optical path between (1) selectively, the source or detector and (2) the entrance aperture: at least one mirror rotatable about plural axes and causing the source and detector to address varying portions of such volume outside the optical system; and
each mirror of the at least one mirror having dimensions in a range exceeding five millimeters;
wherein, when enlarging the field of regard together with rotation of the at least one mirror, and substantially without changing magnitude of said enlarging, such external article receives radiation from the source and returns said radiation to the detector throughout the specified range;
wherein, when reducing the field of regard, pointing and steering precision is made finer by the ratio of reduction of the afocal element; and
wherein the aperture, afocal element, and at least one mirror together form a common optical path for said radiation from the source and to the detector.

42. The optical system of claim 41, further comprising:
means for operating the system in a laser application for communications.

43. An optical system dynamically determining associated angular direction throughout a specified range of angular directions that defines a field of regard of the system, of an external article in a volume outside the system; said optical system comprising:
a radiation source;
an optical detector;
an entrance aperture;
an afocal element, associated with the aperture, reducing the field of regard of such external article and such volume as seen by the source and detector;
disposed along an optical path between (1) selectively, the source or detector and (2) the entrance aperture: at least one mirror rotatable about plural axes and causing the source and detector to address varying portions of such volume outside the optical system; and
each mirror of the at least one mirror having dimensions in a range not exceeding five millimeters;
wherein, due to said reducing of the field of regard together with rotation of the at least one mirror, such external article receives radiation from the source and returns said radiation to the detector throughout the specified range; and
wherein the aperture and at least one mirror together form a common optical path for the radiation from the source and to the detector.

\* \* \* \* \*